United States Patent [19]
Shimoya et al.

[11] Patent Number: 5,390,507
[45] Date of Patent: Feb. 21, 1995

[54] REFRIGERANT EVAPORATOR

[75] Inventors: Masahiro Shimoya, Chiryu; Shigeo Numazawa, Nagoya; Yoshiyuki Yamauchi, Chita; Etuo Hasegawa, Konan; Toshio Ohara; Keiichi Yoshii, both of Kariya, all of Japan

[73] Assignee: Nippondenso Co., Ltd., Kariya, Japan

[21] Appl. No.: 121,947

[22] Filed: Sep. 16, 1993

[30] Foreign Application Priority Data

| Sep. 17, 1992 | [JP] | Japan | 4-248064 |
| Oct. 2, 1992 | [JP] | Japan | 4-264671 |
| Nov. 19, 1992 | [JP] | Japan | 4-310315 |

[51] Int. Cl.$^6$ ............ F25B 39/02; F25B 41/04
[52] U.S. Cl. ............ 62/200; 62/513; 62/525
[58] Field of Search ............ 62/525, 527, 528, 511, 62/515, 519, 524, 513, 113, 205, 206, 204, 199, 200, 222, 224, 225

[56] References Cited

U.S. PATENT DOCUMENTS

| 2,402,802 | 6/1946 | Carter | 62/513 |
| 4,217,953 | 8/1980 | Sonoda et al. | 62/525 X |
| 4,760,707 | 8/1988 | Dennis et al. | 62/513 X |
| 4,811,568 | 3/1989 | Horan et al. | 62/200 |
| 4,823,561 | 4/1989 | Medlock | 62/513 |
| 5,036,909 | 8/1991 | Whitehead et al. | 62/525 |
| 5,101,891 | 4/1992 | Kadle | 62/525 X |
| 5,245,843 | 9/1993 | Shimoya et al. | 62/513 |

FOREIGN PATENT DOCUMENTS

| 54-6163 | 1/1979 | Japan | 62/513 |
| 58-41429 | 9/1983 | Japan . |
| 40076 | 3/1985 | Japan . |
| 263146 | 12/1990 | Japan . |

Primary Examiner—Harry B. Tanner
Attorney, Agent, or Firm—Cushman, Darby & Cushman

[57] ABSTRACT

A refrigerant evaporator for a refrigeration cycle provided with a heat exchanging unit, comprising a passageway to be cooled and a cooling passageway, and an evaporating unit for cooling the air, wherein a part of the inflowing refrigerant is divided, passed through a throttle to be reduced in pressure, and then passed through the cooling passageway of the heat exchanging unit, the inflowing refrigerant passing through the passageway to be cooled is cooled and completely changed to the liquid state and then passed into the evaporating unit, whereby the refrigerant is uniformly distributed to a plurality of refrigerant passageways of the evaporating unit.

13 Claims, 49 Drawing Sheets

REFRIGERANT EVAPORATOR

BACKGROUND OF THE INVENTION

1. Field of the Invention

The present invention relates to a refrigerant evaporator used in a refrigeration cycle, more particularly relates to a refrigerant evaporator adapted for an air-conditioning apparatus for an automobile.

2. Description of the Related Art

Conventionally, as the evaporator used in the refrigeration cycle of an air-conditioning apparatus etc., an evaporator wherein a plurality of cores, each forming a refrigerant passageway through which the refrigerant passes by superimposing two flat plate type core plates, and corrugated fins are alternately stacked has been known. In such an evaporator, the distribution of the refrigerant to the refrigerant passageways is apt to become nonuniform. To prevent this, for example, a means as disclosed in Japanese Examined Patent Publication (Kokoku) No. 58-41429 has been considered. In this evaporator, narrow, very small passageways constituting fixed throttles are formed in the core plates, the refrigerant condensed and liquidized by the condenser is sent as is to the evaporator and distributed so that the amount of the refrigerant to the respective refrigerant passageways becomes uniform by the fixed throttles of each core, and, at the same time, the pressure is reduced at those parts.

In a refrigeration system, on the other hand, to achieve an improvement of performance, it has been proposed to reduce as much as possible the gas refrigerant not relevant to the cooling, generated after the receiver, and to thus increase the amount of the effective refrigerant by providing a heat exchanging means for performing the heat exchange between a high temperature piping at an outlet of the receiver and a low temperature piping between the evaporator and a temperature sensing tube to perform so-called supercooling (Journal of Nippondenso Technical Disclosure 40-076, issued on Mar. 15, 1985).

However, in such a conventional evaporator provided with fixed throttles, if a refrigerant in a gas-liquid two-phase state flows into these fixed throttles, a uniform distribution of the refrigerant cannot be achieved. Namely, there is a problem in that fixed throttles through which a large amount of gaseous state refrigerant passes and fixed throttles through which a large amount of liquid state refrigerant passes are produced.

Therefore, it can also be considered to make the distribution of the refrigerant by the fixed throttles more uniform by using the aforesaid evaporator provided with the fixed throttles in the aforesaid refrigeration cycle, cooling the refrigerant after the receiver by a low temperature refrigerant passed through the evaporator by the heat exchanging means, and perform supercooling, thereby increasing the amount of the liquid state refrigerant.

However, when the temperature of the air cooling the condenser is uniformly low, i.e., 0° to 10° C. as in the winter season, the liquidization of the refrigerant is excessively promoted so that the amount of refrigerant supplied to the evaporator sometimes becomes insufficient. Also, in a transitory operation state, there sometimes occurs a case where the amount of refrigerant supplied to the evaporator is insufficient due to the shortage of liquid in the receiver.

In such a case, sometimes the temperature at the outlet of the evaporator rose and the refrigerant passed through the receiver could not be sufficiently cooled by the heat exchanging means. Alternatively, there was the problem that the temperature of the outlet of the evaporator sometimes became higher than the temperature of the refrigerant passed through the receiver, to conversely evaporate the refrigerant passed through the receiver, resulting the performance of the evaporator being greatly lowered.

Also, in the aforesaid conventional evaporator, fixed throttles were formed in two flat plate type core plates provided with concave portions. To effect uniform distribution, however, the plurality of fixed throttles have to be formed so as to have precisely the same cross-sectional surface area, so they conversely will become a cause of nonuniform distribution. The two core plates, for example, are bonded by brazing, and therefore there arose a problem in production such that the brazing material splattered on these fixed throttles, to make the formation of identical fixed throttles having the correct cross-sectional surface area difficult.

SUMMARY OF THE INVENTION

An object of the present invention is to prevent the lowering of the performance of the refrigeration cycle, for example, the performance of a cooling apparatus, by solving the various problems possessed by an evaporator of the prior art as described above.

A particular object of the present invention is to provide an evaporator for a cooling apparatus which can uniformly distribute the refrigerant to a large number of refrigerant passageways in an evaporator of the refrigeration cycle.

So as to achieve such an object, the refrigerant evaporator for a refrigeration cycle according to the present invention is provided with at least a heat exchanging unit, comprising a passageway to be cooled and a cooling passageway integrally formed so that heat exchange is possible, and an evaporating unit for cooling the air, wherein whether the heat exchanging unit and evaporating unit are integrally connected or are separated and coupled by piping, a part of the refrigerant flowing into the evaporator is divided, reduced in pressure and expanded through throttles, and made to pass through the cooling passageway of the heat exchanging unit, thereby cooling the passageway to be cooled, in contact with the cooling passageway, and supercooling the inflowing refrigerant passing through the passageway to be cooled and completely liquidizing the partially vaporized inflowing refrigerant, then supplying the same to the evaporating unit. By this, the liquid state refrigerant becomes uniformly distributed to a large number of refrigerant passageways of the evaporating unit. In certain cases, further, the refrigerant passing through the cooling passageway and vaporized is made to pass through some other refrigerant passageways of the evaporating unit. In this case too, only gaseous state refrigerant flows through these other refrigerant passageways, and therefore the gaseous state refrigerant is uniformly distributed to them. In this way, the aforementioned problem that the amount of refrigerant distributed to each of the large number of refrigerant passageways of the evaporator becomes nonuniform when a refrigerant which has become a mixed gas-liquid state after passing through the expansion valve is supplied directly to the evaporator, as in a conventional evaporator, can be eliminated.

Other features, objects, and effects of the present invention will become more apparent from the following detailed description of the present invention made with reference to the accompanying drawings.

DESCRIPTION OF THE PREFERRED EMBODIMENTS

Embodiments of the present invention will be explained in detail below based on the drawings.

Figure 1:
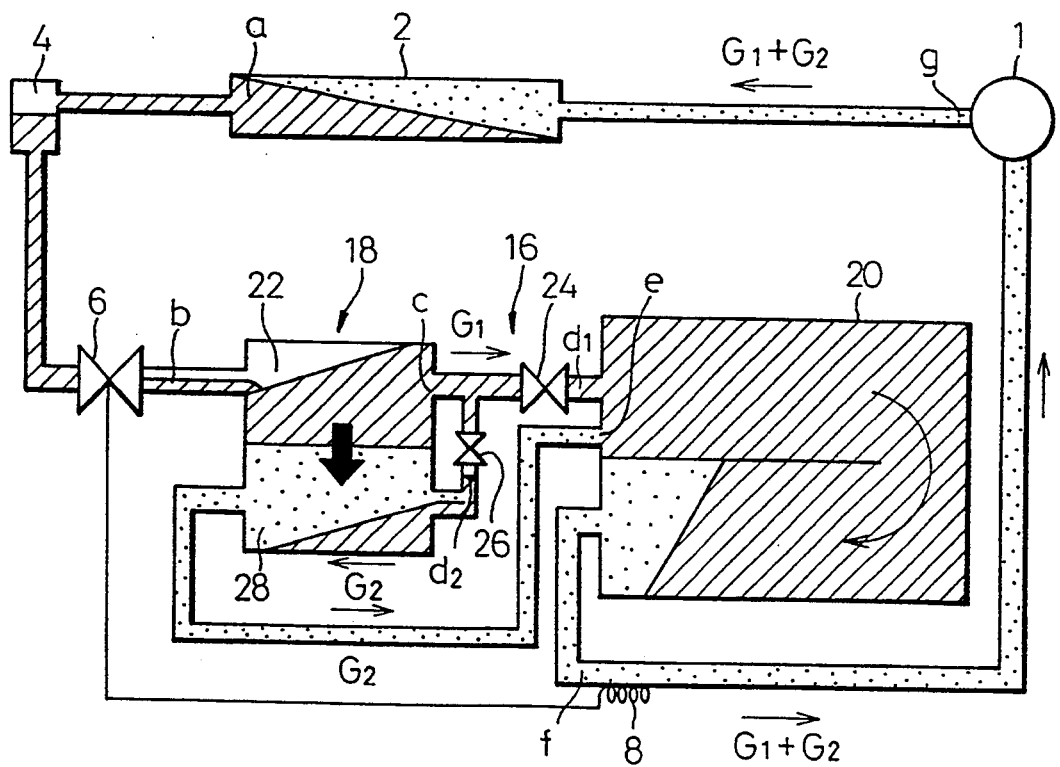
FIG. 1 is a schematic structural view of a refrigeration cycle to which an evaporator for a cooling apparatus of a first embodiment of the present invention is applied.

FIG. 1 is a schematic structural view of a refrigeration cycle to which an evaporator of a first embodiment of the present invention is applied. Reference numeral 1 is a compressor. When used for a vehicle, the compressor 1 is driven to rotate by a not illustrated internal combustion engine. The connections are made so that the compressor 1 compresses the refrigerant in the state of a gas and sends the same to the condenser 2, and the condenser 2 cools this refrigerant by external air and sends the same to a receiver 4 as a refrigerant in the state of a liquid.

Figure 2:
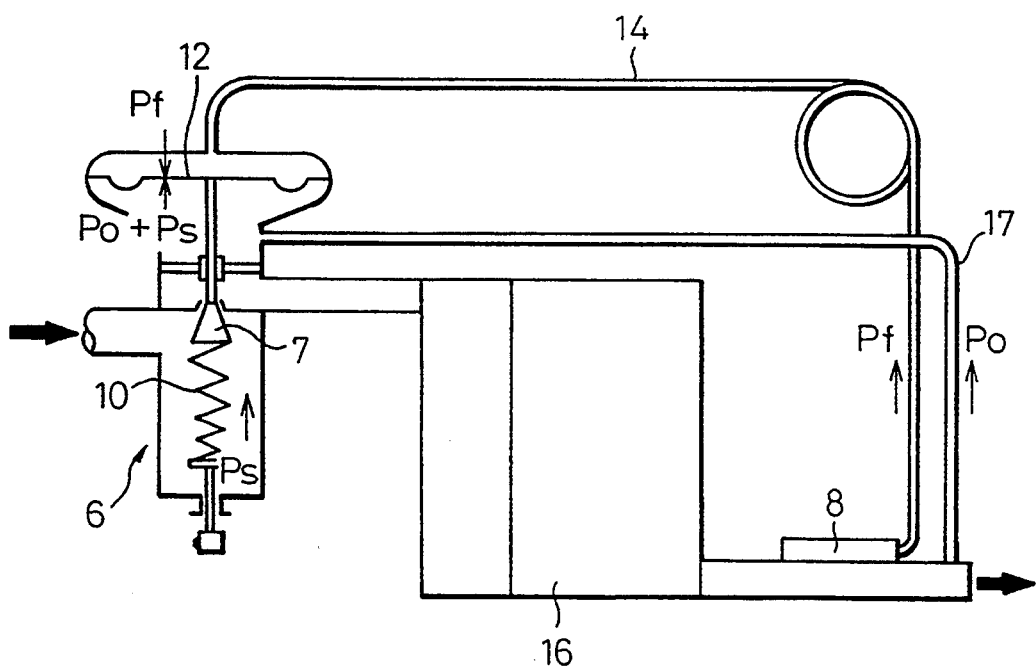
FIG. 2 is a schematic structural view of an expansion valve of the first embodiment.

The receiver 4 temporarily stores the refrigerant and, at the same time, removes the dust or water content in it. Then, the refrigerant discharged from the receiver 4 is sent to an expansion valve 6. The expansion valve 6 reduces the pressure of the sent refrigerant. Also, this expansion valve 6 has a structure such that the degree of opening can be adjusted by the movement of a valve needle 7 as shown in FIG. 2.

In this expansion valve 6, the valve needle 7 is urged in a valve opening direction by a biasing force Ps by a spring 10. At the same time, one end of the valve needle 7 is engaged with a diaphragm 12. Further, it is provided with a temperature sensing tube 8 provided on the downstream side of the evaporator 16, mentioned later, and is constituted so that when the refrigerant temperature on downstream side of the evaporator 16 rises, the pressure Pf in the temperature sensing tube 8 rises, that is, when the cooling load is increased, this pressure Pf acts upon one side of the diaphragm 12 via a capillary tube 14 and moves the valve needle 7 in the valve opening direction, so that the degree of opening is adjusted so that the amount of the refrigerant becomes larger.

Also, the expansion valve 6 is provided with a pressure detection pipe 17 introducing the refrigerant pressure P0 on the downstream side of the evaporator 16 to the other side of the diaphragm 12 and is constituted so that the degree of opening by the valve needle 7 compensates for the refrigerant pressure and refrigerant temperature on the downstream side of the evaporator 16 by a balance among the biasing force Ps of the aforesaid spring 10, the pressure P0 from the pressure detection pipe 17, and the pressure Pf from the capillary tube 14 (Pf=Ps+P0).

These are connected so that the refrigerant discharged from the aforesaid expansion valve 6 is sent to the evaporator 16, evaporated by absorbing heat from the air by the evaporator 16 to become a gaseous state refrigerant, and is sucked into the compressor 1. Also, this air passes through the evaporator 16, is cooled, and fed into the vehicle.

The aforesaid evaporator 16 is provided with a heat exchanging unit 18 and an evaporating unit 20. The heat exchanging unit 18 is provided with a passageway 22 to be cooled, connected to the expansion valve 6. A first throttle 24 is provided on an outlet side of this passageway 22 to be cooled. A cooling passageway 28 is provided branched on the slightly upper stream side from this first throttle 24 from the cooling passageway 22 and via a second throttle 26.

The aforesaid first throttle 24 and second throttle 26 are constituted so as to reduce the pressure of the refrigerant passing therethrough. At the same time, they are set in degree of opening so that the amount of the refrigerant flowing into the cooling passageway 28 becomes about 30 to 40 percent. The passageway 22 to be cooled and the cooling passageway 28 are arranged so that heat exchange is possible therebetween.

Figure 3:
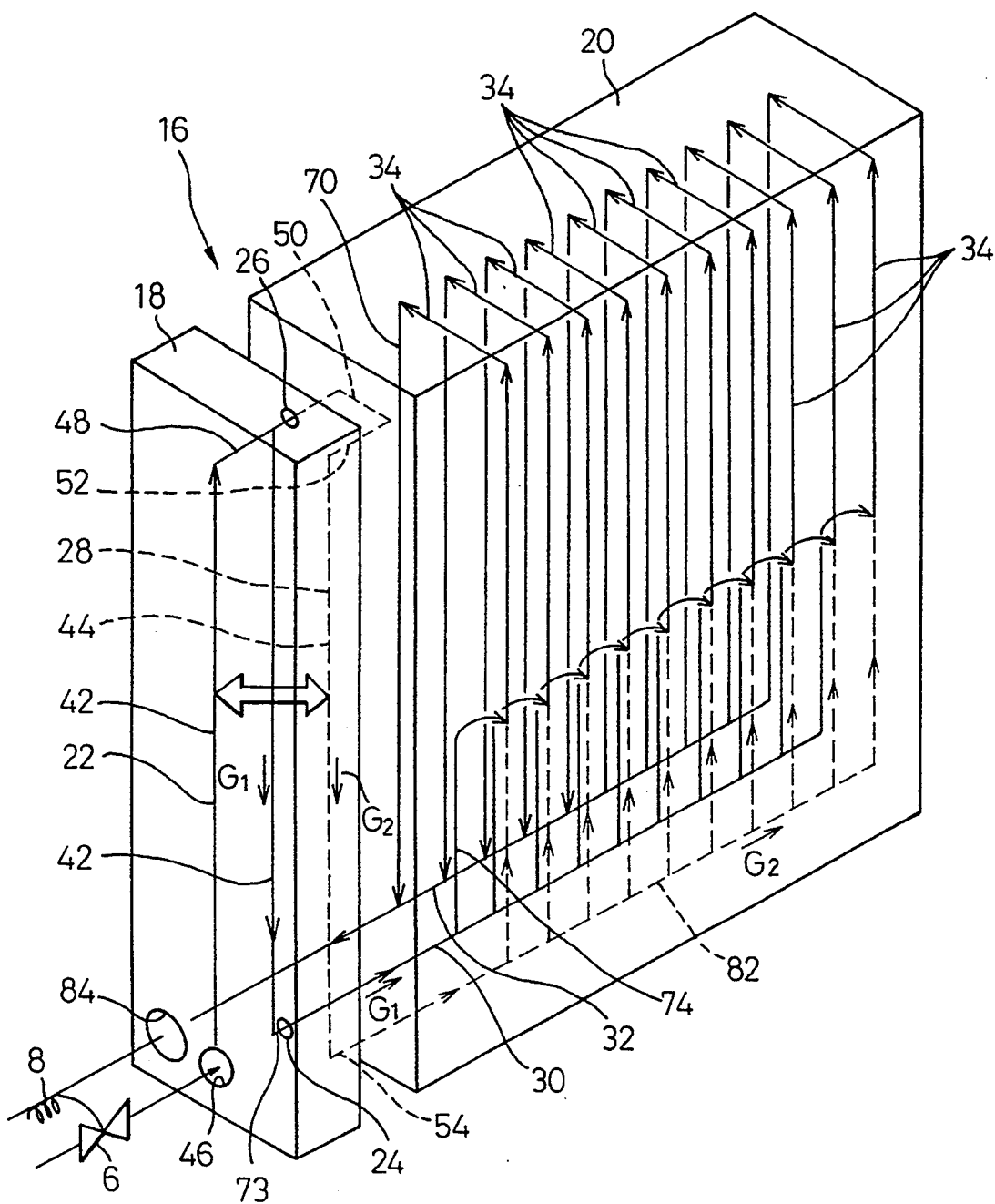
FIG. 3 is a perspective view showing the schematic structure of the evaporator of the first embodiment.

On the other hand, the aforesaid evaporator 20 is provided with, as shown in FIG. 3, an inlet passageway 30 connected to the passageway 22 to be cooled via the first throttle 24 and is constituted so that a refrigerant G1 reduced in pressure by the first throttle 24 is supplied thereto. Then, a plurality of refrigerant passageways 34 communicating this inlet passageway 30 with the outlet passageway 32 are formed and connected in parallel.

Moreover, these are connected so that also the refrigerant G2 passing through the cooling passageway 28 is supplied to the above-described respective plurality of refrigerant passageways 34. Heat exchange is carried out between these refrigerants G1 and G2 and the air of surface of the evaporating unit 20, the refrigerant is evaporated while absorbing the heat from the air, is further heated to become a superheated vapor, and is sucked from the outlet passageway 32 into the aforesaid compressor 1.

An explanation will be made next of a concrete construction of the evaporator 16 of the first embodiment by FIGS. 4 to 9.

The heat exchanging unit 18 is constituted so that a plurality of sets of first and second plates 38 and 40 are stacked between the first and second side plates 34 and 36, the two plates of the sets of plates 38 and 40 exhibit symmetrical shapes.

Figure 7:
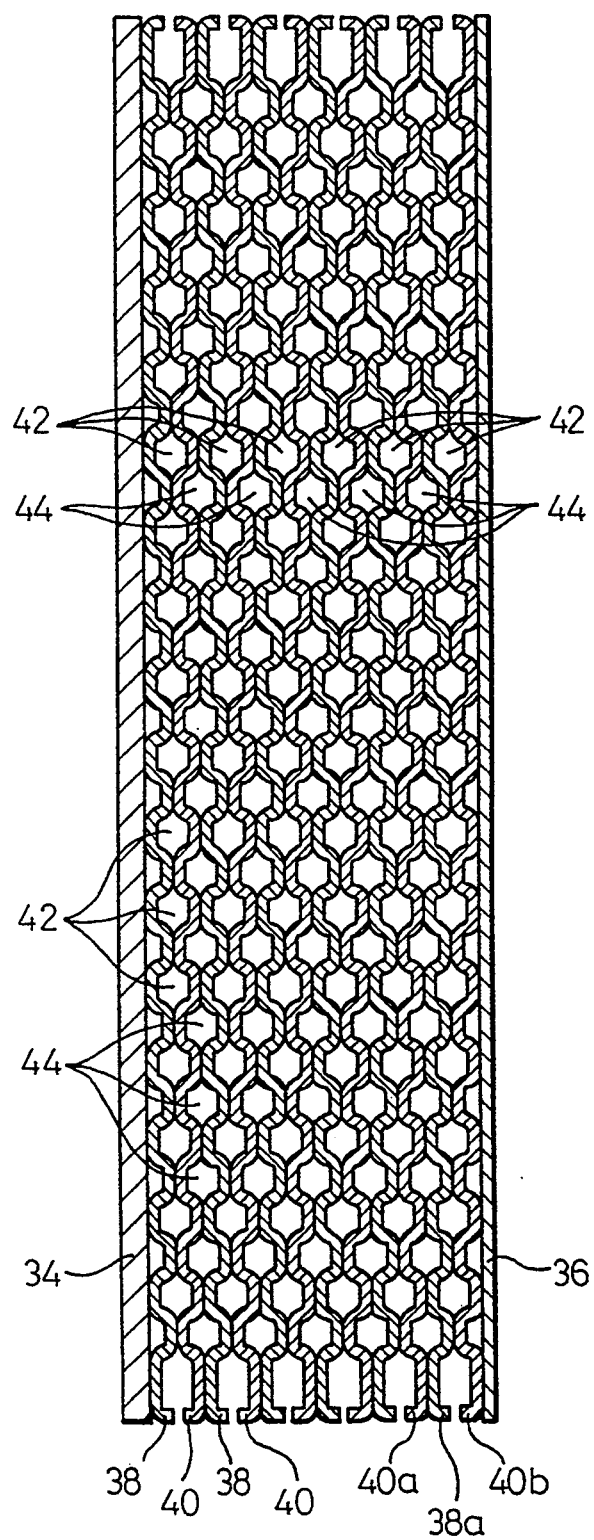
FIG. 7 is an enlarged cross-sectional view taken along line VII—VII in FIG. 5.
Figure 8:
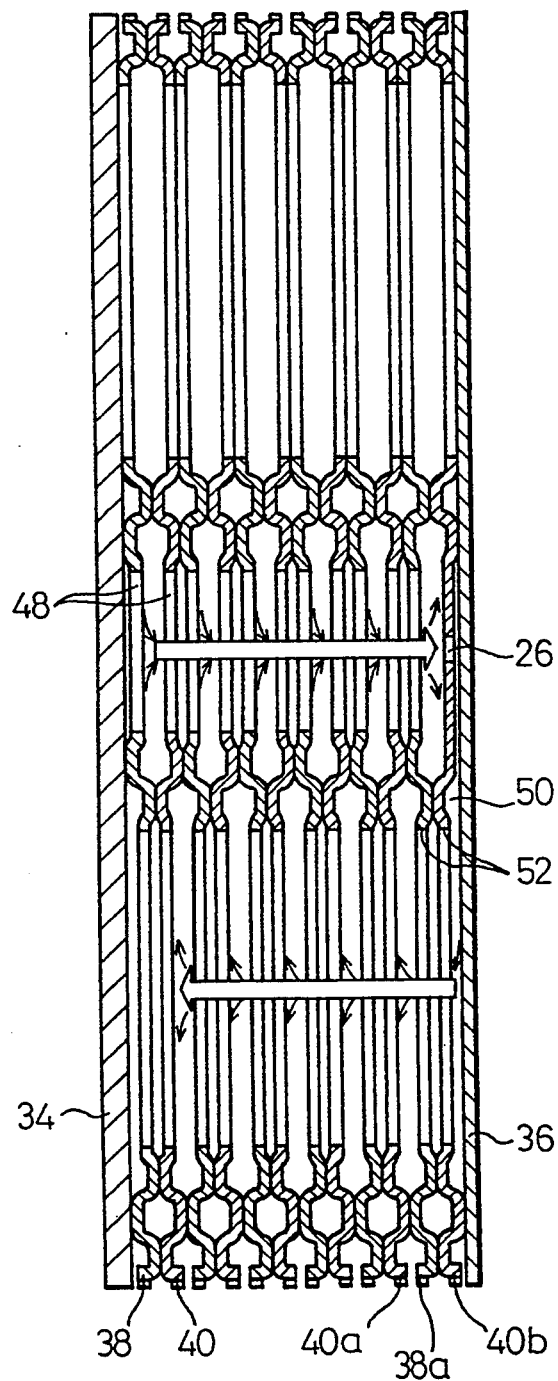
FIG. 8 is an enlarged cross-sectional view taken along line VIII—VIII in FIG. 5.

In the first and second plates 38 and 40, a large number of corrugations are formed, and a large number of first passageways 42 are formed between the inside of the first plate 38 and the inside of the second plate 40 by stacking the corrugations as shown in FIG. 7. Also, similarly, a large number of second passageways 44 are formed also between the outside of the second plate 40 and the outside of the first plate 38.

Figure 5:
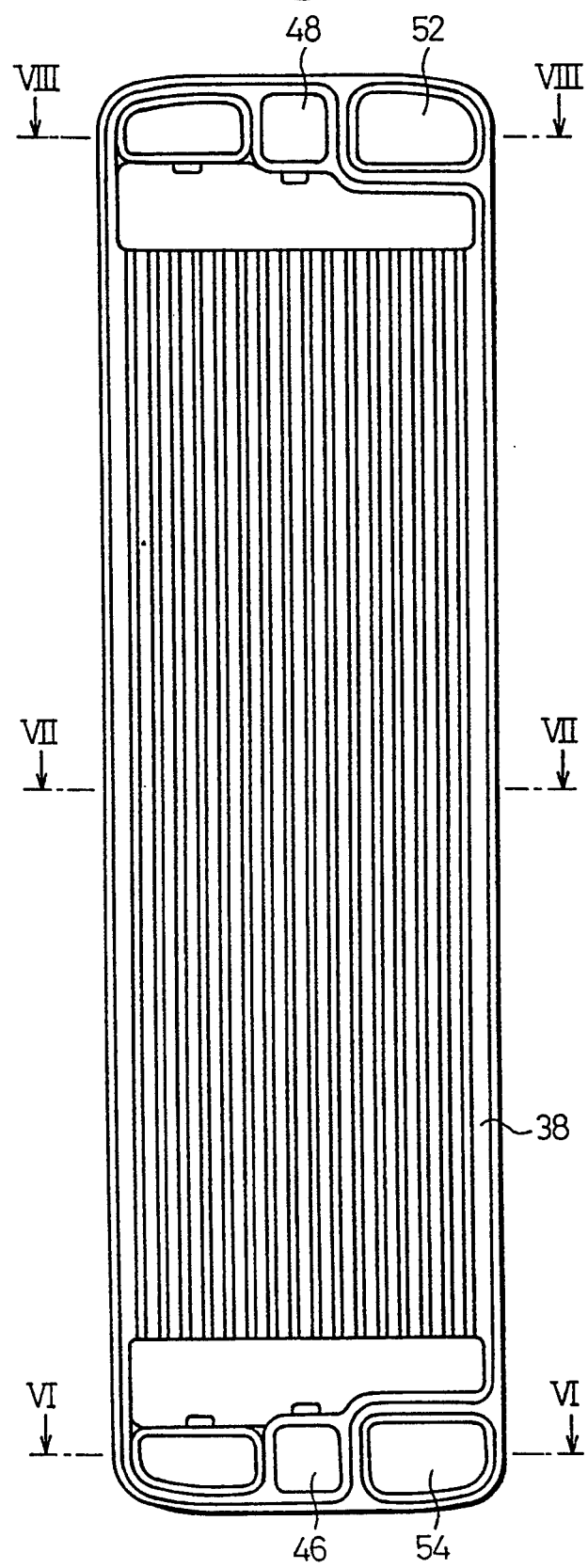
FIG. 5 is an enlarged cross-sectional view taken along line V—V in FIG. 4.
Figure 6:
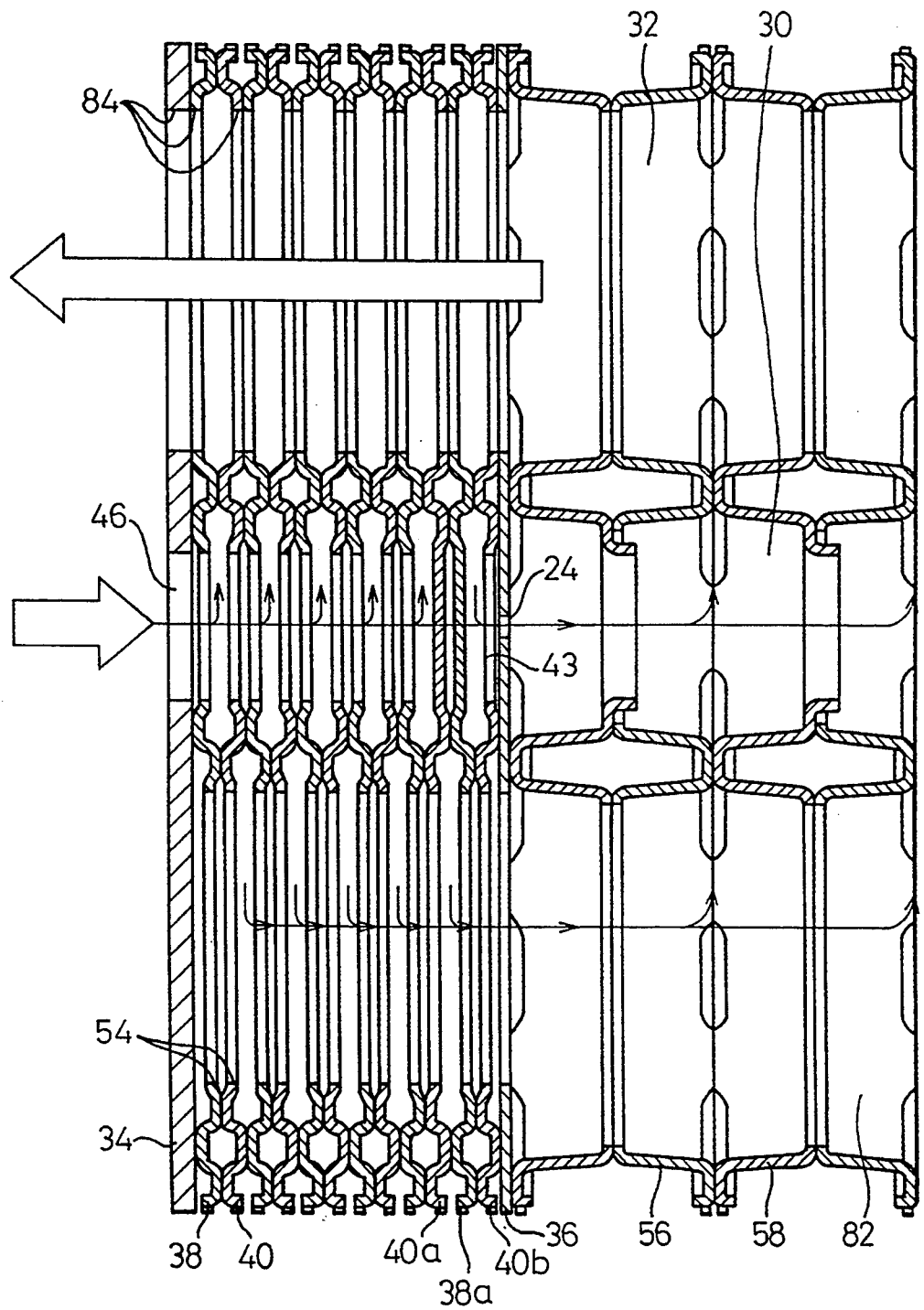
FIG. 6 is an enlarged cross-sectional view taken along line VI—VI in FIG. 5.

As shown in FIGS. 5 and 6, inflow holes 46 are formed at the bottom center of the first side plate 34 and some of the first and second plates 38 and 40 communicated with this first side plate 34. Also, as shown in FIG. 6, an inflow hole 46 is not formed in some first and second plates 38a and 40a existing on the second side plate 36 side.

The inflow hole 46 is constituted so as to be communicated with part of the aforesaid first passageway 42. The first passageway 42 is connected to the first communication hole 48 formed at the top center of the first and second plates 38 and 40. This first communication hole 48 is communicated with a part of the first passageway 42 between the first plate 38a and second plate 40b existing on the second side plate 36 side.

A part of this first passageway 42 is communicated with the through hole 43 formed at the bottom of the second plate 40b. The through hole 43 is communicated with a first throttle 24 formed in the second side plate 36. A passageway 22 to be cooled as shown in FIG. 3 is formed by the aforesaid inflow hole 46, first passageway 42, first communication hole 48, first passageway 42, through hole 73, and the first throttle 24.

Further, in the second plate 40b, which is communicated with the first communication hole 48 and in contact with the second side plate 36, a second throttle 26 is formed. The refrigerant passed through the second throttle 26 passes through a third passageway 50 formed between the second side plate 36 and the second plate 40 and flows into the second communication hole 52 formed in the first and second plates 38 and 40.

This second communication hole 52 is communicated with the second passageway 44. The second passageway 44 is communicated with a third communication hole 54 formed on the bottom of the first and second plates 38 and 40 and the second side plate 36. A cooling passageway 28 as shown in FIG. 3 is formed by the aforesaid second throttle 26, third passageway 50, second passageway 44, second communication hole 52, and the third communication hole 54.

Figure 9:
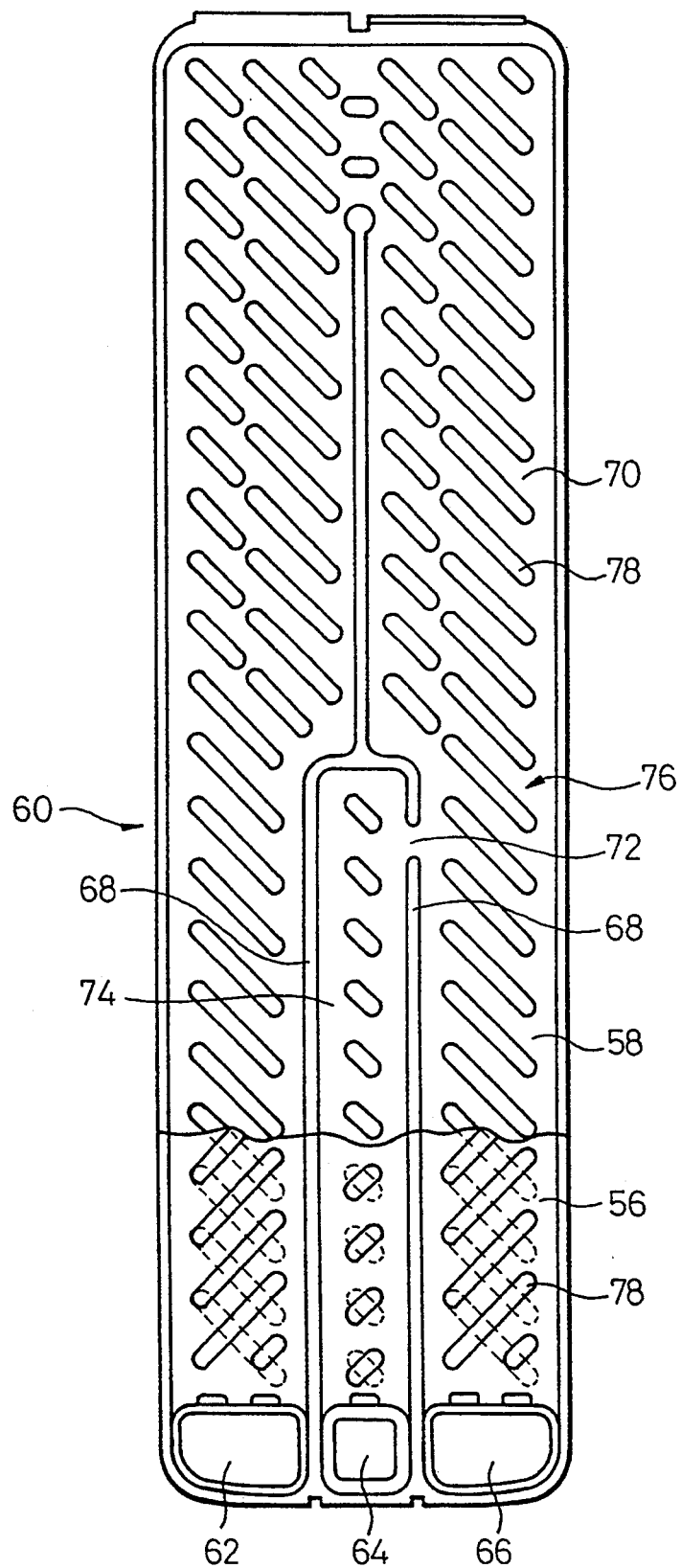
FIG. 9 is an enlarged front view of a core of the first embodiment.

On the other hand, in the evaporator 20, as shown in FIG. 9, a core 60 is formed by one set of core plates 56 and 58. The core plates 56 and 58 exhibit symmetrical shapes, concaved at the center thereof, and have outlet holes 62, inlet holes 64, and inflow holes 66 formed at the bottoms thereof in a parallel arrangement.

Partition walls 68 are formed on the two sides of each inlet hole 64 so as to partition the space almost parallel toward the other end. The front ends thereof are joined midway to form one partition wall 68. By this, a first refrigerant passageway 70 having an inverse U-character shape communicating the outlet hole 62 with the inflow hole 66 is formed.

Also, a second refrigerant passageway 74 communicated with the inlet hole 64 is formed surrounded by a partition wall 68. A recess 72 is formed in a part of the partition wall 68, so that the second refrigerant passageway 74 and the first refrigerant passageway 70 are communicated. A refrigerant passageway 34 is formed by these first refrigerant passageway 70, recess 72, and the second refrigerant passageway 74.

Note that, in the first embodiment, so as to promote the heat exchange, a large number of small projections 78 are formed in the two core plates 56 and 58 in directions reverse to each other.

Figure 4:
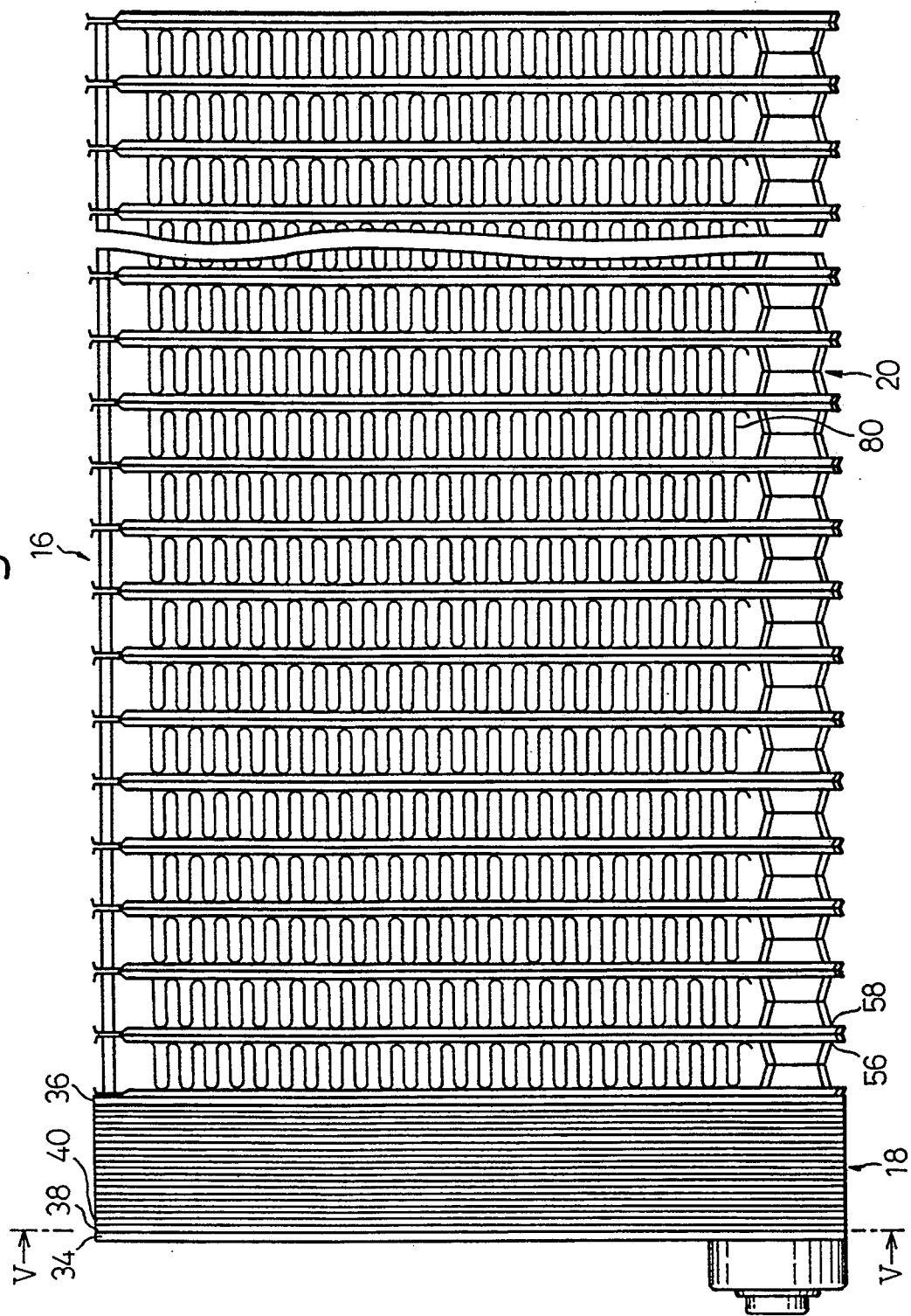
FIG. 4 is a side view of the evaporator of the first embodiment.

A plurality of cores 60 formed in this way are integrally bonded by brazing while being interposed by fins 80 as shown in FIG. 4. By this, a plurality of inlet holes 64 are connected to form an inlet passageway 30, and a plurality of outlet holes 62 are connected to form an outlet passageway 32. Also, similarly, a plurality of inflow holes 66 are connected to form an inflow passageway 82.

Further, the inlet passageway 30 is communicated with the first throttle 24 of the heat exchanging unit 18, and the inflow passageway 82 is communicated with a third communication hole 54 of the heat exchanging unit 18. The outlet passageway 32 is communicated with an outflow hole 84 formed in the heat exchanging unit 18. These are connected so that the refrigerant fed out from this outflow hole 84 is sucked into the compressor 1.

An explanation will be made next of the operation of the evaporator of the first embodiment mentioned before, together with the operation of the refrigeration cycle.

Figure 11:
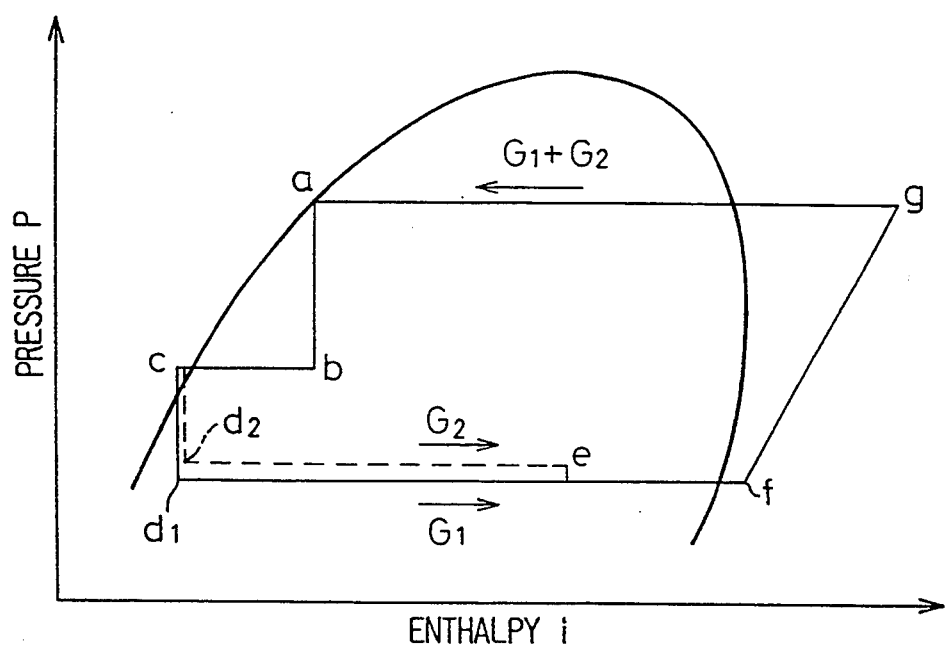
FIG. 11 is a Mollier diagram of the first embodiment.

First, the refrigeration cycle of cooling in the summer season will be explained together with the Mollier diagram shown in FIG. 11. The gaseous state refrigerant is sucked by the drive of the compressor 1, compressed (between a point f and point g), and sent to the condenser 2. In the condenser 2, heat exchange is carried out between the refrigerant and air. A high temperature refrigerant is cooled by the air (between the point g and point a) and sent as a liquid state refrigerant to the receiver 4.

The refrigerant sent to the receiver 4 is temporarily collected and sent to the expansion valve 6. The degree of opening of the expansion valve 6 is adjusted by a balance among the pressure Pf of the heat sensing tube 8 detected via the capillary tube 14 on the downstream side of the evaporator 16, the biasing force Ps of the spring 10, and the refrigerant pressure P0 on the downstream side of the evaporator 16 detected via the pressure detection pipe 17.

The refrigerant passed through the expansion valve 6 is adjusted in its flow rate and, at the same time, reduced in pressure in accordance with its degree of opening (between point a–point b) and sent to the inflow hole 46 of the evaporator 16. The refrigerant flowing into the inflow hole 46 rises along the first passageway 42 and reaches the first communication hole 48. Thereafter, it moves downward again along the first passageway 42 and is sent from the heat exchanging unit 18 to the inlet passageway 30 of the evaporator 20 via the through hole 73 and the first throttle 24 (between point b–point c–point d1).

On the other hand, a part G2 of the refrigerant reaching the first communication hole 48 (about 30 to 40 percent based on the amount of refrigerant in the present embodiment) passes through the second throttle 26 (between point c–point d2), passes through the third passageway 50, and flows into the second communication hole 52. Then, it flows into the second passageway 44, goes downward along the second passageway 44, and then passes through the third communication hole 54 and is sent to the inflow passageway 82 of the evaporating unit 20.

This part G2 of the refrigerant is reduced in pressure by passing through the second throttle 26 (between point c–point d2), and therefore this part G2 of the refrigerant becomes low in temperature. Heat exchange is carried out between the same and the refrigerant passing through the first passageway 42 when passing through the second passageway 44 (G1+G2). By this, the part G2 of the refrigerant is heated when passing through the second passageway 44 (between point d2–point e), is evaporated, becomes a superheated vapor, and absorbs the heat from the refrigerant of the first passageway 42 (G1+G2), so that the refrigerant of the first passageway 42 (G1+G2) is cooled (between point b–point c), and the refrigerant which has become a gas-liquid two-phase state by passing through the expansion valve 6 is made a liquid state refrigerant.

In this way, the part G1 of the refrigerant which passes through the passageway 22 to be cooled and changed to the single liquid phase state partially passes through the first throttle 24 (between point c–point d1) to be reduced in pressure and is sent to the inlet passageway 30 of the evaporating unit 20. Also, the part G2 of the refrigerant passing through the cooling passageway 28 undergoes heat exchange and is sent to the inflow passageway 82 of the evaporating unit 20.

First, the part G1 of the refrigerant sent to the inlet hole 64 of the evaporator 20 passes through the inlet passageway 30 and is divided to second refrigerant passageways 74. At this time, since the refrigerant has a single phase state, i.e., liquid state, even if a throttle is not provided for distribution etc., the refrigerant is substantially uniformly distributed to the second refrigerant passageways 74. Then, this refrigerant passes through the second refrigerant passageways 74, flows from the recesses 72 into the first refrigerant passageways 70, and then is sent to the outlet passageways 32s.

Also, the part G2 of the refrigerant sent to the inflow hole 66 of the evaporating unit 20 passes through the inflow passageway 82 and is divided to the first refrigerant passageways 70. This refrigerant has a larger degree of dryness by the heat exchange, and the substantially gaseous state refrigerant is almost equally distributed to the first refrigerant passageways 70. Then, it is combined with the part G1 of the liquid state refrigerant passed through the recesses 72 in the first refrigerant passageways 70 and sent to the outlet passageway 32.

When the refrigerant exists in the refrigerant passageways 34, the heat exchange is carried out between the refrigerants (G1+G2) and air via the cores 60, and the air to be fed into the vehicle is cooled (one refrigerant G1 is between the point d1 and point f and the other refrigerant G2 is between the point e and point f). At this time, the refrigerants (G1+G2) are uniformly distributed to the refrigerant passageways 34, and the part G1 of the liquid state refrigerant which particularly greatly contributes to the cooling is uniformly distributed, and therefore the occurrence of uneven cooling in the air passing between the cores 60 can be prevented.

Note that the expansion valve 6 is adjusted in its degree of opening so that the refrigerant pressure P0 downstream of the evaporator 16 is detected via the pressure detection pipe 17 and compensates for the refrigerant pressure and refrigerant temperature at the point f on the downstream side of the evaporator 16. Accordingly, even if the first throttle 24 and second throttle 26 are provided in the evaporator 16, the degree of opening of the expansion valve 6 is adjusted, and therefore the reduction of pressure between the point a and point b is carried out in the expansion valve 6, the reduction of pressure between the point c and point d1 is carried out in the first throttle 26, and the reduction of pressure between the point c and point d2 is carried out in the second throttle 26.

If the refrigeration cycle is a cycle that uses the expansion valve 6 which detects the refrigerant pressure downstream of the evaporator 16 and adjusted in its degree of opening, the already provided evaporator thereof can be replaced with the evaporator 16 of the present embodiment mentioned before and the aforementioned refrigeration cycle can be executed after the exchange.

On the other hand, in the air-conditioning in vehicles in recent years, even in the winter season, after the refrigeration cycle is operated and the moisture is eliminated, heating is carried out by a not illustrated heater. Where the air temperature passing through the condenser 2 is low, i.e., 0° to 10° C. as in the case of the winter season, the liquidization of refrigerant in the condenser 2 is excessively promoted, the refrigerant collects in the condenser 2, and the amount of refrigerant supplied to the evaporator 16 is reduced. Also, in a transitory operation state such as the start of operation, the amount of refrigerant in the receiver 4 is insufficient, and the amount of refrigerant supplied to the evaporator 16 becomes smaller.

Figure 12:
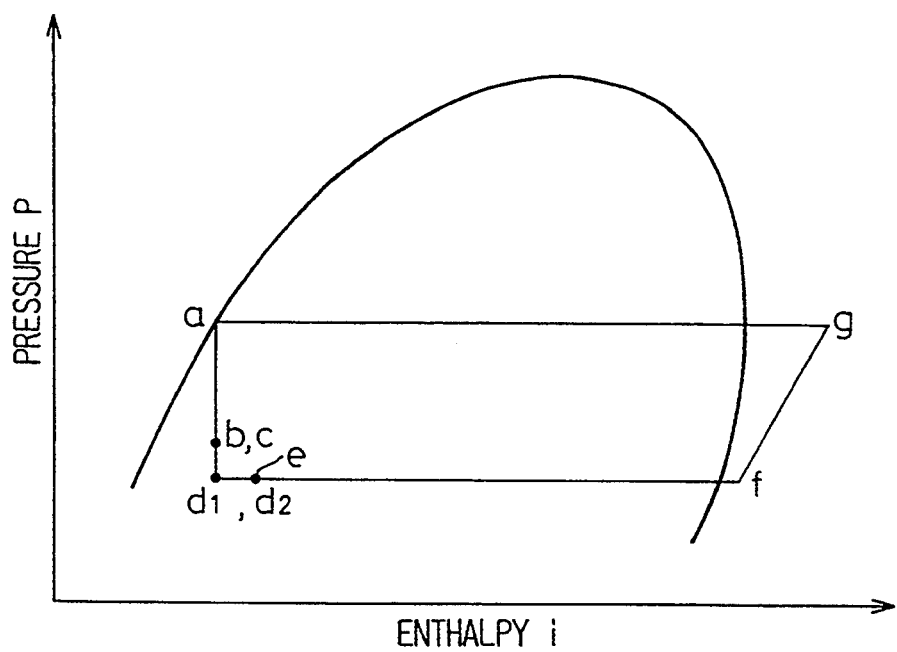
FIG. 12 is a Mollier diagram in a state where the amount of the refrigerant of the first embodiment is small.

In such a case, in the first embodiment, as in the Mollier diagram shown in FIG. 12, the refrigerant compressed in the compressor 1 (between point f–point g) is sent to the condenser 2 and is subject to heat exchange so that the refrigerant is cooled and made to become a liquid state refrigerant (between point g–point a). However, the temperature of the external air is low in the condenser 2, and therefore the liquidization is promoted, the refrigerant tends to collect, and the pressure at the outlet of the condenser 2 becomes low.

The liquidized refrigerant passes through the receiver 4, is reduced in pressure by the expansion valve 6 (between point a–point b), and is sent to the passageway 22 to be cooled. Thereafter, the part G2 of the refrigerant is sent to the cooling passageway 28 via the second throttle 26. That refrigerant passes through the cooling passageway 28 and is sent to the inflow passageway 82 of the evaporating unit 20.

At this time, the pressure of the supplied refrigerant is low and the reduction of pressure at the second throttle 26 is not sufficiently carried out (between point c–point d2), and therefore the refrigerant does not becomes a sufficiently low temperature, and a sufficient temperature difference for performing the heat exchange between the passageway 22 to be cooled and the cooling passageway 28 cannot be obtained. This part G2 of the refrigerant G2 has almost no relevance to the heat exchange (between point d2–point e) and is sent to the inflow passageway 82 of the evaporating unit 20.

Also, the part G1 of the refrigerant of the passageway 22 to be cooled is reduced in pressure by the first throttle 24 (between point b–point d1) and sent to the inlet passageway 30 of the evaporating unit 20. Then, the refrigerant flowing into the inlet passageway 30 and the inflow passageway 82 is sent to the refrigerant passageways 34 of the evaporating unit 20, performs the heat exchange with the air, and then passes through the outlet passageway 32 and is sent to the compressor 1.

In this way, where the amount of refrigerant supplied to the evaporator 16 is small, almost no heat exchange is carried out between the passageway 22 to be cooled and the cooling passageway 28. However, the air is cooled by the refrigerant (G1+G2) in the gas-liquid two-phase state sent to the evaporating unit 20, and the cooling is carried out, and therefore no lowering of performance of the evaporator 16 will result.

Figure 10:
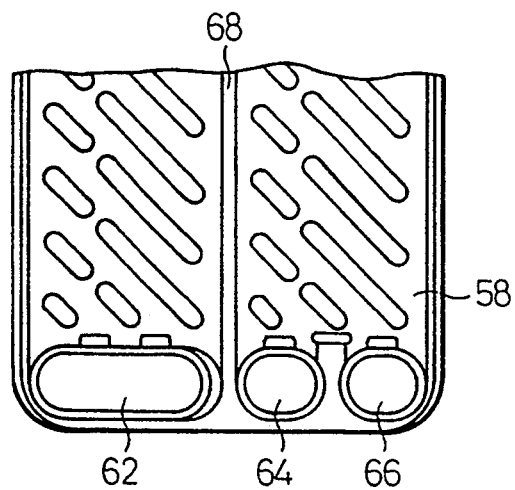
FIG. 10 is an enlarged front view of a part of a modified example of the core of the first embodiment.

Note that, it is also possible to execute the embodiment even if the partition wall 68 partitioning the inlet hole 64 and inflow hole 66 of the core 60 and a recess 72 mentioned before are not provided as shown in FIG. 10. Note, also in this case, it is necessary to separately provide the inlet hole 64 and inflow hole 66 through which the refrigerant flows into the evaporating unit 20. By separately providing the inlet hole 64 and inflow hole 66, the liquid state refrigerant G1 passed through the first throttle 24 is uniformly distributed to the refrigerant passageways 34, and if the gaseous state refrigerant G2 passed through the cooling passageway 28 is mixed therein in a stage of the inlet hole 64, it becomes not uniformly distributed to the refrigerant passageways 34.

Figure 13:
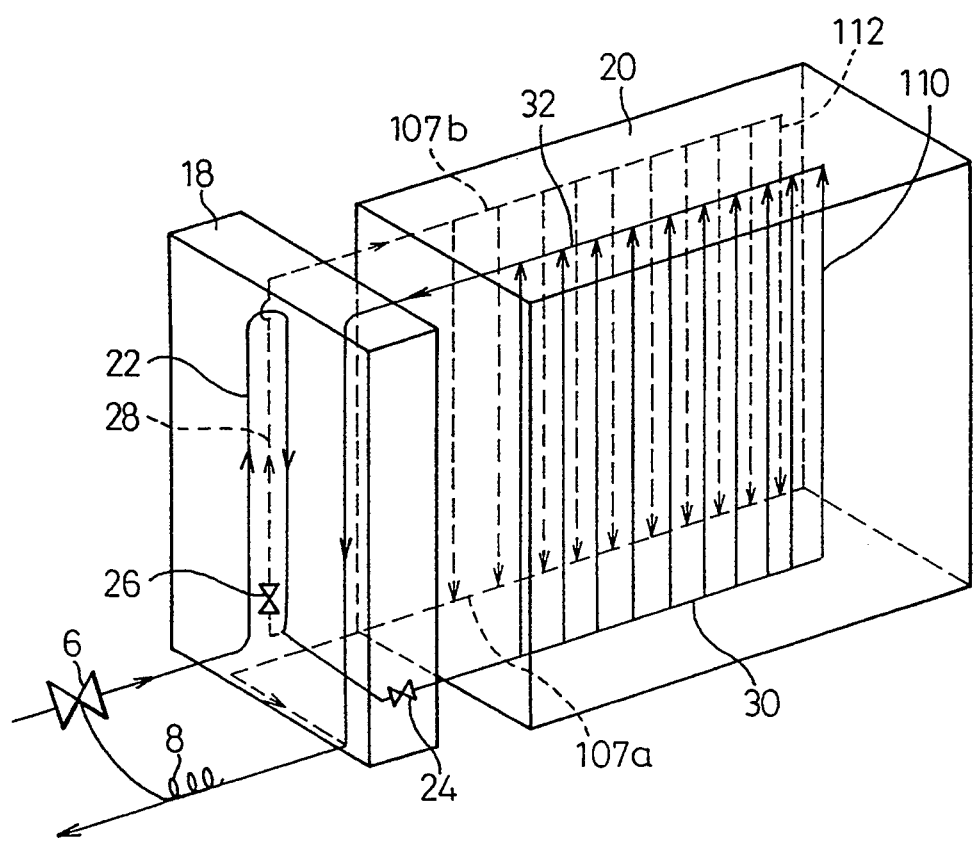
FIG. 13 is a perspective view showing a schematic structure of the evaporator of a second embodiment.
Figure 14:
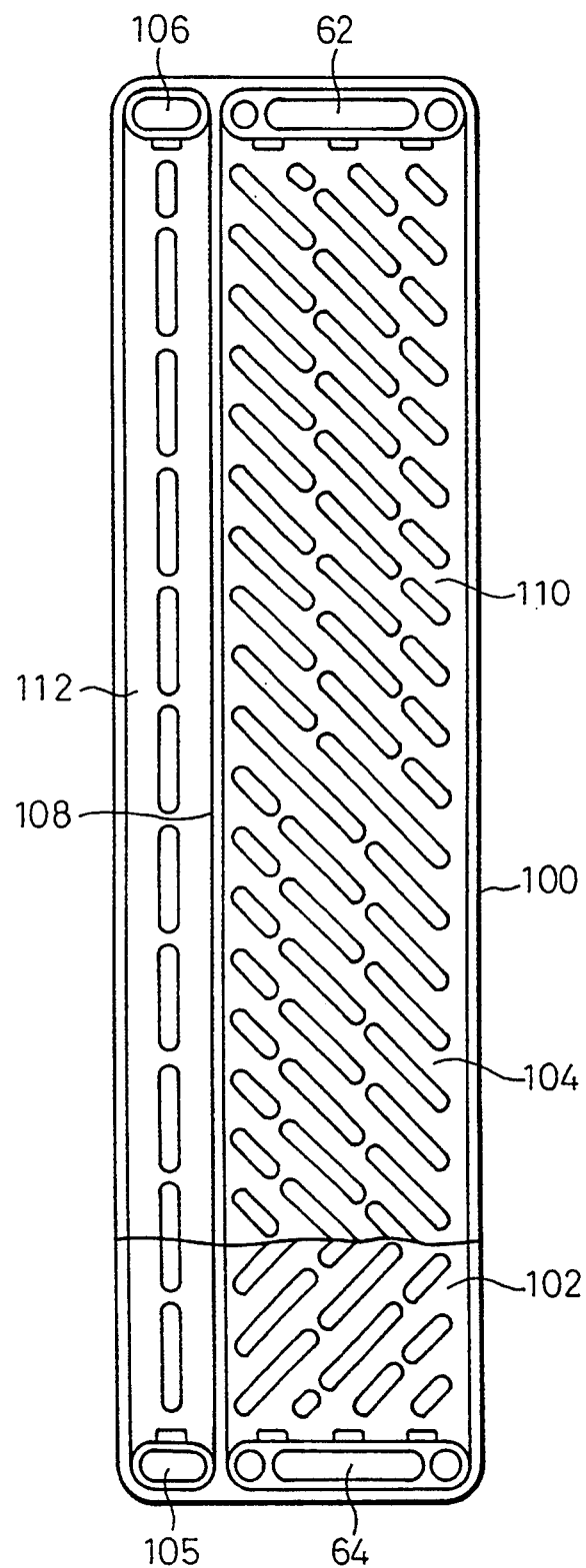
FIG. 14 is an enlarged front view of a core of the second embodiment.

An explanation will be made next of a second embodiment different from the aforementioned embodiment by FIGS. 13 and 14. Note that, the same members as those in the aforementioned embodiment are given the same numerals and a detailed explanation thereof will be omitted. The same applies to the other embodiments.

This second embodiment differs in the structure of the core 100 of the evaporating unit 20. An inlet hole 64 and an outflow hole 105 are formed on the bottom of each set of core plates 102 and 104. An outlet hole 62 and an inflow hole 106 are formed the the top. The centers of the core plates 102 and 104 are concaved and, at the same time, completely partitioned by the partition wall 108, and sectioned to a liquid state refrigerant passageway 110 and a gaseous state refrigerant passageway 112, respectively.

The outflow hole 105 and inflow hole 106 are communicated by the gaseous state refrigerant passageway 112, and the inlet hole 64 and outlet hole 62 are communicated by the liquid state refrigerant passageway 110. A plurality of cores 100 are stacked sandwiching fins therebetween, to form the inlet passageway 30 by the inlet holes 64, and form the outlet passageway 32 by the outlet holes 62. Also, it forms the outflow passageway 107a by the outflow holes 105 and the inflow passageway 107b by the inflow holes 106. The outflow passageway 107a is connected to the outlet passageway 32.

By this, the liquid state refrigerant G1 passed through the first throttle 24 is supplied to the inlet passageway 30 and, at the same time, the refrigerant G2 passed through the cooling passageway 28 is supplied to the inflow passageway 107b. They are uniformly distributed to the liquid state refrigerant passageways 110 and the gaseous state refrigerant passageways 112 without mixing.

An explanation will be made next by FIGS. 15 to 17 of a third embodiment different in the treatment of the refrigerant passed through the cooling passageway 28.

In this third embodiment, the refrigerant G2 passed through the cooling passageway 28 is not returned to the evaporating unit 20, and the cooling passageway 28 is connected to the discharge passageway 114 between the evaporating unit 20 and the temperature sensing tube 8. By this, only the liquid state refrigerant G1 is supplied to the evaporating unit 20, distributed from the inlet passageway 30 to the refrigerant passageways 34, and sent to the outlet passageway 32. Then, it is sucked into the compressor 1 via the discharge passageway 114.

In this case, preferably the degree of opening of the second throttle 26 is set so that the refrigerant G2 passed through the cooling passageway 28 becomes a superheated vapor (point e) and is sent to the discharge passageway 114.

Figure 15:
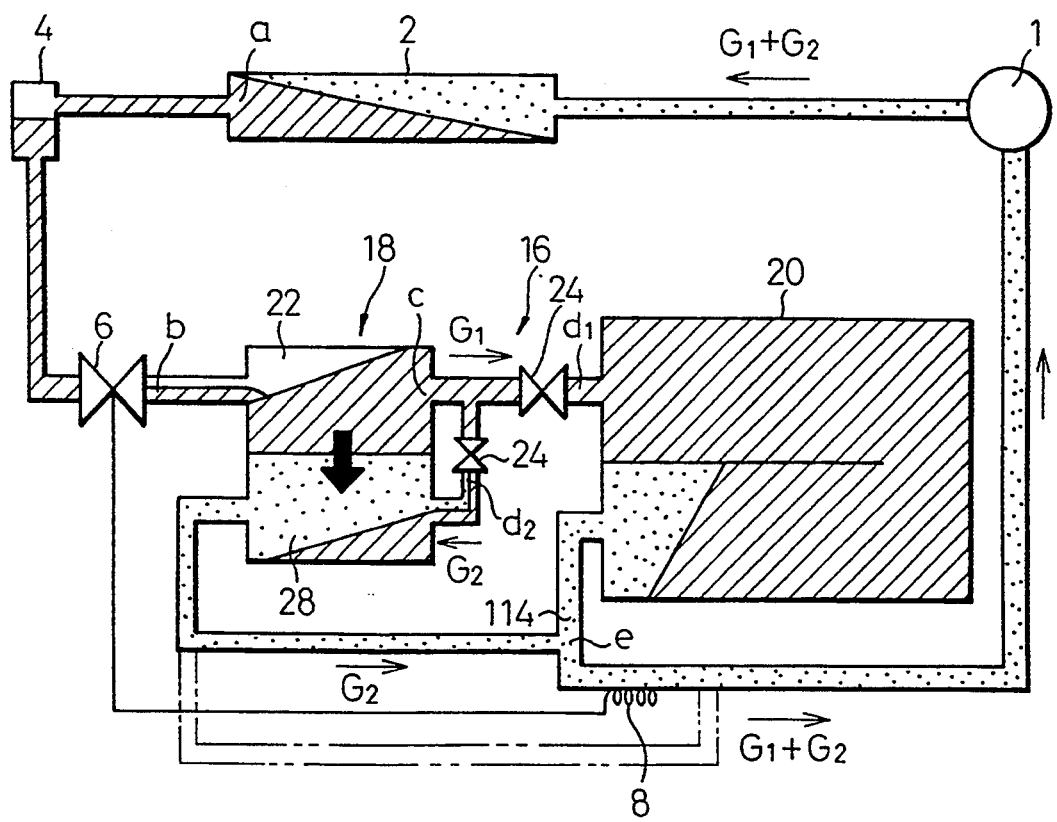
FIG. 15 is a schematic structural view of a refrigeration cycle to which an evaporator for a cooling apparatus of a third embodiment is applied.
Figure 16:
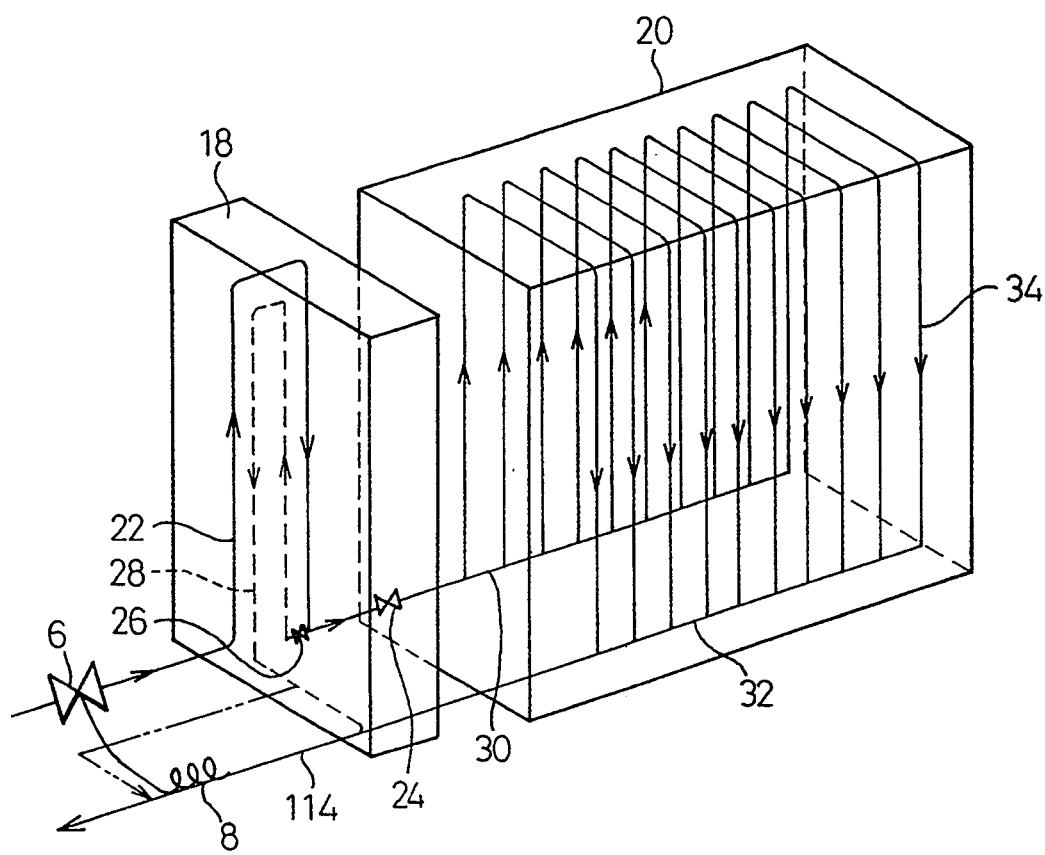
FIG. 16 is a perspective view showing a schematic structure of the evaporator of a third embodiment.
Figure 17:
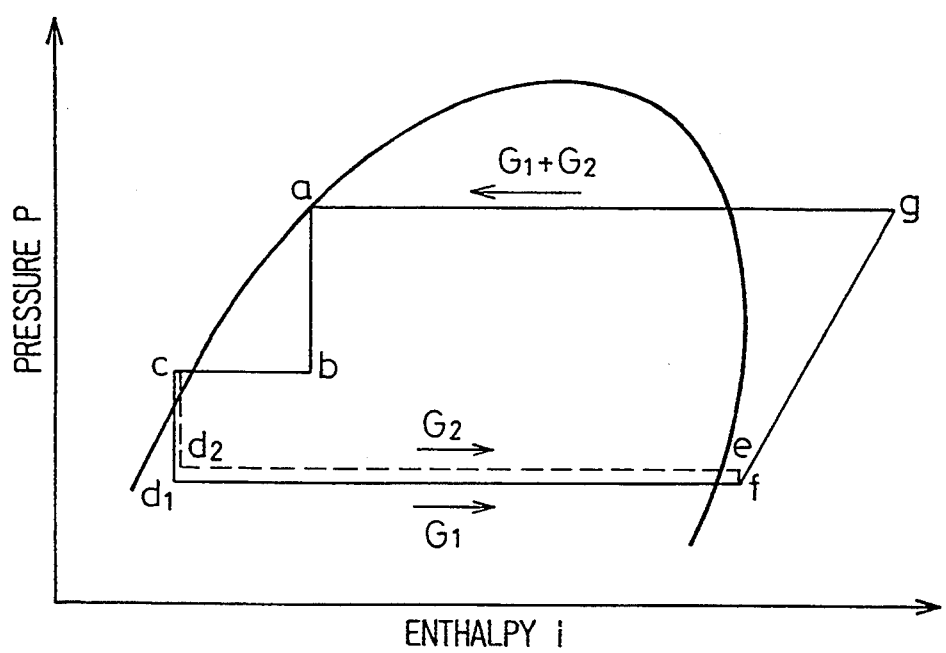
FIG. 17 is a Mollier diagram of the third embodiment.

Also, different from this third embodiment, it is also possible to execute this embodiment even if the cooling passageway 28 is connected to the discharge passageway 114 between the heat sensing cylinder 8 and the compressor 1 as indicated by the two dotted chain line in FIGS. 15 and 16. Note, in this case, it is necessary for the refrigerant G2 passed through the cooling passageway 28 to become a superheated vapor. This is because, if it is in the state where the liquid state refrigerant is mixed in, failure of the compressor 1 is caused.

Figure 19:
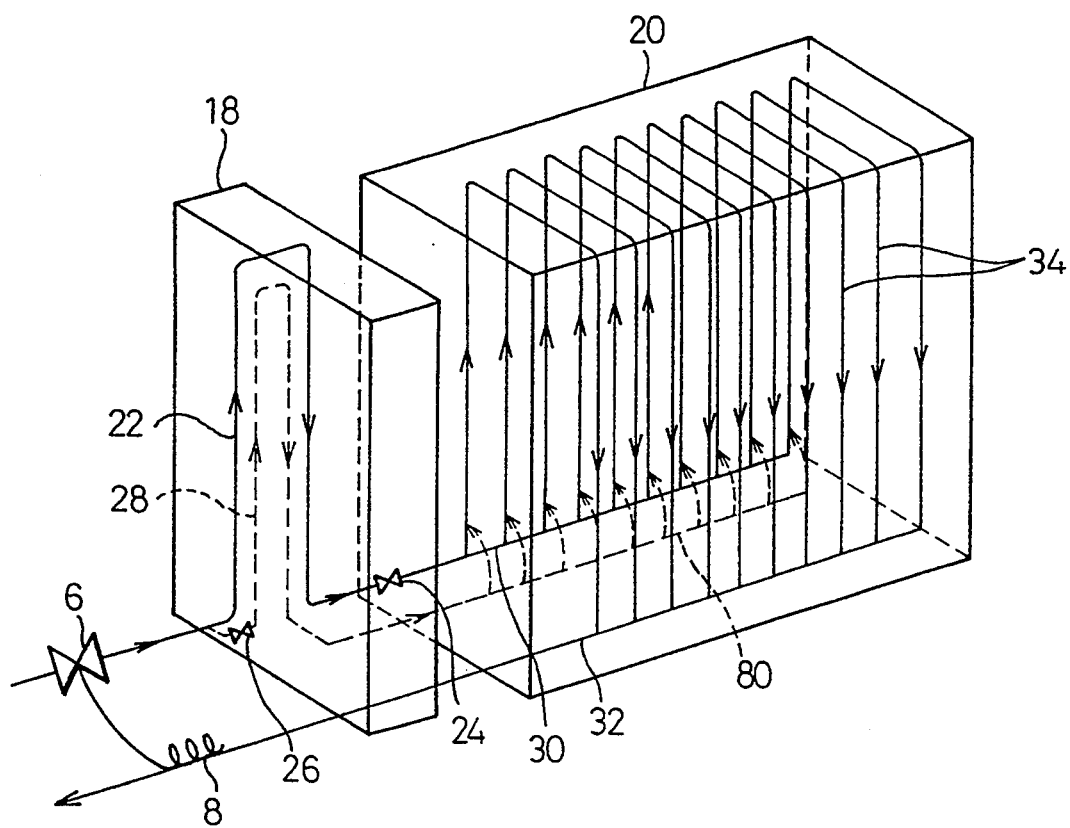
FIG. 19 is a perspective view showing a schematic structure of the evaporator of the fourth embodiment.
Figure 20:
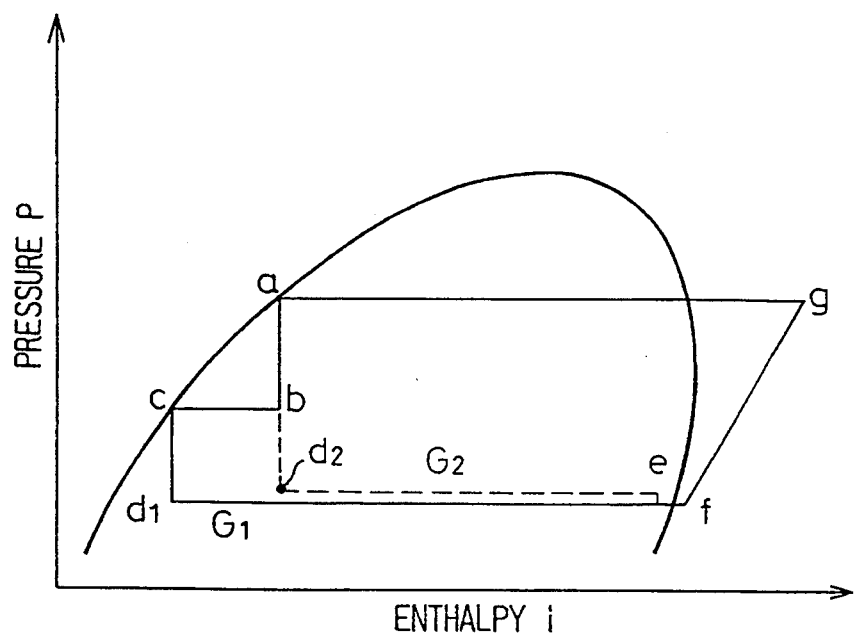
FIG. 20 is a Mollier diagram of the fourth embodiment.

Further, an explanation will be made by FIGS. 18 to 20 of a fourth embodiment different from the aforesaid embodiment in the position of introduction of the refrigerant into the cooling passageway 28.

In this fourth embodiment, the cooling passageway 28 is divided from the passageway 22 to be cooled immediately after the downstream side of the expansion valve 6 via the second throttle 26. The connection is made so that the refrigerant passed through the cooling passageway 28 is subjected to heat exchange between the same and the refrigerant of the passageway 22 to be cooled and then supplied to the evaporating unit 20. In the same way as in the aforementioned embodiments, it is then supplied for utilization of the heat exchange between the same and air.

The part G2 of the refrigerant supplied to the cooling passageway 28 is reduced in pressure by the second throttle (between point b-point d2), the heat exchange is carried out between the refrigerant G2 of this cooling passageway 28, the temperature of which becomes low, and the refrigerant G1 in the passageway 22 to be cooled (refrigerant G2 is between the point d2 and the point e, and the refrigerant G1 is between the point b and the point c), to liquidize the refrigerant G1 in the passageway 22 to be cooled.

In this case, the part G2 of the refrigerant supplied to the cooling passageway 28 is the refrigerant before the heat exchange is carried out between the passageway 22 to be cooled and the cooling passageway 28 and is a refrigerant in the gas-liquid two-phase state. Accordingly, the dividing of the refrigerant to the passageway 22 to be cooled and the cooling passageway 28 by the first throttle 24 and the second throttle 26 is not carried out in a correct proportion in some cases, and therefore the aforementioned embodiment is preferred, but also in the case of the present fourth embodiment, there is no problem in actual use.

Figure 18:
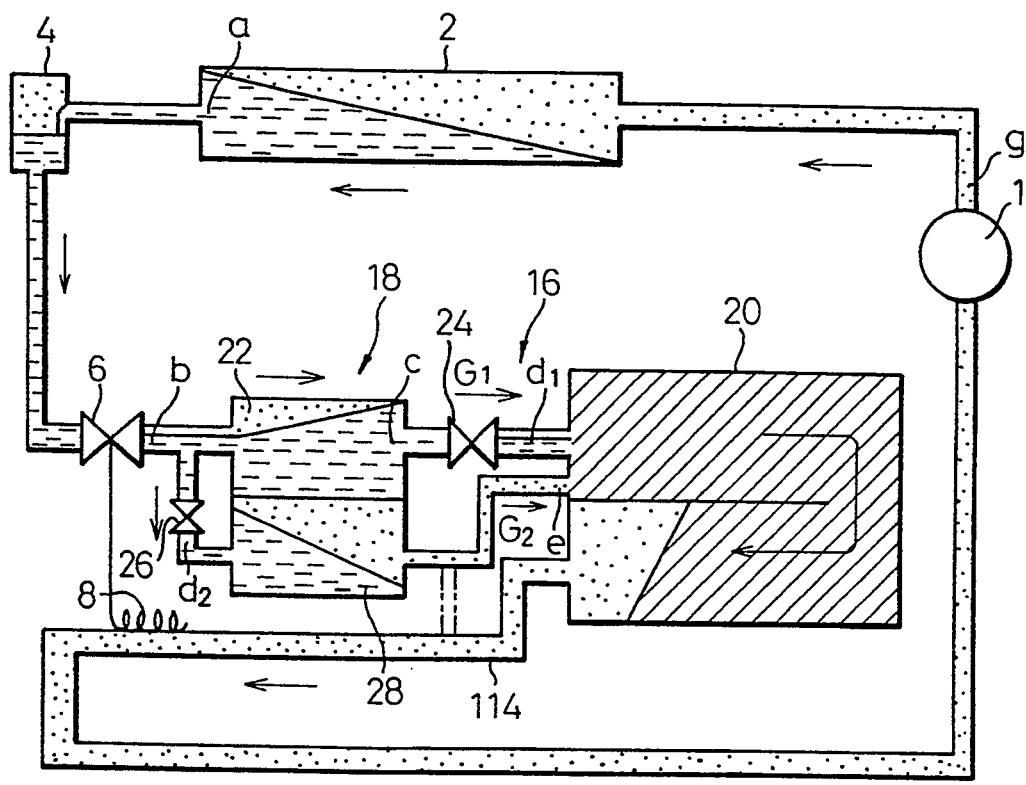
FIG. 18 is a schematic structural view of a refrigeration cycle to which an evaporator for a cooling apparatus of a fourth embodiment is applied.

Note that this fourth embodiment can also be similarly worked even when the cooling passageway 28 is connected to the discharge passageway 114 between the evaporating unit 20 and the temperature sensing tube 8 as indicated by the two dotted chain line in FIG. 18 in the same way as in the case of the third embodiment mentioned before without returning the part G2 of the refrigerant passed through the cooling passageway 28 to the evaporating unit 20.

Figure 21:
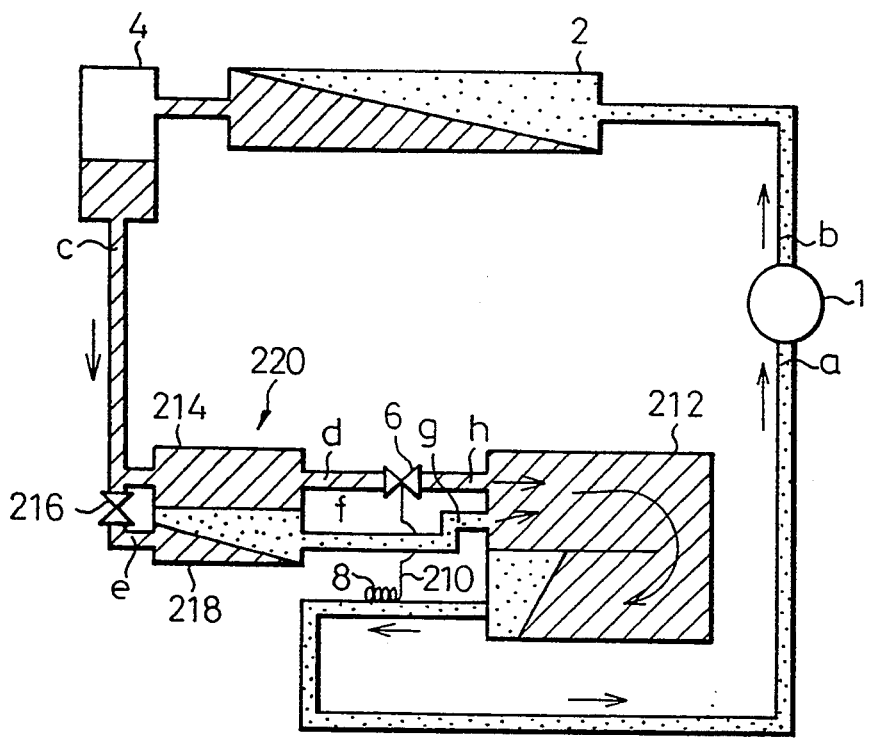
FIG. 21 is a schematic structural view of a cooling apparatus as a fifth embodiment of the present invention.

Next, FIG. 21 is a schematic structural view of a cooling apparatus of the fifth embodiment of the present invention.

The expansion valve 6 is provided with a temperature sensing tube 8 provided on the downstream side of the evaporator 212, which will be mentioned later, and is adjusted in its degree of opening so that when the refrigerant temperature on the downstream side of the evaporator 212 rises, the pressure in the temperature sensing tube 8 rises, that is, when the cooling load is increased, this pressure moves the valve needle in the valve opening direction via the capillary tube 210, to increase the amount of the refrigerant. Also, as the expansion valve 6, it is also possible to use a so-called external pressure equalizing type valve which detects the refrigerant pressure on the downstream side of the evaporator 212 and compensates for the refrigerant pressure on the downstream side of the evaporator 212.

The connection is made so that the refrigerant discharged from the expansion valve 6 is sent to the evaporator 212, absorbs the heat from the air by the evaporator 212 and evaporates to become the gaseous state refrigerant which is sucked into the compressor 1. Also, this air passes through the evaporator 212 to be cooled and then is fed into the vehicle.

In the fifth embodiment, a passageway 214 to be cooled is formed between the receiver 4 and the expansion valve 6, and the cooling passageway 218 is divided from the upstream side of the passageway 214 to be cooled via the fixed throttle 216. The fixed throttle 216 corresponds to the second throttle 26 in the aforementioned embodiments and has a function of an expansion valve reducing the pressure of the refrigerant passed therethrough. The passageway 214 to be cooled and the cooling passageway 218 are provided close to each other so that heat exchange is possible.

Also, in a general cooling state, for example, in the summer season, preferably the resistance of the fixed throttle 216 and the cooling passageway 218 is determined so that the amount of the refrigerant passing through this cooling passageway 218 becomes about 40 percent based on the amount of refrigerant passing through the passageway 214 to be cooled.

Note that, the fixed throttle 216 can be replaced by a capillary tube or the like. It is also possible to constitute the same as a variable flow rate expansion valve provided with a temperature sensing tube downstream of the cooling passageway 218 in the same way as in the aforesaid expansion valve 6.

The aforesaid passageway 214 to be cooled, fixed throttle 216, and cooling passageway 218 constitute a heat exchanger 220. In the fifth embodiment, it is constituted by stacking a plurality of plates as shown in FIG. 23 to FIG. 30.

The heat exchanger 220 is provided with a first side plate 223 to which is attached in inflow port block 222 in which an inflow port 221 is perforated and a second side plate 228 to which is attached an outflow block 226 in which the first and second outflow ports 224 and 225 are perforated. First to fifth plates 230 to 234 are held between the first side plate 223 and the second side plate 228.

Figure 25:
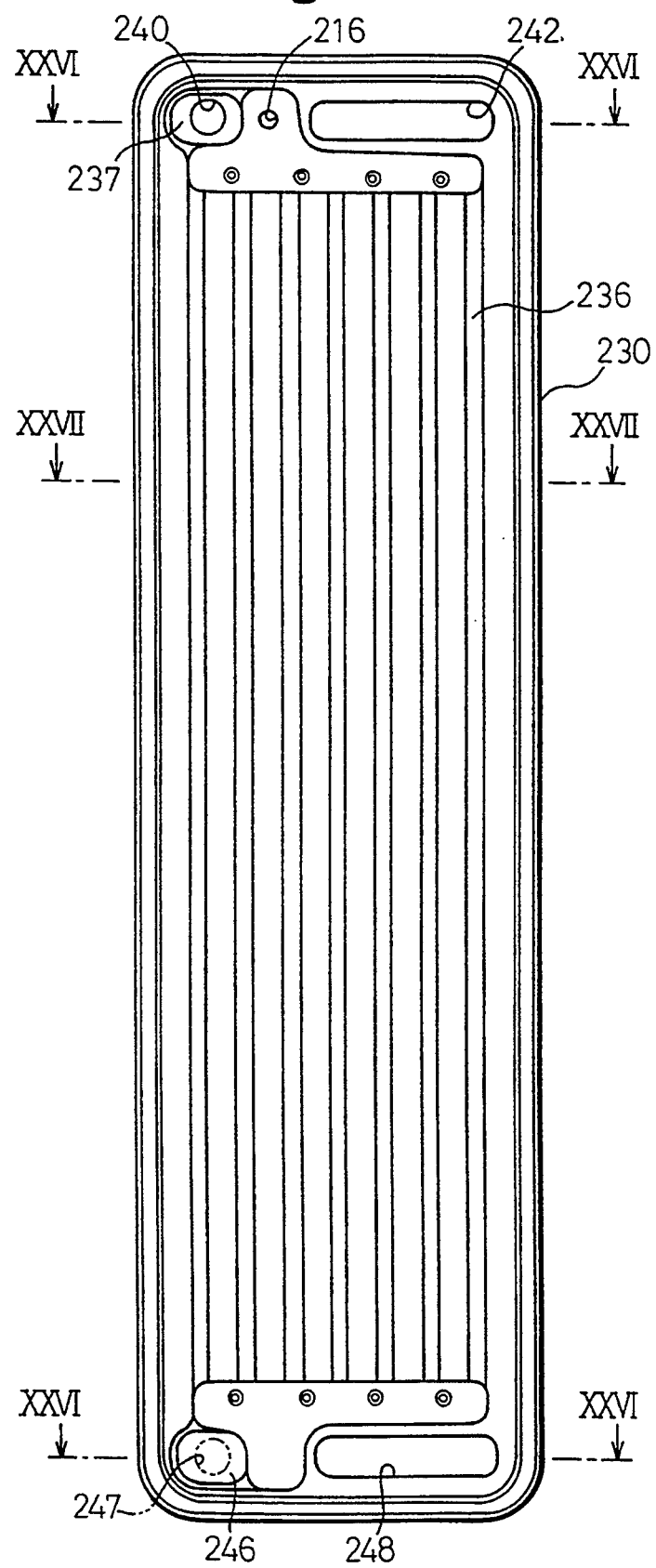
FIG. 25 is an enlarged front view of a first plate of the heat exchanger of the fifth embodiment.
Figure 26:
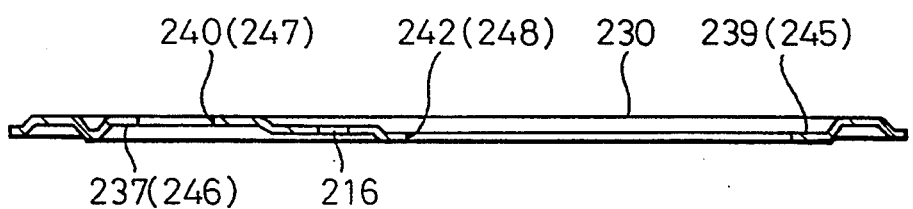
FIG. 26 is a cross-sectional view taken along line XXVI—XXVI and line (XXVI)—(XXVI) in FIG. 25.
Figure 27:
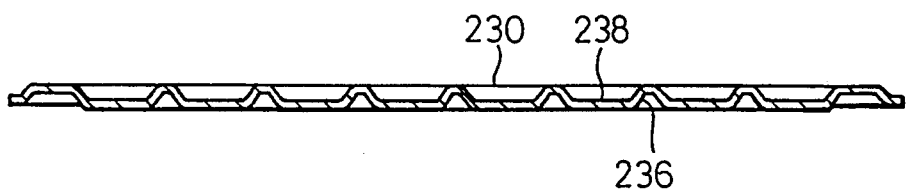
FIG. 27 is a cross-sectional view taken along line XXVII—XXVII in FIG. 25.
Figure 28:
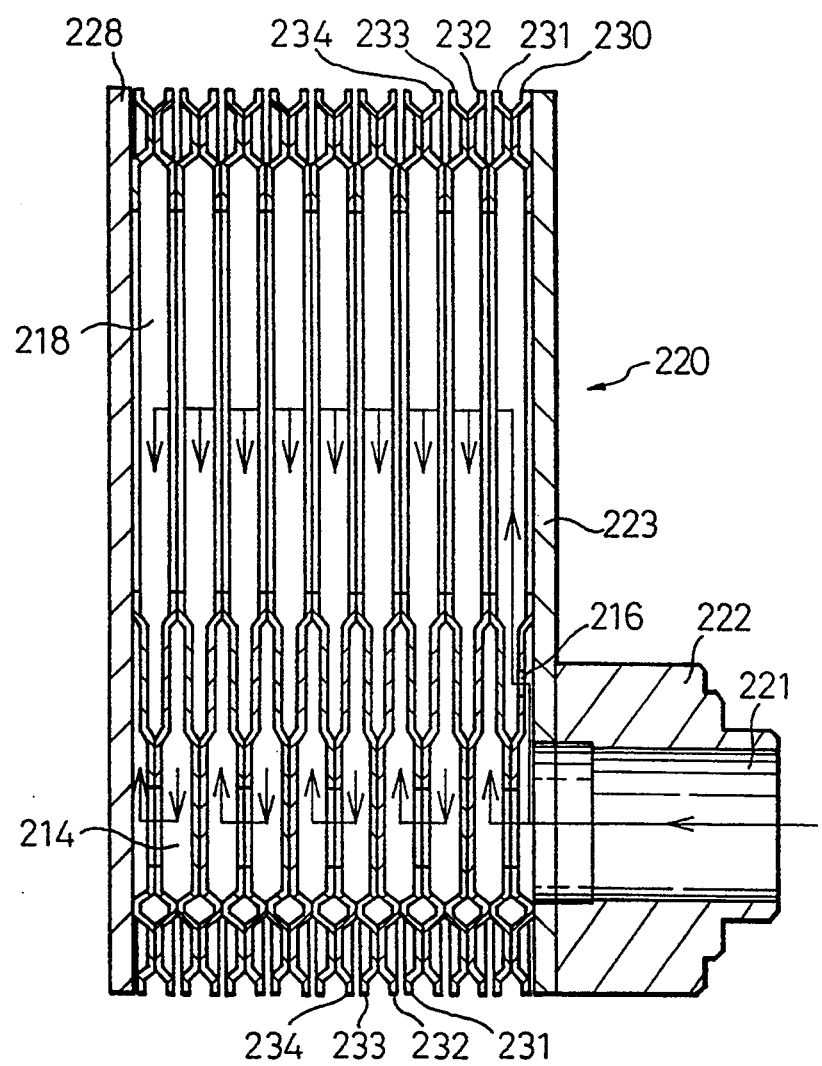
FIG. 28 is a cross-sectional view taken along line XXVIII—XXVIII in FIG. 23.
Figure 29:
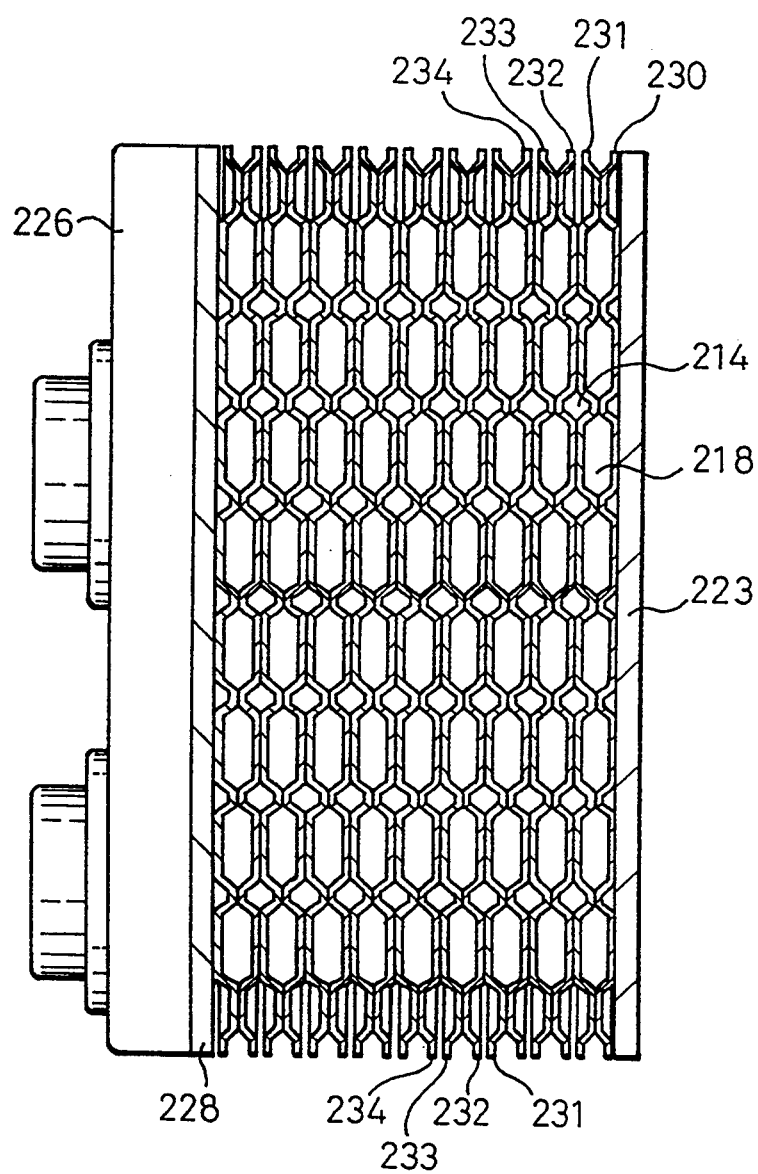
FIG. 29 is a cross-sectional view taken along line XXIX—XXIX in FIG. 23.
Figure 30:
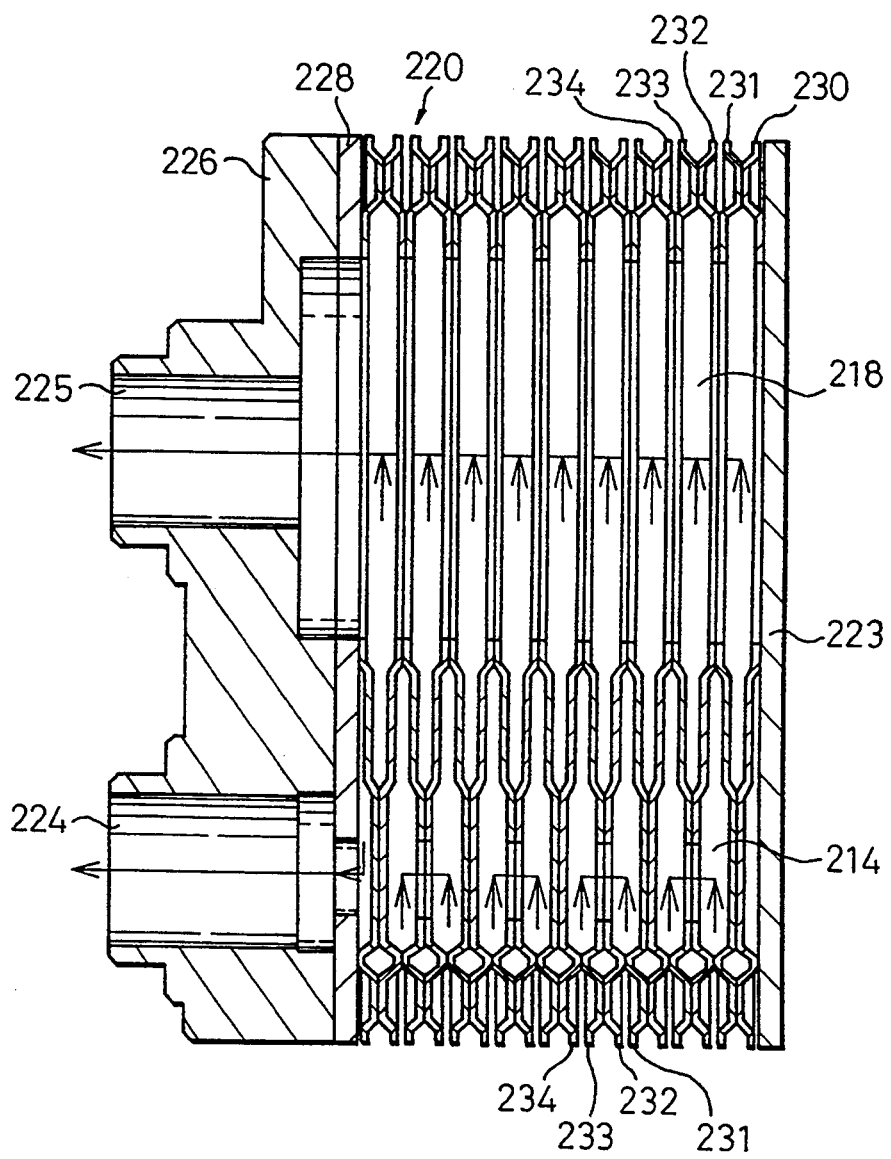
FIG. 30 is a cross-sectional view taken along line XXX—XXX in FIG. 23.

In the first plate 230, as shown in FIG. 25 and FIG. 27, a plurality of grooves 236 are formed in a longitudinal direction in one side surface thereof. Grooves 238 are formed in the opposite surface corresponding to these grooves 236. In the upper portion thereof, as shown in FIG. 26, a hollow 237 of a depth of two grooves, in communication with the aforesaid grooves 236, is formed. A communication hole 240 corresponding to the aforesaid inflow port 221 is made in the hollow 237.

Also, in the opposite surface, a hollow 239 in communication with the groove 238 is formed, and a communication hole 242 is made in the hollow 239. Further, a fixed throttle 216 is made in the hollow 237. In the lower portion of the first plate 230, a hollow 245 in communication with the groove 238 is formed, and a communication hole 248 corresponding to the second outflow port 225 is made in the hollow 245.

The second plate 231 has a symmetrical shape with the first plate 230, but the fixed throttle 216 is not formed. The third plate 232 has the same shape as the first plate 230, but the communication hole 240 and the fixed throttle 216 are not formed, a hollow 246 in communication with the groove 236 is formed in the lower portion, and a communication hole 247 is made in the hollow 246 as indicated by the two dotted chain line in FIG. 25. The fourth plate 233 has a symmetrical shape with the third plate 232, and the fifth plate 234 has the same shape as the first plate 230, but the fixed throttle 216 is not formed.

On the first side plate 223, first the first plate 230 is stacked, and then the second plate 231 is stacked thereon, and further the third plate 232, the fourth plate 233, and the fifth plate 234 are stacked. Then, on them, the second plate 231 to fifth plate 234 are sequentially stacked repeatedly, and finally the second side plate 228 is stacked. These are integrally joined by brazing. Note that, in FIG. 26, bold references represent the references of portions taken along a line (XXXVI)—(XXXVI) in FIG. 25.

By this, the refrigerant flowing into the inflow port 221 passes through the communication holes 240 of the first and second plates 230 and 231 and flows through the passageway 214 to be cooled formed by grooves 236 of the second and third plates 231 and 232 which are combined, from the top to the bottom. Next, it passes through the communication hole 247 at the bottom of the third and fourth plates 232 and 233 and flows through the passageway 214 to be cooled formed by grooves 236 of the fourth and fifth plates 233 and 234 which are combined, from the top to the bottom.

Then, it passes through the communication holes 240 of the fifth and second plates 234 and 231 and flows through the passageway 214 to be cooled formed by grooves 236 of the second and third plates 231 and 232 which are combined, from the top to the bottom. This is repeated, until the refrigerant is finally discharged from the first outflow port 224.

On the other hand, a part of the refrigerant flowing in from the inflow port 221 passes through the fixed throttle 216 and passes through the communication holes 242 on the second to fifth plates 231 to 234 and flows through the cooling passageway 218 formed by combining the grooves 238 of the first and second plates 230 and 231, the third and fourth plates 232 and 233, and the fifth and second plates 234 and 231, respectively, from the top to the bottom. Then, it passes through the communication holes 248 on the bottom of the second to fifth plates 231 to 234 and is discharged from the second outflow port 225.

Figure 31:
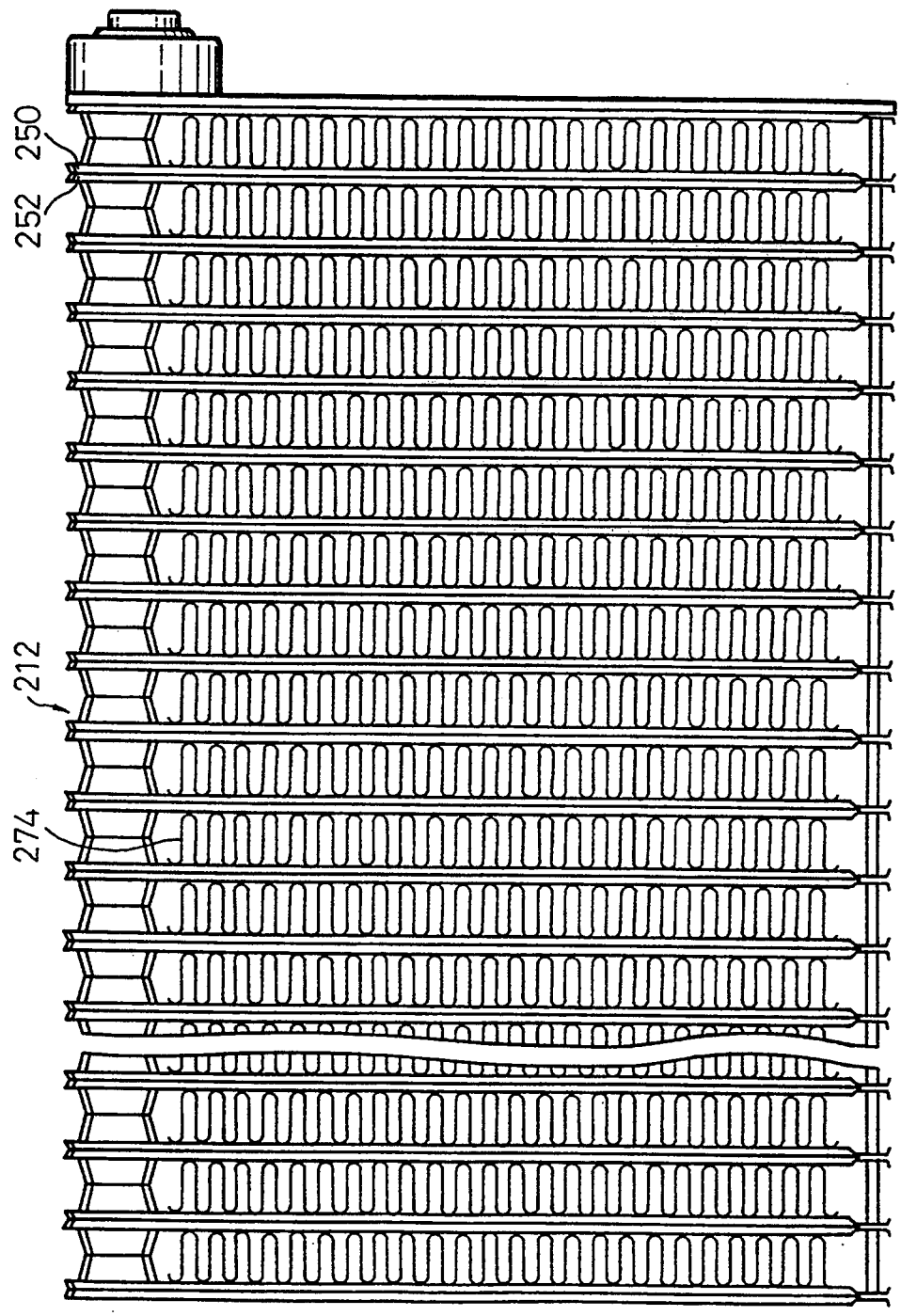
FIG. 31 is a side view of the evaporator of the fifth embodiment.
Figure 32:
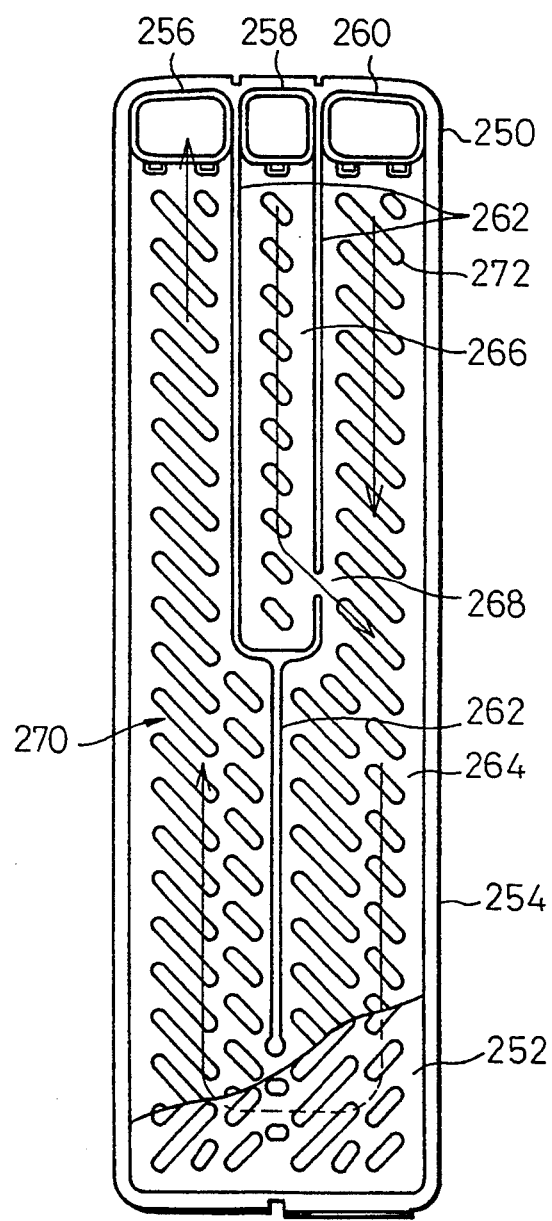
FIG. 32 is an enlarged front view of a core of the evaporator of the fifth embodiment.
Figure 33:
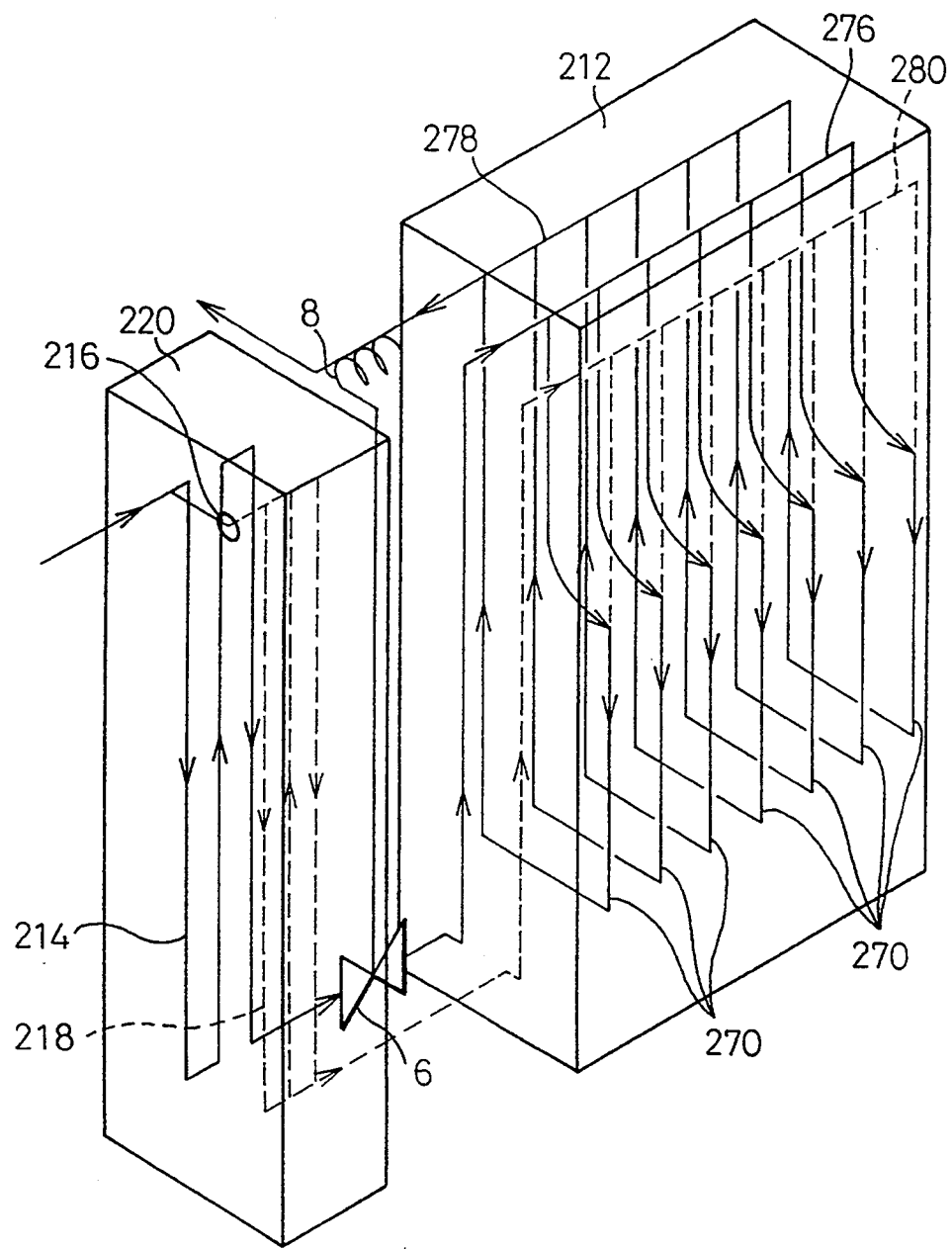
FIG. 33 is a perspective view showing the schematic structure of passageways of the fifth embodiment.

In the evaporator 212, as shown in FIG. 31 and FIG. 32, a core 254 is formed by one set of core plates 250 and 252. The core plates 250 and 252 have a symmetrical shape, are hollowed at the centers thereof, and have outlet holes 256, inlet holes 258, and inflow holes 260 formed above this in alignment.

Partition walls 262 are formed on the two sides of the inlet hole 258 so as to partition the space substantially in parallel toward the other side end. The front ends thereof are combined midway to become one partition wall 262. By this, a first refrigerant passageway 264 having an inverse U-character shape communicating the outlet hole 256 with the inflow hole 260 is formed.

Also, a second refrigerant passageway 166 communicated with the inlet hole 258 is formed while being surrounded by a partition wall 262. A recess 268 is formed in a part of the partition wall 262, so that the second refrigerant passageway 266 and the first refrigerant passageway 264 are communicated. A refrigerant passageway 270 is formed by these first refrigerant passageway 264, recess 268, and the second refrigerant passageway 266.

Note that, in the present embodiment, so as to promote the heat exchange, a large number of small projections 272 are formed on both the core plates 250 and 252 in directions reverse from each other.

A plurality of cores 254 formed in this way are integrally bonded by brazing while sandwiching fins 274 therebetween as shown in FIG. 31. By this, as shown in FIG. 3, a plurality of inlet holes 258 are connected to form inlet passageway 276 and a plurality of outlet holes 256 are connected to form the outflow passageway 278. Similarly, a plurality of inflow holes 260 are connected to form a gas passageway 80.

The first outflow port 224 of the heat exchanger 220 and the inflow passageway 276 of the evaporator 212 are connected via the expansion valve 6, and the second outflow port 225 of the heat exchanger 220 and the gas passageway 280 of the evaporator 212 are connected. Also, the outflow passageway 278 of the evaporator 212 is connected to the compressor 1.

Next, an explanation will be made of the operation of the cooling apparatus of the fifth embodiment.

Figure 22:
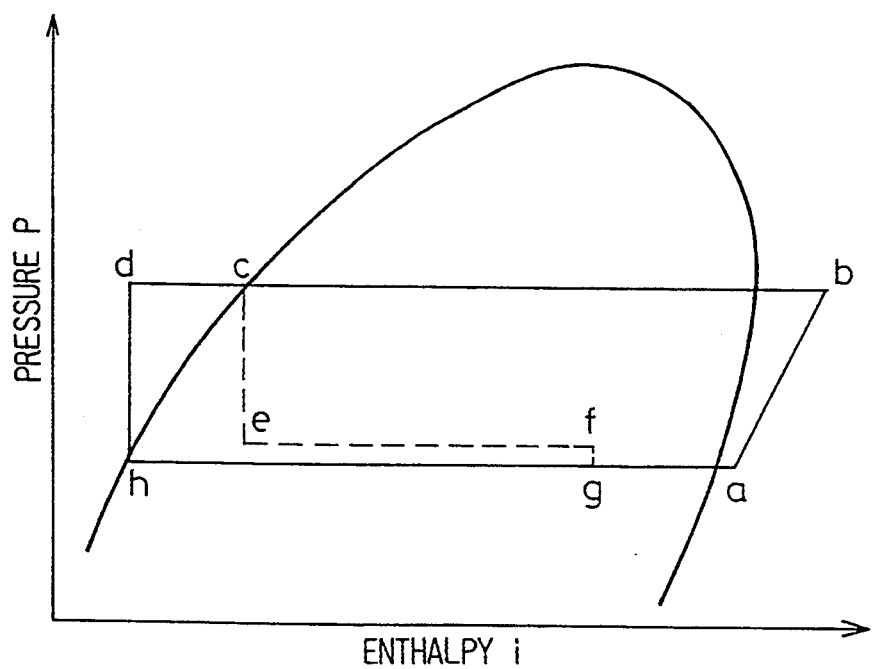
FIG. 22 is a Mollier diagram of the fifth embodiment.
Figure 23:
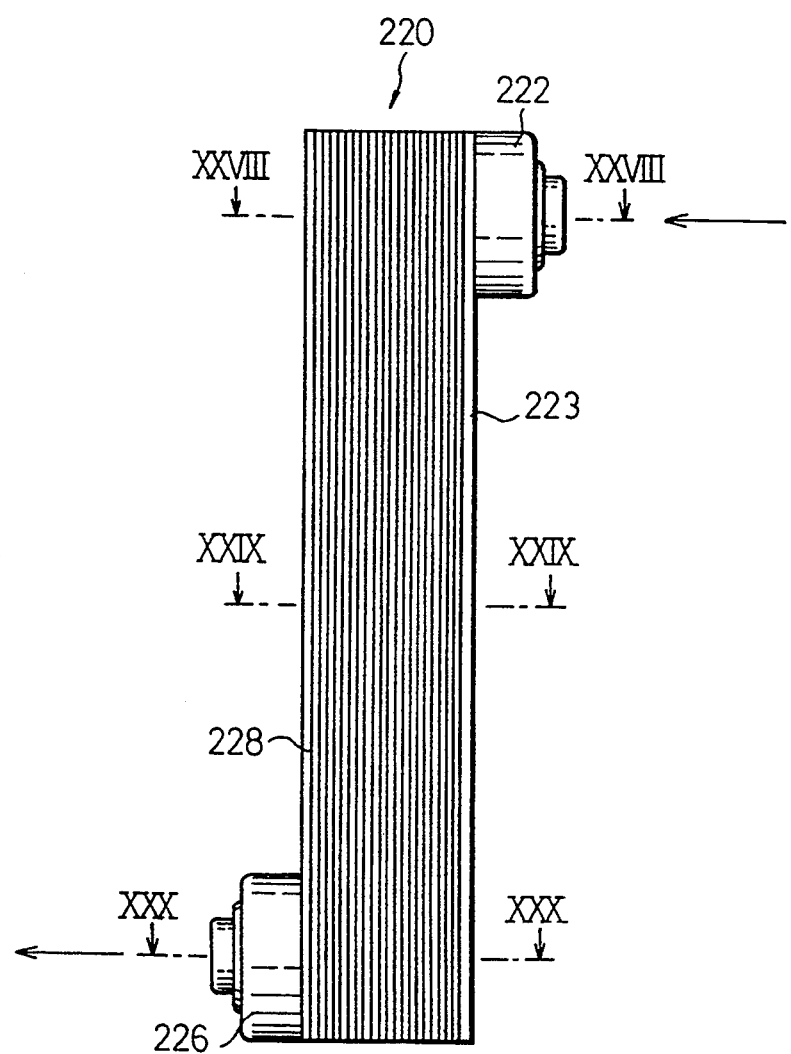
FIG. 23 is a side view of a heat exchanger of the fifth embodiment.
Figure 24:
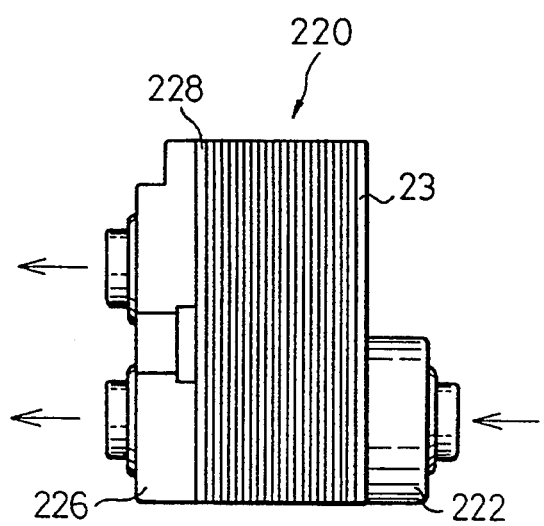
FIG. 24 is a top view of the heat exchanger of the fifth embodiment.

First, the refrigeration cycle will be explained together with the Mollier diagram shown in FIG. 22. The gaseous state refrigerant is sucked by the drive of the compressor 1 and compressed (between a point a and point b) and sent to the condenser 2. In the condenser 2, heat exchange is carried out between the refrigerant and air, whereby a high temperature refrigerant is cooled by the air (between the point b and point c) and sent as the liquid state refrigerant to the receiver 4.

The refrigerant sent to the receiver 4 is temporarily gathered and sent to the heat exchanger 220. A part thereof passes from the inflow port 221 to the passageway 214 to be cooled and is sent from the first outflow port 224 to the expansion valve 6. Also, another part of the refrigerant sent to the heat exchanger 220 passes from the inflow port 221 to the fixed throttle 216 and is sent to the cooling passageway 218.

By passing through the fixed throttle 216, the refrigerant is reduced in pressure (between a point c–point e) to become a refrigerant of a low temperature. The heat exchange is carried out between the low temperature refrigerant passing through the cooling passageway 218 and the refrigerant passing through the passageway 214 to be cooled. The enthalpy i of the refrigerant of the cooling passageway 218 is increased (between point e–point f), and the refrigerant of the passageway 214 to be cooled is cooled (between point c–point d).

By this, the refrigerant of the passageway 214 to be cooled is brought to the state of a liquid state refrigerant with a very large degree of supercooling and supplied to the expansion valve 6. Then, the degree of opening of the expansion valve 6 is adjusted in accordance with the temperature and pressure of the refrigerant on the downstream side of the evaporator 212, to perform compensation so that the state of the refrigerant after passing through the evaporator 212 becomes constant.

The refrigerant passed through the expansion valve 6 is adjusted in its flow rate in accordance with its degree of opening and, at the same time, reduced in pressure (between point d–point h) and sent to the inlet hole 258 of the evaporator 212. The refrigerant flowing into the inflow passageway 276 is divided to the second refrigerant passageways 266.

At this time, the refrigerant is in the liquid single-phase state or in a state close to this, and therefore is substantially uniformly distributed to the second refrigerant passageways 266. Then, this refrigerant passes through the second refrigerant passageways 266, flows from the recesses 268 into the first refrigerant passageways 264, and then is sent to the outflow passageway 278.

Also, a part of the refrigerant sent to the inflow hole 260 of the evaporator 212 passes through the gas passageway 280 and is divided to the first refrigerant passageways 264. The degree of dryness of this refrigerant by the heat exchange at the heat exchanger 220 is large, and a refrigerant of a single phase of substantially the gaseous state is substantially uniformly distributed to the first refrigerant passageways 264. Then, it is combined with the liquid state refrigerant passed through the recesses 268 in the first refrigerant passageways 264 and sent to the outflow passageway 278.

When refrigerant exists in the refrigerant passageways 270, the heat exchange is carried out between the refrigerant and air via the cores 254, and the air fed into the vehicle is cooled. (The liquid state refrigerant is between the point h and point a, and the gaseous state refrigerant is between the point g and the point a.) At this time, the refrigerant is uniformly distributed to the respective refrigerant passageways 270, and the liquid state refrigerant which particularly greatly contributes to the cooling is uniformly distributed, and therefore no unevenness of cooling will occur in the air passing between the cores 54.

In addition, the liquid state refrigerant having a great degree of supercooling is supplied to the expansion valve 6, and therefore the amount of supply of the refrigerant can be stably adjusted in accordance with the degree of opening of the expansion valve 6, and it is possible to prevent the generation of noise when passing through the expansion valve 6 in a state where the gaseous state refrigerant is mixed.

On the other hand, as in the case of the winter season, where the air temperature passing through the condenser 2 is low, i.e., 0° to 10° C., the liquidization of refrigerant in the condenser 2 is excessively promoted, the refrigerant is gathered in the condenser 2, and the amount of refrigerant supplied to the evaporator 212 is reduced. Also, in a transitory operation state such as the start of the operation, the amount of refrigerant in the receiver 4 is insufficient, and the amount of refrigerant supplied to the evaporator 212 becomes smaller.

Also in this case, the refrigerant passed through the receiver 4 is divided to the passageway 214 to be cooled and the cooling passageway 218, the heat exchange is carried out between the refrigerant reduced in pressure by passing through the fixed throttle 216 and the refrigerant of the passageway 214 to be cooled, and the refrigerant passing through the passageway 214 to be cooled is cooled. Then, the liquid state refrigerant passed through the passageway 214 to be cooled and the gaseous state refrigerant passed through the cooling passageway 218 are uniformly distributed to the refrigerant passageways 270.

Accordingly, even in a case of a small amount of refrigerant, the refrigerant is uniformly divided to the refrigerant passageways 270 and supplied to the evaporator 212, and no lowering of the cooling performance due to the provision of the heat exchanger 220 is induced.

Figure 34:
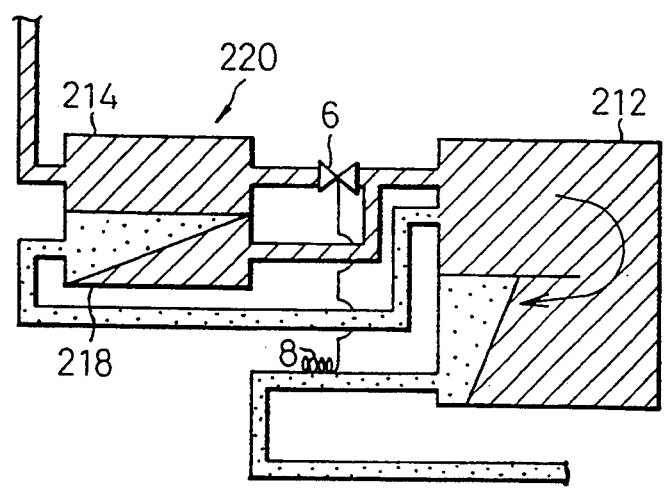
FIG. 34 is a schematic structural view of a principal part of the cooling apparatus of a sixth embodiment.

An explanation will be made next by FIG. 34 of a sixth embodiment different from the aforementioned embodiments. Note that, the same members as those in the aforementioned fifth embodiment are given the same numerals and a detailed explanation thereof will be omitted. The same applies for the following other embodiments.

This sixth embodiment is constituted so that the refrigerant divided between the expansion valve 6 and the evaporator 212 and reduced in pressure by the expansion valve 6 is supplied to the cooling passageway 218. By this, the aforesaid fixed throttle 216 is not required, and the structure becomes simple.

Also in this case, the refrigerant which is cooled by passing through the passageway 214 to be cooled and becomes the single phase of the liquid state is supplied to the expansion valve 6, and then a part is supplied to the cooling passageway 218.

Figure 35:
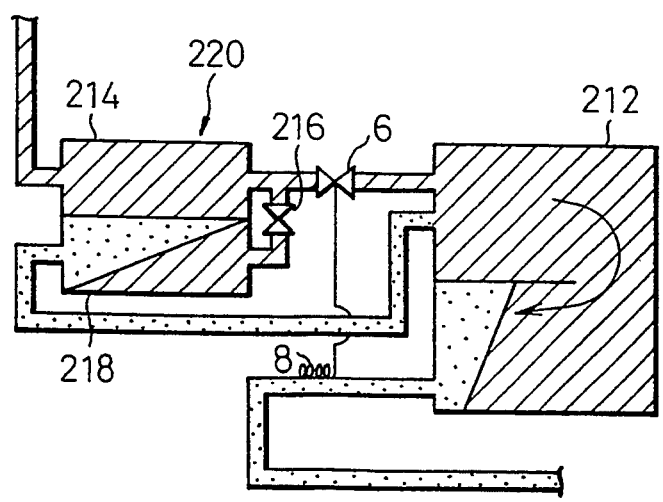
FIG. 35 is a schematic structural view of a principal part of the cooling apparatus of a seventh embodiment.

Moreover, it is also possible to execute this embodiment similarly even if the refrigerant is divided between the passageway 214 to be cooled of the heat exchanger 220 and the expansion valve 6 and supplied to the cooling passageway 218 via the fixed throttle 216 as in the seventh embodiment shown in FIG. 35.

Figure 36:
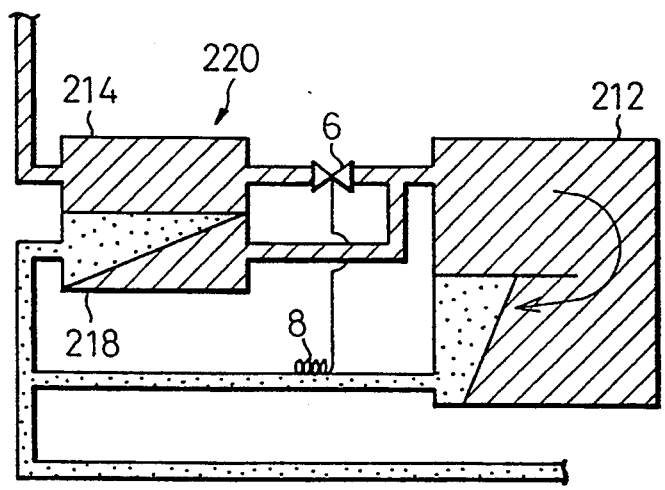
FIG. 36 is a schematic structural view of a principal part of the cooling apparatus of an eighth embodiment.

Further, it is also possible to divide the refrigerant between the expansion valve 6 and the evaporator 212 in the same way as in the sixth embodiment and supply the refrigerant reduced in pressure by the expansion valve 6 to the cooling passageway 218 as in an eighth embodiment shown in FIG. 36.

In these cases, it is also possible to constitute the apparatus so that the refrigerant passed through the cooling passageway 218 is not passed through the evaporator 212, but is returned directly to the compressor 1, or supplied to the evaporator 212 as indicated in the figures of the embodiments mentioned before. Where the refrigerant is supplied to the evaporator 212, as mentioned before, if the apparatus is constituted so that, when the refrigerant is distributed to the refrigerant passageways 270, the refrigerant of the passageway 214 to be cooled and the refrigerant of the cooling passageway 218 are supplied to the inflow passageway 276 and the gas passageway 280 and are separately distributed to the second refrigerant passageways 266 and the first refrigerant passageways 264, respectively, the refrigerants can be uniformly distributed in the state of single phases of the liquid state and gas state.

Figure 37:
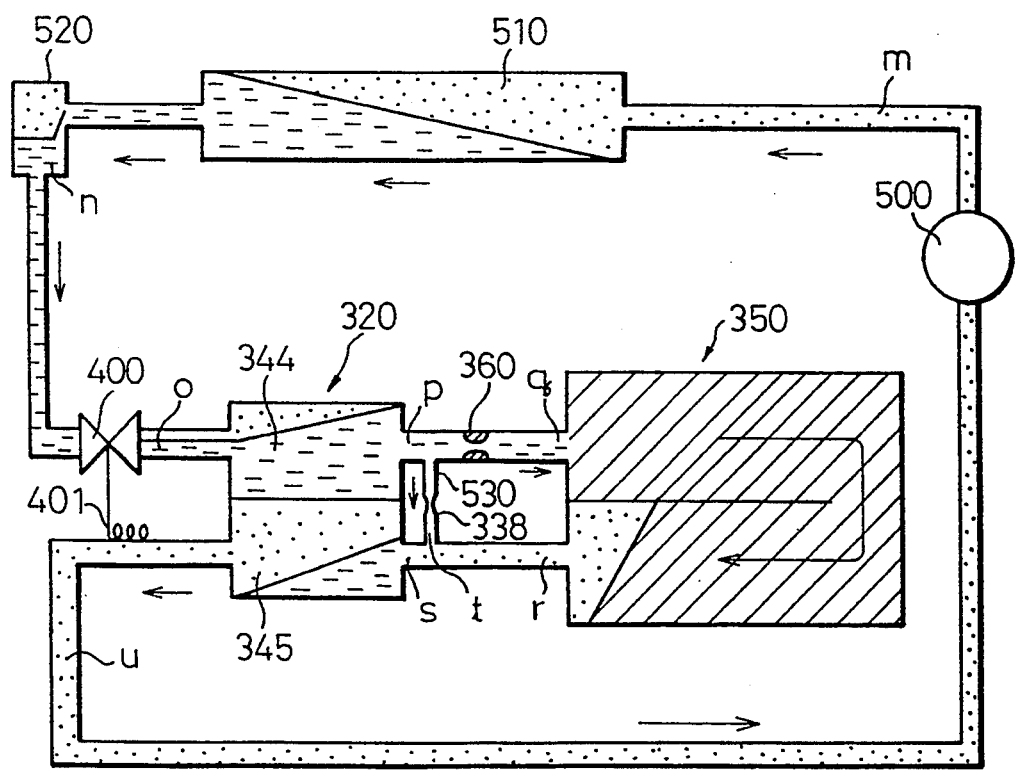
FIG. 37 is a diagrammatical view explaining the refrigeration cycle in a ninth embodiment of the present invention.
Figure 38:
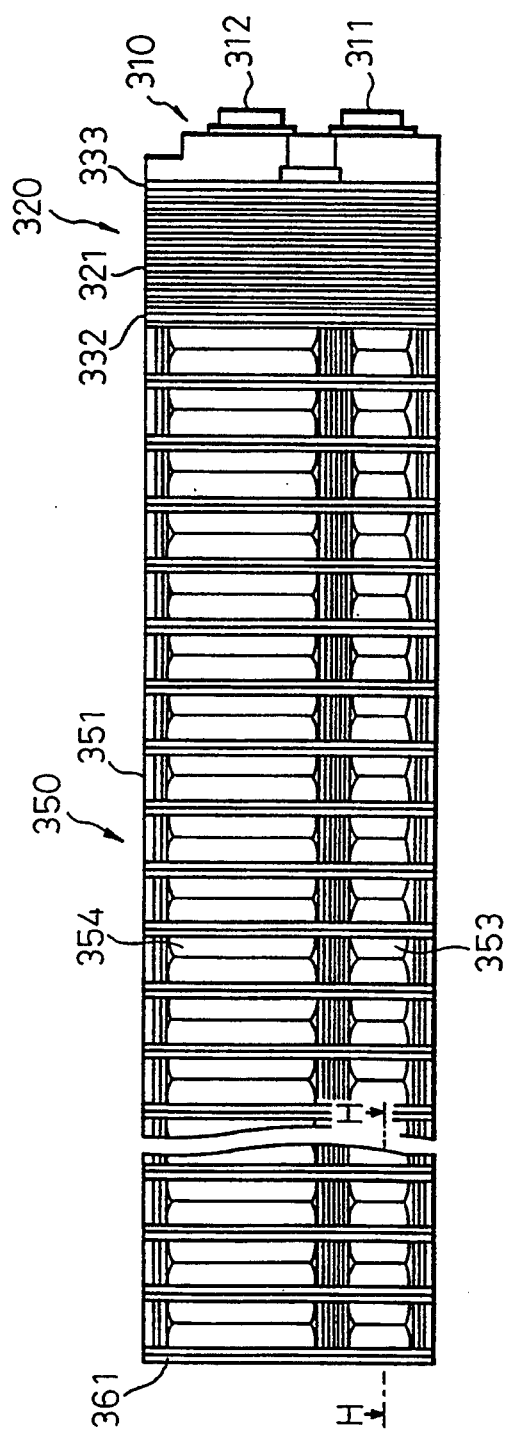
FIG. 38 is a plan view of the evaporator of a ninth embodiment.
Figure 39:
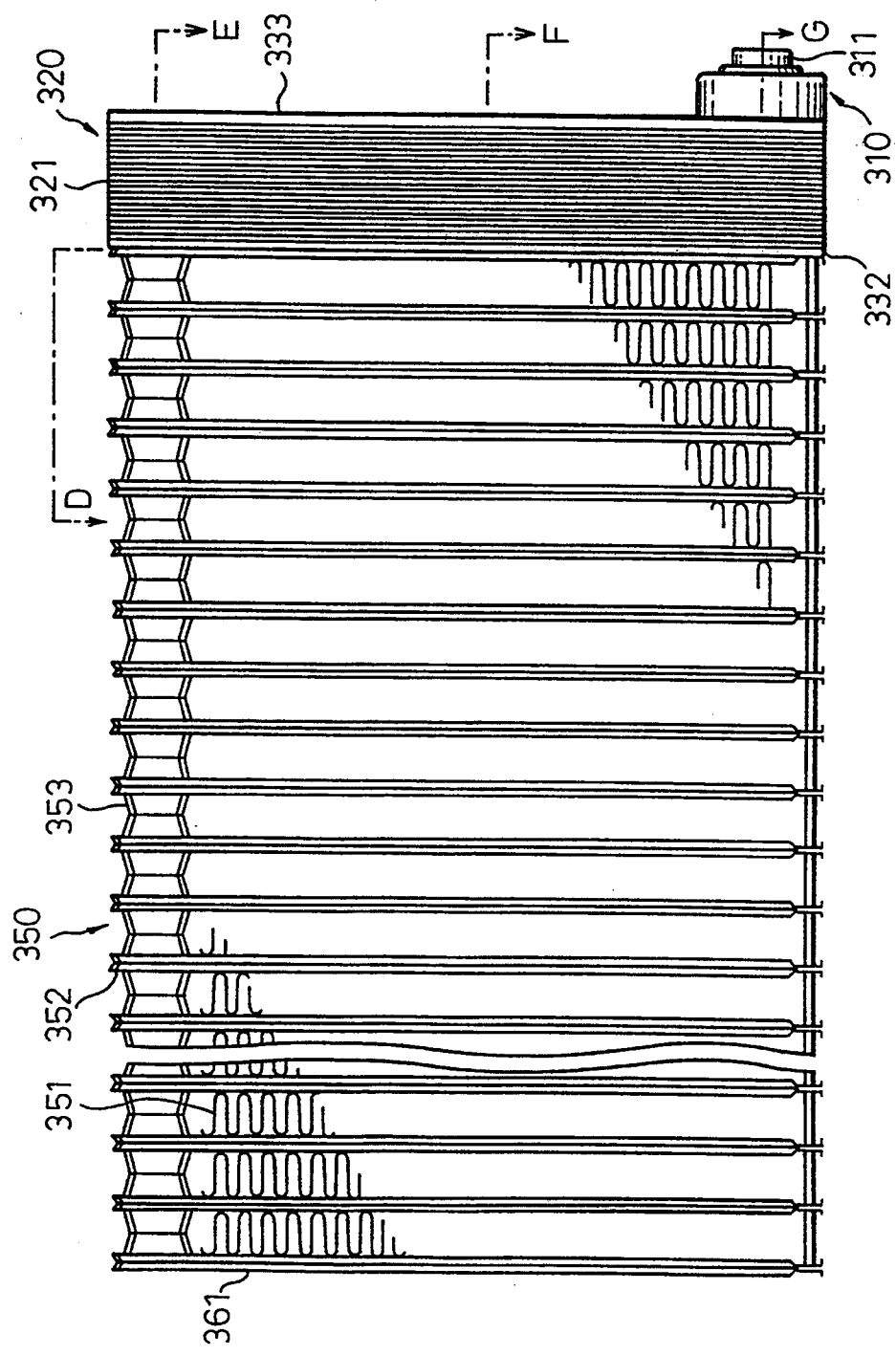
FIG. 39 is a front view of the above-described evaporator.

FIG. 37 through FIG. 51 show the ninth embodiment of the present invention. FIG. 38 and FIG. 39 show the outer appearance of the stacking type evaporator of the ninth embodiment, FIG. 38 is a plan view thereof, and FIG. 39 is a front view thereof. Also, FIG. 37 is a diagrammatical view of a refrigeration cycle including the stacking type evaporator. This refrigeration cycle is constituted by sequentially connecting a compressor 500 compressing the refrigerant, a condenser 510 condensing the compressed refrigerant, a liquid receiver 520 which separates only the liquid state refrigerant among the condensed refrigerants, an expansion valve 400 reducing the pressure of the separated liquid state refrigerant by heat insulation expansion (third pressure reducing means), and an evaporator evaporating the liquid state refrigerant reduced in pressure by pipes.

The stacking type evaporator (hereinafter simply referred to as an evaporator) is used for the refrigeration cycle for an automobile and is provided on the downstream side of the expansion valve 400. The evaporator comprises a heat exchanging unit 320 performing the heat exchange between refrigerants (mentioned later) and a refrigerant evaporating unit 350 performing the heat exchange between the refrigerant and air.

At the joint block 310, as shown in FIGS. 38 and 39, the inflow port 311 acting as the inlet of the refrigerant in the gas-liquid two-phase state flowing out from the expansion valve 400 and an outflow port 312 feeding the refrigerant after vaporization are provided.

Figure 40:
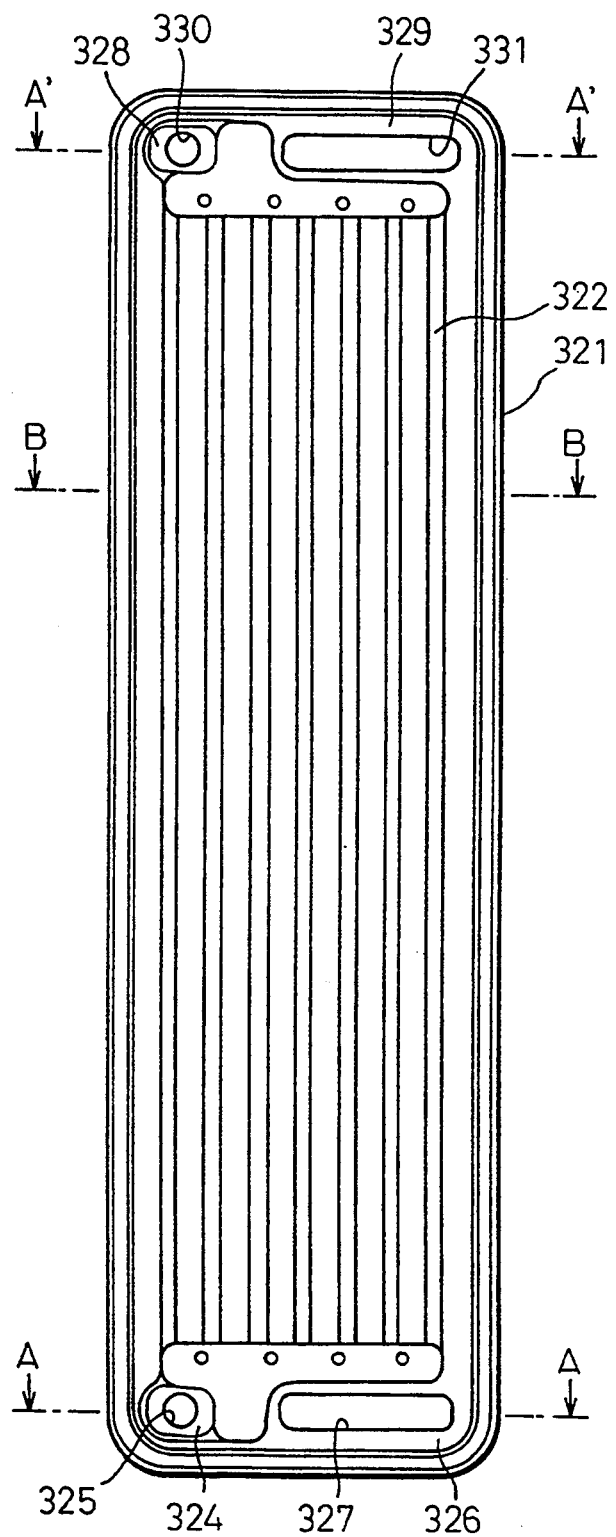
FIG. 40 is a front view of the plate of the heat exchanging unit of the above-described evaporator.
Figure 41:
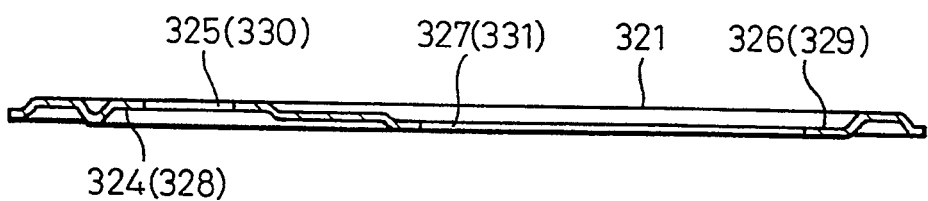
FIG. 41 is a cross-sectional view of the above-described plate taken along a line A—A in FIG. 40.
Figure 42:
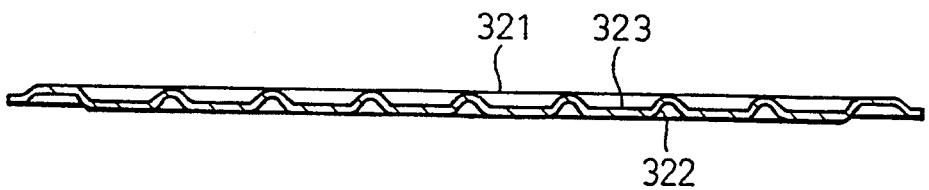
FIG. 42 is a cross-sectional view of the above-described plate taken along a line B—B in FIG. 40.
Figure 43:
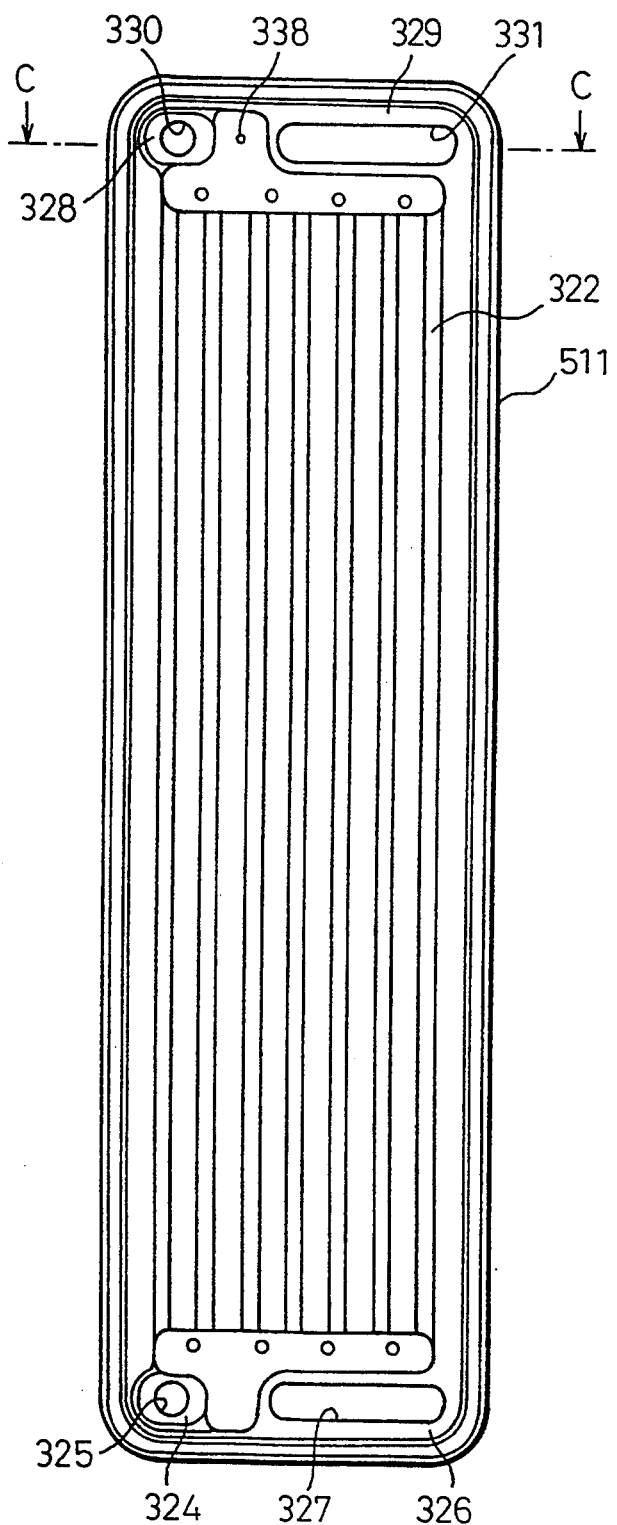
FIG. 43 is a front view of the sidemost plate of the above-described evaporator.

The heat exchanging unit 320 comprises a plurality of plates 321 shown in FIG. 40 stacked by brazing and, further, at the outermost side thereof, a sidemost plate 511 shown in FIG. 43 stacked by brazed. By performing the stacking in this way, an apparatus is constituted so that the refrigerant flows between the plates 321 and the sidemost plate 511. FIG. 41 is a cross-sectional view taken along a line A—A or a line A'—A' of FIG. 40, and FIG. 42 is a cross sectional view taken along a line B—B in FIG. 40. In this plate 321, unevenness is formed in the flat plates so that the passageways of the refrigerant are formed at the stacking and are vertically symmetrical with each other. A plurality of grooves 322 are formed in the longitudinal direction at the center of the plates 321. Accordingly, at the back surface of the plate 321, a plurality of grooves 323 are formed in the longitudinal direction. Accordingly, in the back surface of the plate 321, a plurality of grooves 323 are formed at positions not having the grooves 322 formed as shown in FIG. 42. A concave surface portion 324 is formed in one of the lower portions of the plates 321, and in this concave surface portion 324, a circular hole 325 for passing the refrigerant sent via the inflow port 311 of the joint block 310 (hereinafter referred to as an inlet refrigerant) into this is made. On the other hand, on the other lower portion of the plates 321, a convex surface portion 326 is formed. In this convex surface portion 326, a laterally long circular hole 327 sending the outlet refrigerant mentioned later (refrigerant sent from the refrigerant evaporating unit 350) to the outflow port 312 of the joint block 310 is made.

Similarly, a concave surface portion 328 and a convex surface portion 329 are formed in the upper portion of the plates 321, and circular holes 330 and 331 having the same shape as the circular holes 325 and 327, respectively, are made in them. Note that, in FIG. 41, references in bold represent the references of the parts taken along a line A'—A' in FIG. 40.

Figure 44:
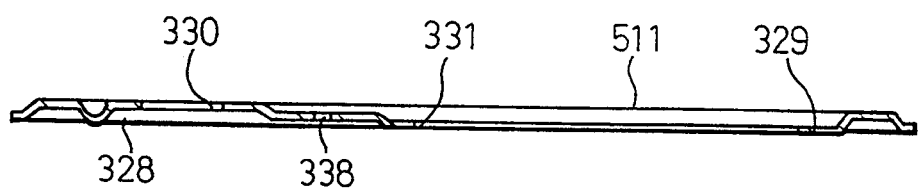
FIG. 44 is a cross-sectional view of the above-described sidemost plate taken along a line C—C in FIG. 43.

FIG. 43 is a plan view of the sidemost plate 511; and FIG. 44 is a cross-sectional view taken along a line C—C of FIG. 43. This sidemost plate 511 basically exhibits the same shape as the above-mentioned plate 321, but has a relatively small communication hole 338 made at the position between the circular hole 330 and the circular hole 331. This communication hole 338 constitutes a part of a bypass passageway 530 indicated in FIG. 37 and, at the same time, constitutes the second pressure reducing means. The other parts of the structure are the same shape as the plate 321, and therefore are given the same references.

Figure 45:
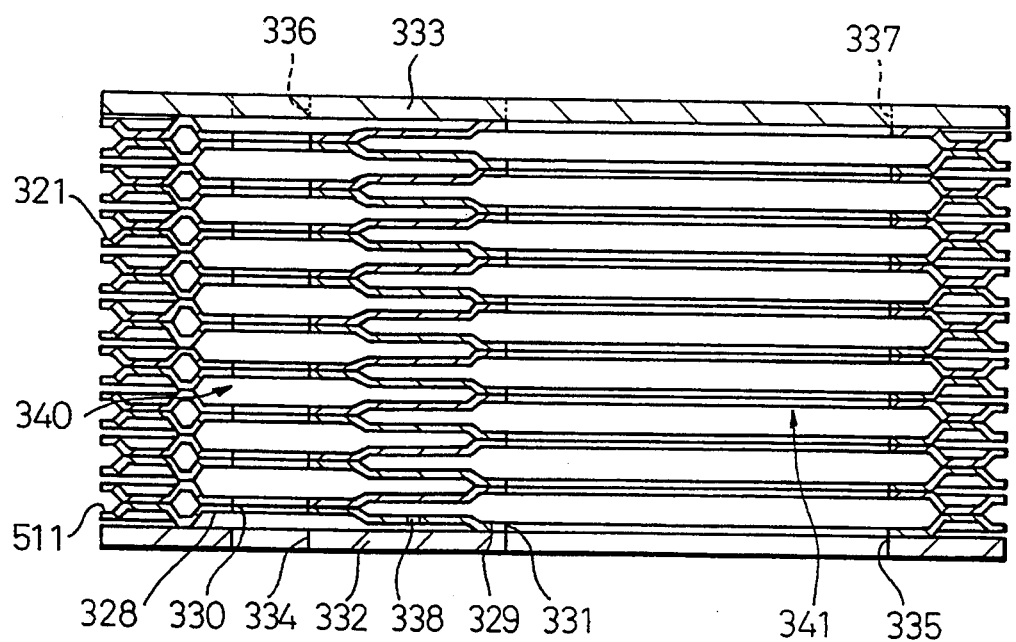
FIG. 45 is a cross-sectional view showing the stacking state of plates at the same portion as that in FIG. 44.
Figure 46:
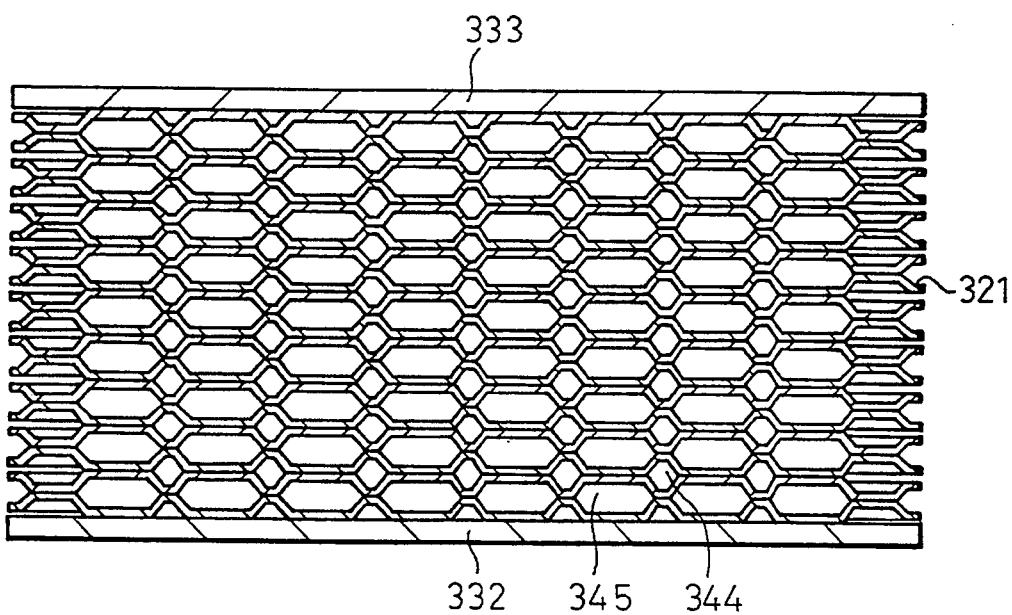
FIG. 46 is a cross-sectional view showing the stacking state of plates at the same portion as that in FIG. 42.

Cross-sectional views of the stacking state of this plate 321 and sidemost plate 511 are given in FIG. 45 and FIG. 46. FIG. 45 is a cross-sectional view of the stacking state at the position corresponding to a line A'—A' of FIG. 43, and FIG. 46 is a cross-sectional view at the position corresponding to a line B—B of FIG. 40. Note that the stacking state at the lower portion of the plate 321 (position at which the circular holes 325 and 327 are formed) is the same as that in FIG. 44 except for the communication hole 338. As illustrated, the heat exchanging unit 320 is formed by stacking a plurality of plates 321 and the sidemost plate 511 so that the front surface and back surface face each other between the end plates 332 and 333 on both sides. In the end plate 332 facing the refrigerant evaporating unit 350, at the position facing the circular holes 330 and 331 of the sidemost plate 511, circular holes 334 and 355 having the same shape as those are made, and in the end plate 333 facing the joint block 310, at the position facing the circular holes 325 and 327 of the plate 321, circular holes 336 and 357 having the same shape as those are made.

By stacking in this way, as shown in FIG. 45, in the upper portion of the heat exchanging unit 320, a void portion 340 (hereinafter referred to as an upper inlet refrigerant tank portion 340) is formed by a concave surface portion 328 in which the circular hole 330 is perforated, and a void portion 341 (hereinafter referred to as an upper outlet refrigerant tank portion 341) is formed by a convex surface portion 329 in which the circular hole 331 is made. Similarly, though indicated in FIG. 49 mentioned later, in the lower portion of the heat exchanging unit 320, a void portion 342 (hereinafter referred to as a lower inlet refrigerant tank portion 342) is formed by a concave surface portion 324 in which the circular hole 325 of the plate 321 shown in FIG. 41 is made, and a void portion 343 (hereinafter referred to as a lower outlet refrigerant tank portion 343) is formed by a convex surface portion 326 in which the circular hole 327 is made. Also, as shown in FIG. 46, a plurality of passageways 344 to be cooled (hereinafter referred to as inlet refrigerant passageways 344) connecting the upper inlet refrigerant tank portion 340 and the lower inlet refrigerant tank portion 342 by the grooves 322 of the plate 321 shown in FIG. 42 and a plurality of passageways 345 to be cooled (hereinafter referred to as outlet refrigerant passageways 345) connecting the upper outlet refrigerant tank portion 341 and the lower outlet refrigerant tank portion 343 by the grooves 323 are formed at the center of the heat exchanging unit 320.

Further as clear from FIG. 45, the upper inlet refrigerant tank portion 340 and upper outlet refrigerant tank portion 341 are communicated by the bypass passageway including the communication hole 338.

Here, an explanation will be made of the flow of the refrigerant based on FIG. 47, FIG. 48, and FIG. 49.

Figure 47:
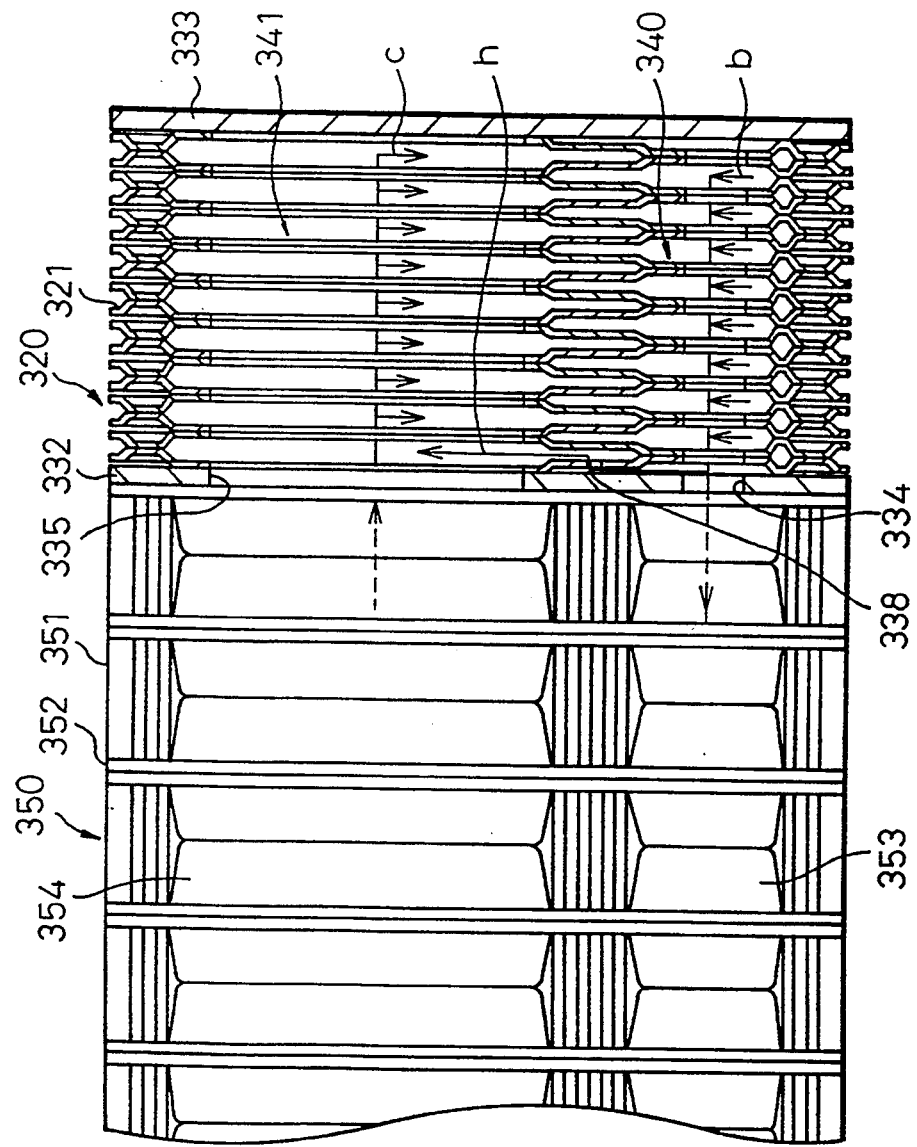
FIG. 47 is a view of the evaporator of the ninth embodiment seen from a line D–E in FIG. 39.

FIG. 47 is a view taken along a line D-E of FIG. 39; FIG. 48 is a view taken along a line D-F; and FIG. 49 is a view taken along a line D-G. The refrigerant flowing in from the inflow port 311 of the joint block 310 (inlet refrigerant) is sent to the lower inlet refrigerant tank portion 342, distributed to a plurality of inlet refrigerant passageways 344 formed between the plates 321 shown in FIG. 48, flows into them, and is sent upward. Then, the inlet refrigerant flowing through the respective inlet refrigerant passageways 344 flows to the upper inlet refrigerant tank portion 340 as indicated by an arrow b of FIG. 47 and combined. Most of this combined refrigerant, about 80 percent of the refrigerant in the present embodiment, flows into the refrigerant evaporating unit 350. A part of that liquid state refrigerant passes through the communication hole 338, whereby the pressure is reduced. The result flows into the lower outlet refrigerant tank 41 (represented by an arrow h in FIG. 47). The flow of the refrigerant at the refrigerant evaporating unit 350 will be mentioned later.

Figure 48:
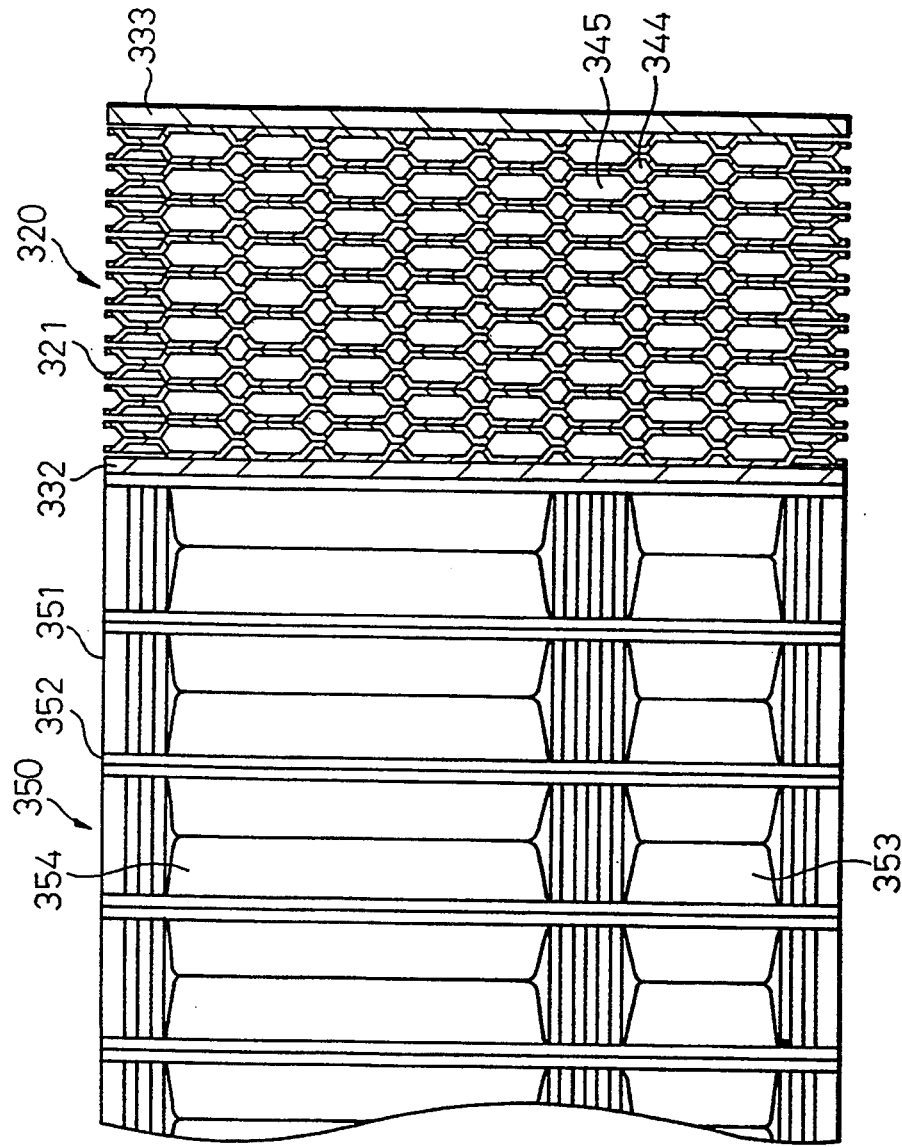
FIG. 48 is a view of the above-described evaporator seen from a line D–F in FIG. 39.
Figure 49:
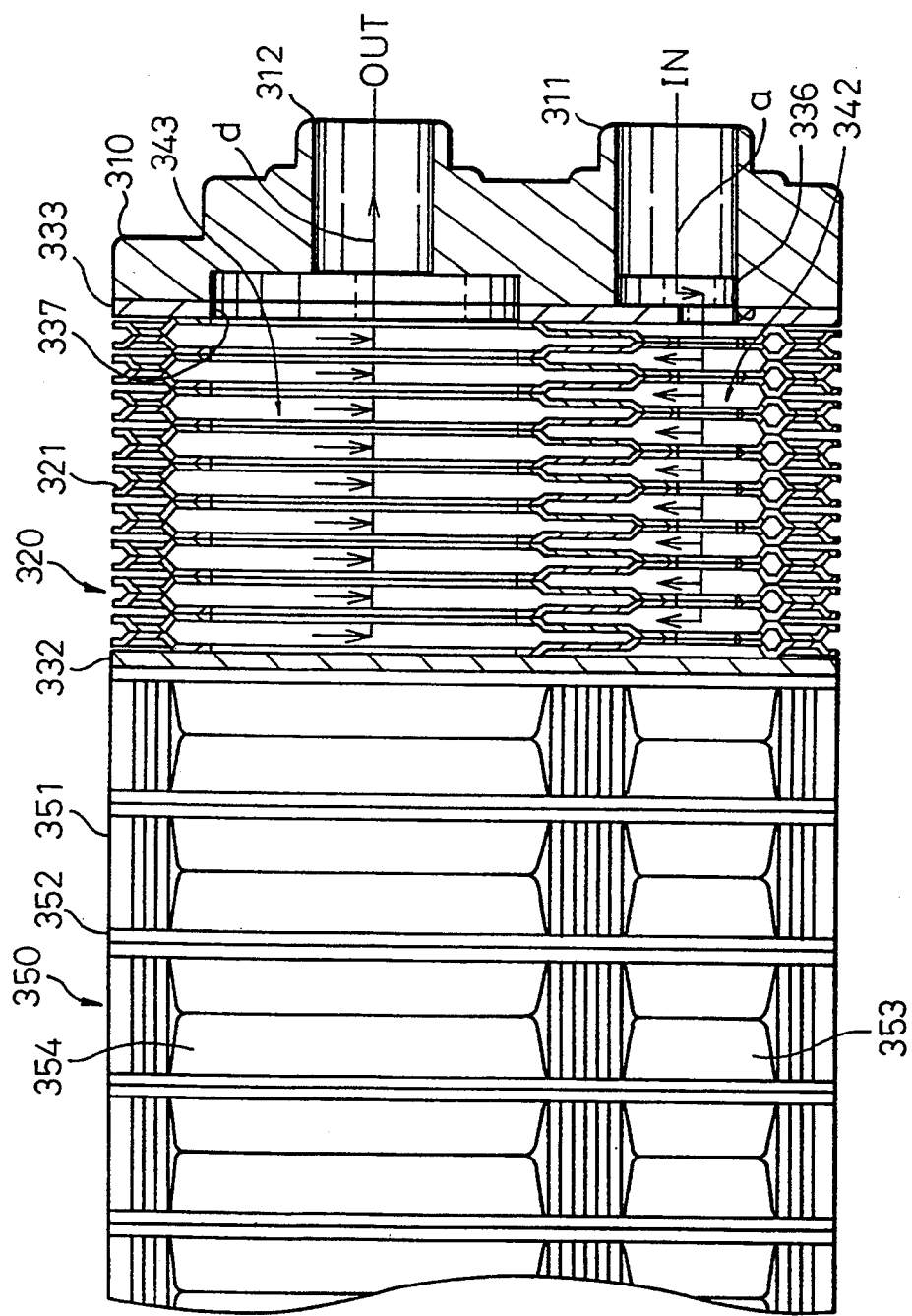
FIG. 49 is a view of the above-described evaporator seen from a line D–G in FIG. 39.

The refrigerant vaporized at the refrigerant evaporating unit 350 (outlet refrigerant) is sent to the upper outlet refrigerant tank portion 341 of the heat exchanging unit 320 as indicated by an arrow c of FIG. 47, distributed to a plurality of outlet refrigerant passageways 345 formed between the plates 321 shown in FIG. 48, and sent to the bottom. Then, the outlet refrigerant flowing through the outlet refrigerant passageways 345 flows into the lower outlet refrigerant tank portion 343 as indicated by an arrow d of FIG. 49 where it is combined and then flows out from the outflow port 312 of the joint block 310, passes the temperature sensing tube 401 shown in FIG. 37, and is sent to the compressor 500.

Accordingly, as will be mentioned later, the heat exchange is carried out between the inlet refrigerant and outlet refrigerant at this heat exchanging unit 320.

The refrigerant evaporating unit 350 is formed by stacking of the corrugate fins 351 in the corrugated plate state (hereinafter referred to as fins 351) for cooling the air and the plates 352 shown in FIG. 50 by brazing. The cross-section of this stacking state is shown in FIG. 51 (cross-sectional front view taken along a line H—H of FIG. 38) and FIG. 52 (cross-sectional view taken along a line J—J of FIG. 50 and FIG. 51).

The plate 352 exhibits a roughly rectangular plate shape, and the inlet tank 353 and outlet tank 354 having a schematically tubular shape are formed in the upper portion thereof. The inlet tank 353 is provided at a position so as to be aligned with the upper inlet refrigerant tank portion 340 of the heat exchanging unit 320, the circular hole 355 being made at the center thereof, and acts as the position for introducing the refrigerant sent from the heat exchanging unit 320. The outlet tank 354 is provided at a position so as to be aligned with the upper outlet refrigerant tank portion 341 of the heat exchanging unit 320, an elongated circular hole 356 being made at the center thereof, and acts as the position for feeding the refrigerant to the upper outlet refrigerant tank portion 341 of the heat exchanging unit 320.

This plate 352 is hollowed at the center portion with respect to the outer periphery so that the passageway of the refrigerant is formed between the plates 352 when stacking the same. In this central concave surface portion 57, which is the central portion, a plurality of cross ribs 358 for promoting the heat transfer of the refrigerant and a central partition wall 359 for introducing the refrigerant downward and further changing the direction and introducing the same to the outlet tank 354 are formed in a convex state. This central partition wall 359 is formed in an oblique direction in accordance with the expansion by the evaporation of the refrigerant for uniformalizing the pressure loss.

A fine groove 363 connecting the inlet tank 353 and the central concave surface portion 357 is formed between the two. For this reason, the refrigerant of the inlet tank 353 passes through this groove 363 and flows into the central concave surface portion 357.

Figure 51:
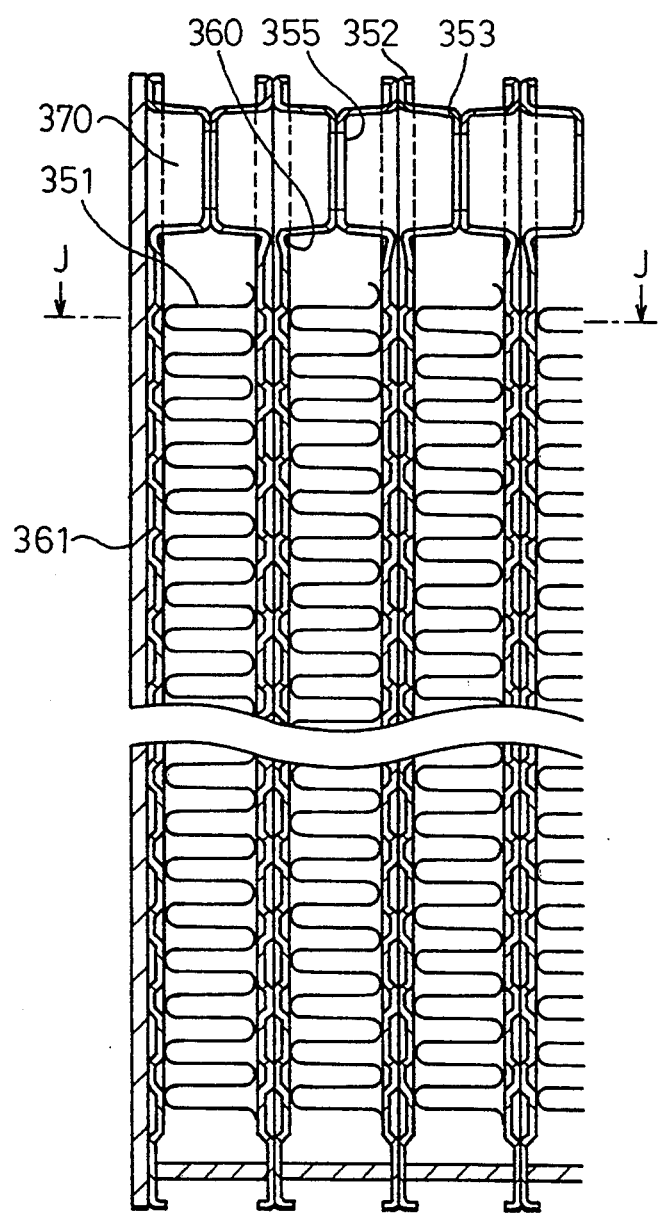
FIG. 51 is a cross-sectional front view of the refrigerant evaporating unit of the above-described evaporator taken along a line H—H in FIG. 38.
Figure 52:
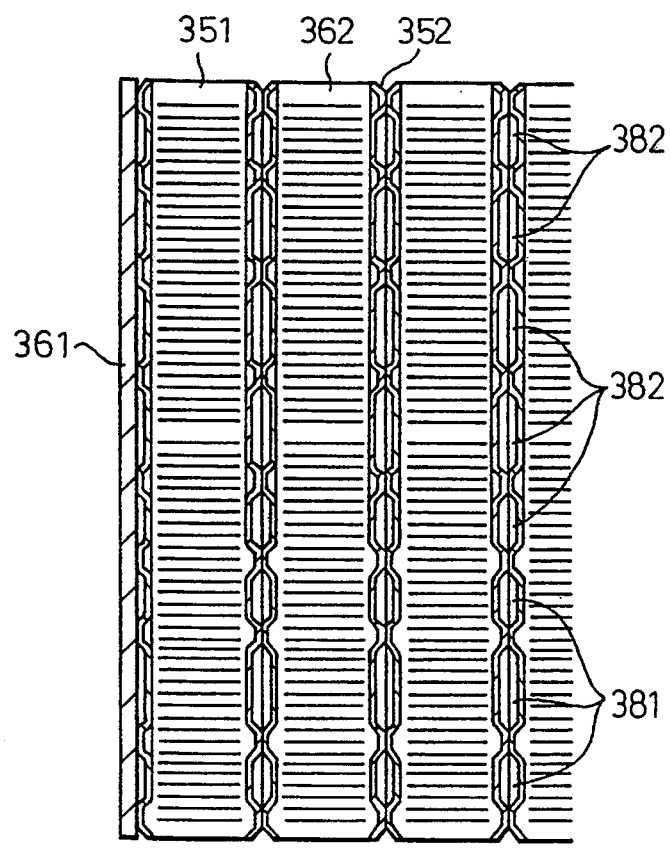
FIG. 52 is a cross-sectional front view of the above-described refrigerant evaporating unit taken along a line J—J in FIG. 50.

The refrigerant evaporating unit 350 is formed by brazing while aligning the above-mentioned plates 352 as shown in FIG. 51 and FIG. 52 to form the passageways of the refrigerant between the end plate 361 acting as the end surface and the end plate 332 of the heat exchanging unit 320 and further by attaching the corrugated plate-like fins 351 between the back surfaces of the plates 352. At this time, a throttle portion 360 is formed by making the grooves 363 formed in the plates 352 faced each other in close contact, thereby narrowering the surface area of the passageway of the refrigerant, to reduce the pressure of the passing refrigerant. This throttle portion 360 constitutes the first pressure reducing means and has the same throttling rate as the aforementioned communication hole 338. The refrigerant passing through the throttle portion 360 and the refrigerant passing through the communication hole 338 are reduced in pressure in the same proportion. Also, in each fin 351, a plurality of fine grooves 362 for promoting the heat exchange between the refrigerant and air are formed. Note that, the shapes of the plates 352 which are brazed facing each other are made reversely symmetrical, i.e., the shape of one side plate 352 is made a mirror image of the shape of the other side plate 352. Note, the facing cross ribs 358 are formed in directions intersecting each other.

Figure 50:
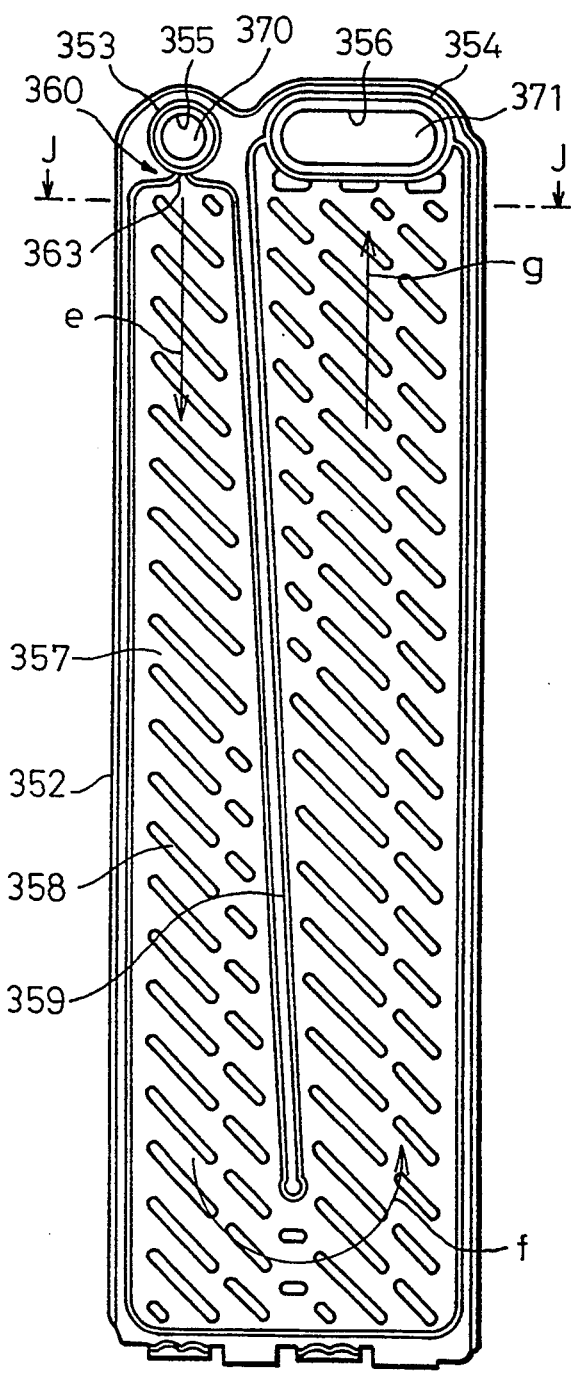
FIG. 50 is a plan view of the plate of the refrigerant evaporating unit of the above-described evaporator.

The flow of the refrigerant in the plates 352 when stacking the plates 352 in this way are shown by the arrows e, f, and g of FIG. 50. The refrigerant sent from the heat exchanging unit 320 to the respective inlet tanks 353 (hereinafter, the storage portion of refrigerant formed by a collection of the inlet tanks 353 is referred to as an inlet tank portion 370) is distributed and passes through the throttle portions 360, is reduced in pressure, and then flows between the central concave surface portions 357 downward (arrow e), is further changed in direction in the lower portion and goes upward (arrow f), flows into the outlet tanks 354 (hereinafter, the storage portion of refrigerant formed by a collection of the outlet tanks 354 is referred to as an outlet tank portion 370) (arrow g), is combined, and is sent to the upper outlet refrigerant tank portion 341 of the heat exchanging unit 320. At this time, the refrigerant is dispersed and distributed widely between the central concave surface portions 357 of the plates 352 by the intersecting cross ribs 358. Note that, in FIG. 52, 381 acts as the passageway of the refrigerant going downward, and 382 acts as the passageway of the refrigerant going upward (hereinafter these passageways 381 and 382, that is, passageways of refrigerant between the central concave surface portions 357 are referred to overall as the evaporation passageway 380). When the refrigerant flows through this evaporation passageway 380, the refrigerant performs the heat exchange with the air via the fins 351, to continue being isothermally expanded while being evaporated.

Figure 53:
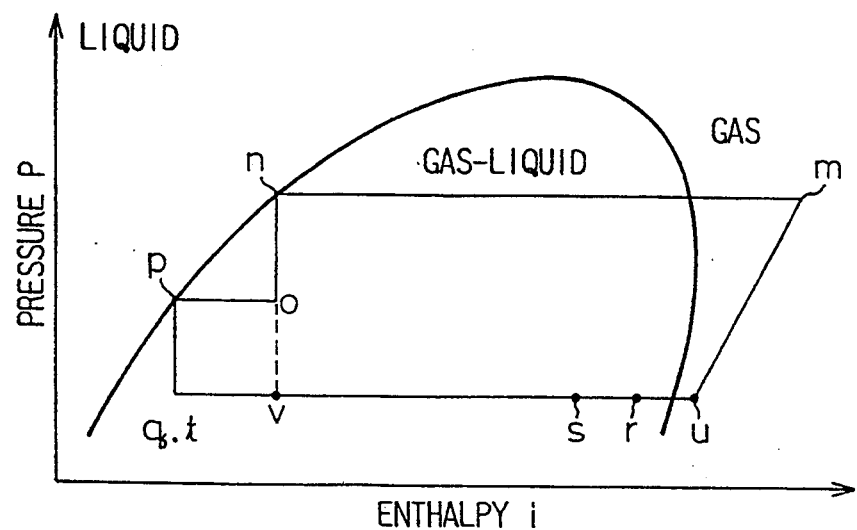
FIG. 53 is a Mollier diagram representing the state of the refrigerant of the ninth embodiment.

An explanation will be made next of the operation the refrigerant in the evaporator of the ninth embodiment constituted in above way by using FIGS. 37 and FIG. 53. FIG. 53 is a Mollier diagram representing the state of the refrigerant in the refrigeration cycle. Points on the graph are indicated by the same symbols in FIG. 37.

A high pressure refrigerant compressed by the compressor 500 (u-m part in the diagram) discharges heat at the condenser 510 (m-n part in the diagram) and changes in phase from the gaseous state refrigerant to the liquid state refrigerant. Then, in the usual refrigeration cycle, the pressure reduction and expansion from the state of the point n to the state of the point v is carried out by the expansion valve 400, and therefore the refrigerant becomes the gas-liquid two-phase state at the inlet of the evaporator, and the distribution of the refrigerant in the evaporator is not uniformly carried out. Therefore, in the evaporator of the ninth embodiment, the pressure is reduced to the point o by the expansion valve 400. By performing the heat exchange between this pressure-reduced refrigerant and the outlet refrigerant flowing out of the refrigerant evaporator 350 (the temperature becomes lower than the inlet refrigerant by passing through the throttle portion 360 as will be mentioned later) at the heat exchanging unit 320, the refrigerant is changed to the point p and liquidized. For this reason, the refrigerant is uniformly distributed from the inlet tank portion 370 of the refrigerant evaporator 350 to the evaporation passageways 380 between the plates 352. At this time, by the throttle portion 360 acting as the inlet of the evaporation passageway 380, the refrigerant is reduced in pressure from the point p to the point q (the temperature becomes low at this time), to exhibit the gas-liquid two-phase state, and it is heat-exchanged with the air via the fins 351 and starts evaporation (a part of line q-r in the diagram).

On the other hand, the refrigerant divided from the upper inlet refrigerant tank portion 340 of the heat exchanging unit 320 and flowing into the upper outlet refrigerant tank portion 341 passes through the communication hole 338, whereby the pressure is reduced from the state of point p, to become the state of the point t. The state of this point t is the same as the above-mentioned state of point q.

The refrigerant passed through the communication hole 338 (point t) and the refrigerant flowing out from the refrigerant evaporating unit 350 (point r) are combined in the upper outlet refrigerant tank portion 341 of the heat exchanging unit to become the state of the point s. Thereafter, this refrigerant (outlet refrigerant) passes through the outlet refrigerant passageway 345 formed between the plates 321 of the heat exchanging unit 320, whereby the refrigerant is heat-exchanged with the inlet refrigerant to become the superheated vapor (a part of point u in the diagram), passes through the temperature sensing tube 401, and is sent to the compressor 500.

Namely, as shown in FIG. 37, the refrigerant of the gas-liquid two-phase state sent from the expansion valve 400 (inlet refrigerant) is heat-exchanged with the low temperature refrigerant flowing through the outlet refrigerant passageway 345 (outlet refrigerant) when flowing through the inlet refrigerant passageway 344 and liquidized, and is sent to the inlet tank portion 370 of the refrigerant evaporating unit 50. Then, it uniformly flows into the evaporation passageways 380 and, at the same time, is reduced in pressure by the throttle portion 360, to become the gas-liquid two-phase state at a low temperature, is heat-exchanged with the air and vaporized, and isothermally expanded. When the refrigerant is completely vaporized or immediately before the refrigerant is vaporized, the refrigerant is sent to the outlet tank portion 371 of the refrigerant evaporating unit 350 and combined and further combined with the refrigerant bypassed by the communication hole 338. The result flows through the outlet refrigerant passageway 345 of the heat exchanging unit 320. At this time, the refrigerant (outlet refrigerant) is heat-exchanged with the inlet refrigerant flowing through the inlet refrigerant passageway 344 and heated, to become the superheated vapor. That is, the refrigerant at the line o-p in FIG. 53 is heat-exchanged with the refrigerant at the line s-u. Accordingly, it is possible to maintain a constant temperature by not heat-exchanging the refrigerant in the evaporation passageways 380 until it becomes the superheated vapor, that is, by obtaining the superheat at the heat exchanging unit 320.

Also, since a part of the liquid state refrigerant of the upper inlet refrigerant tank portion 340 of the heat exchanging unit 320 bypasses the refrigerant evaporating unit 350 and flows into the upper outlet refrigerant tank portion 341, even if the outlet refrigerant of the refrigerant evaporating unit 350 transitionally becomes the superheated gas state, the cooling ability at the heat exchanging unit 320 can be maintained.

As explained above, according to the evaporator of the ninth embodiment, by providing the heat exchanging unit 320 and the throttle portion 360, it is possible to uniformly distribute the refrigerant to the evaporation passageways 380 by the heat exchange between the inlet refrigerant and the outlet refrigerant, and in addition, to maintain the temperature of the refrigerant in the evaporation passageway 380 constant. As a result, the heat exchange performance is improved by the uniform distribution of the refrigerant, it is possible to uniformalize the heat exchange between the refrigerant and air by the isothermal expansion of the refrigerant, and to uniformalize the temperature of the air passed through the fins.

Also, the construction is made so that the heat exchanging unit 320 is provided beside the conventional stacking type evaporator, and the expansion valve 400 and temperature sensing tube 401 are provided beside this. The heat exchange is carried out between the expansion valve 400 and the temperature sensing tube 401, and therefore a good controllability can be maintained.

Also, even if the evaporator of the ninth embodiment is used in the conventional refrigeration system, almost no change of system is required, and the system structure does not become complex. Further, even if the throttle portion 360 has been provided, it is not necessary to make the parts related to this a high pressure resistance type. Furthermore, the direction of flow of the refrigerant of the outlet refrigerant passageway 345 becomes an inverse direction with respect to the direction of flow of the refrigerant of the inlet refrigerant passageway 344 in the heat exchanging unit 320, and therefore the heat exchange efficiency becomes high.

Also, by closing the optional circular holes 325, 327, 330, and 331 of the respective refrigerant tank portions 340, 341, 342, and 343 of the heat exchanging unit 320 using the plates etc., the passageways of the inlet refrigerant and outlet refrigerant can be changed, and therefore the adjustment of the degree of superheating etc. becomes possible.

Figure 54:
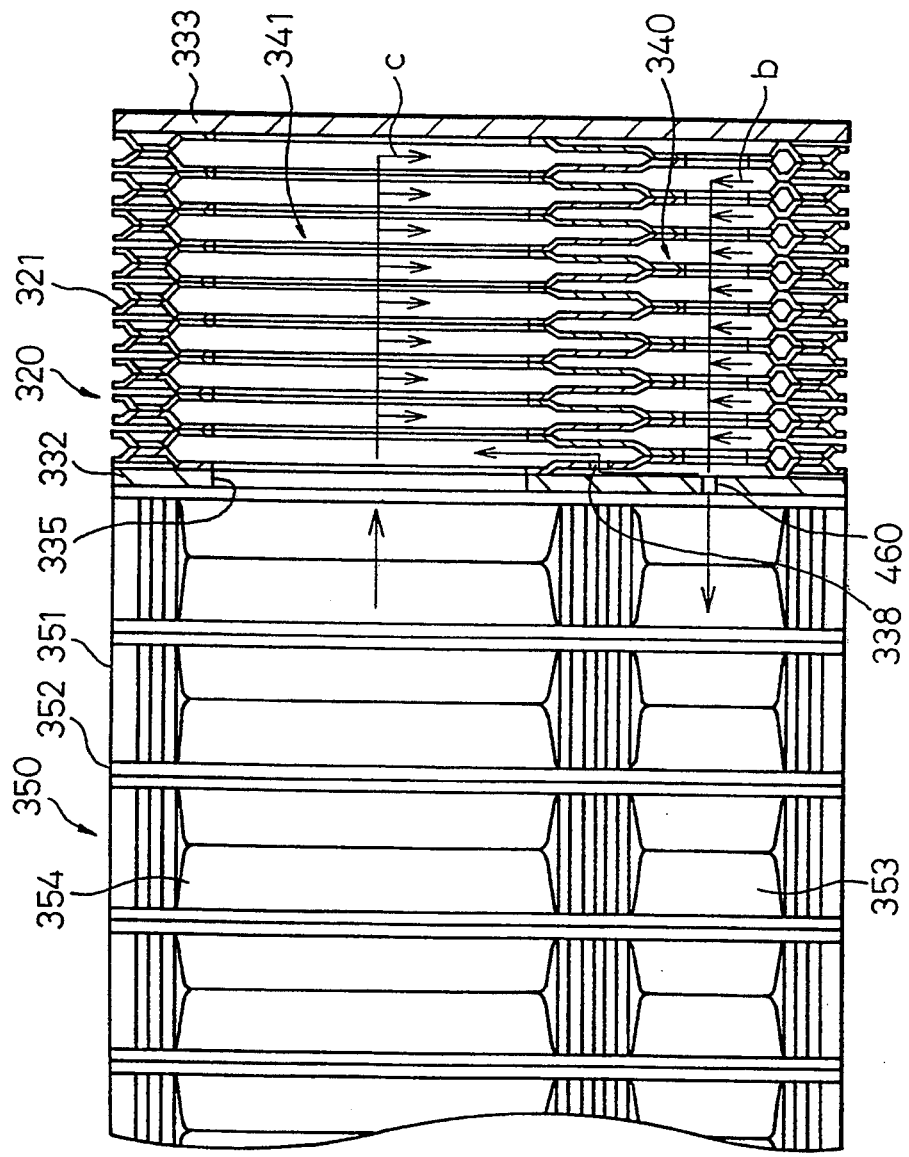
FIG. 54 is a view of the evaporator of a 10th embodiment of the present invention from a line D–E in FIG. 39.
Figure 55:
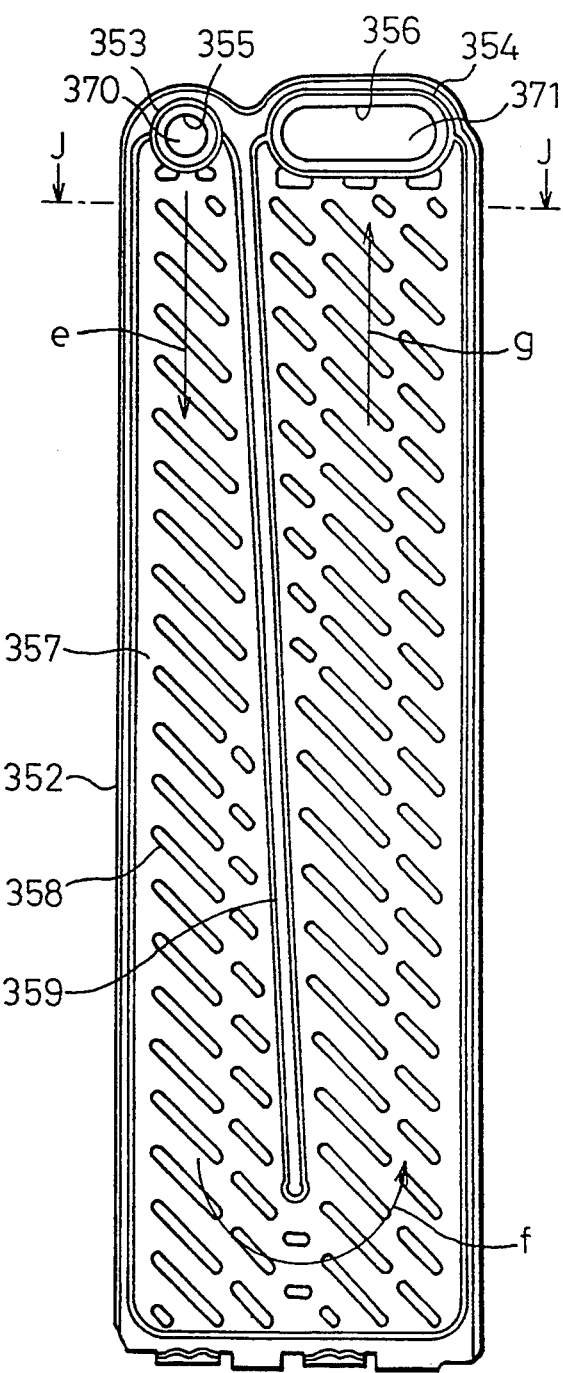
FIG. 55 is a plan view of the plate of the 10th embodiment.
Figure 56:
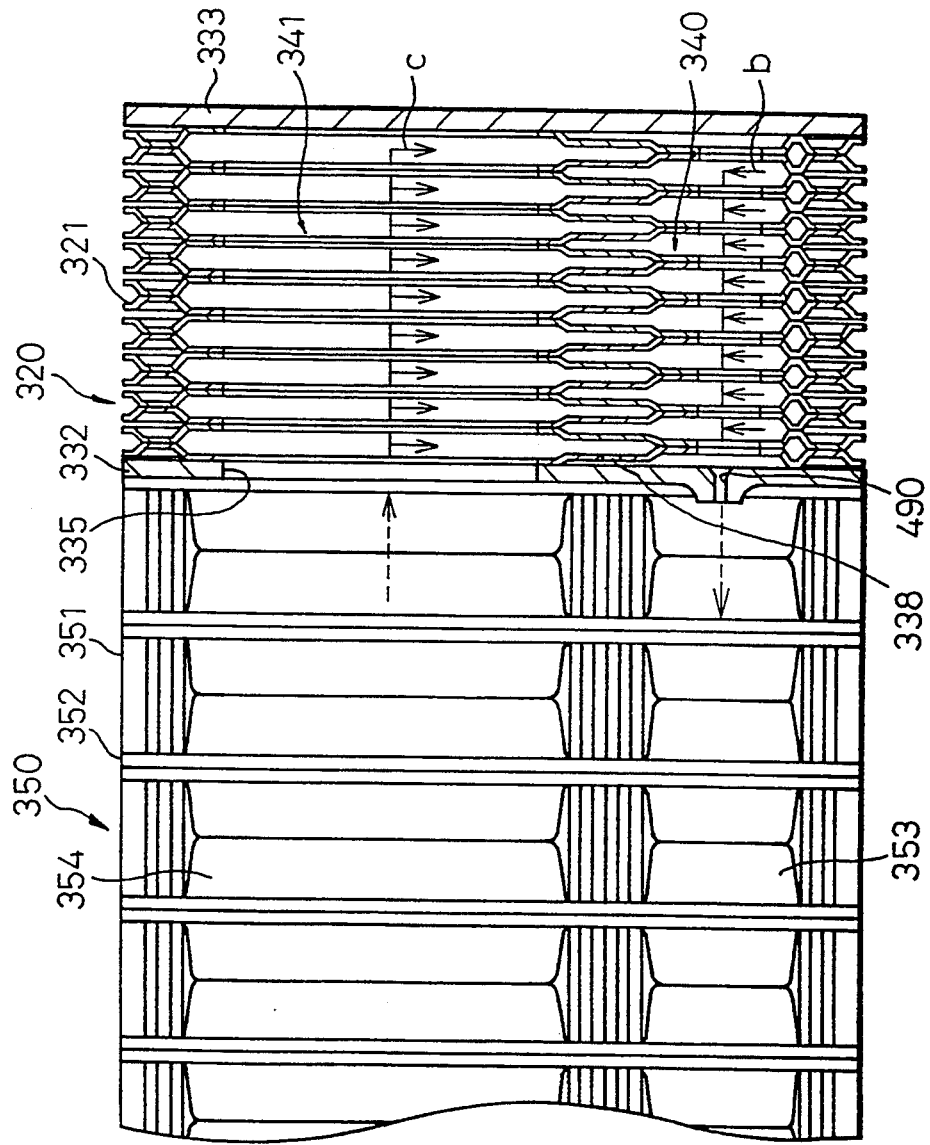
FIG. 56 is a view of the evaporator of an 11th embodiment of the present invention seen from a line D–E in FIG. 39.

Next, FIG. 54 through FIG. 56 show a 10th embodiment and 11th embodiment of the present invention.

In these embodiments, the position of arrangement of the throttle portion is different from that in the ninth embodiment, but the construction of the other parts is the same as that of the ninth embodiment. Accordingly, the parts having the same construction as those in the ninth embodiment will be explained by attaching the same numerals.

FIG. 54 through FIG. 55 show the 10th embodiment. In the 10th embodiment, as the throttle portion 460, orifices having an inner diameter of 1.0 to 5.0 mm are provided on the inlet refrigerant passageway 344 side of the end plate 332 provided between the refrigerant evaporating unit 350 and the heat exchanging unit 320. When providing such a throttle portion 460, the inlet refrigerant passing through the throttle portion 460 and sent to the inlet tank portion 370 becomes the gas-liquid two-phase state. At this time, in the inlet tank portion 370, all of the gas flows into the evaporation passageway near the throttle portion 460, and therefore most of all of the remaining refrigerant becomes the single-phase state of a liquid in the same way as in the ninth embodiment at the evaporation passageway inlet, and the inlet refrigerant is substantially uniformly distributed. Accordingly, the heat exchange performance is improved by the uniform distribution of the inlet refrigerant. In addition, since the throttle portion 460 is provided only at one portion, a lowering of the heat exchange performance due to the difference of the flow rate of refrigerant in the evaporation passageways by the difference of machining precision of the diameter of throttle produced where a plurality of throttle portions are used will not occur.

Figure 57:
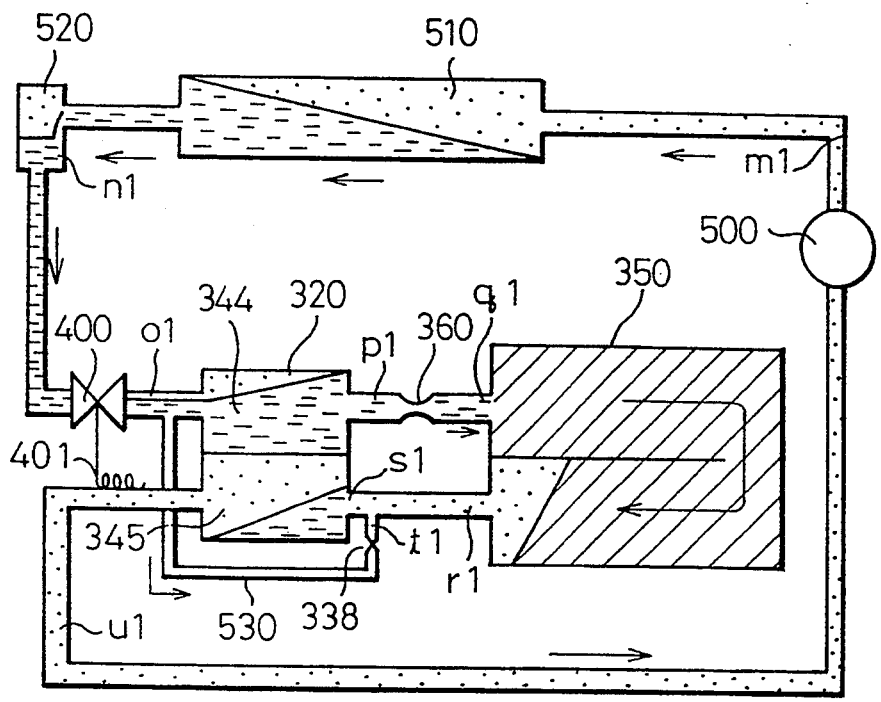
FIG. 57 is a diagrammatical view explaining the refrigeration cycle in a 12th embodiment of the present invention.

FIG. 56 shows an 11th embodiment. In the 11th embodiment, the shape of the throttle portion 490 is made the shape of a choke, that is, a nozzle in which the diameter of the passageway smoothly becomes finer toward the forward direction. The rest of the construction is the same as that of the 10th embodiment. In this way, in the 11th embodiment, the shape of the throttle portion 490 is made the shape of a choke, and therefore it is effective as the throttle portion of the inlet refrigerant where there is a large distance between the refrigerant evaporating unit 350 and the heat exchanging unit 320 in comparison with the 10th embodiment FIG. 57 shows a 12th embodiment of the present invention and is a diagrammatical view indicating the refrigeration cycle. In the above-mentioned embodiments, the bypass passageway 530 was arranged on the rear stream side of the heat exchanging unit 320, but in the present embodiment, one end of the bypass passageway 530 is connected to the upstream side from the heat exchanging unit 320, so that a part of the liquid state refrigerant before flowing into the heat exchanging unit 320 flows into the upper outlet refrigerant tank portion 341 of the heat exchanging unit. The rest of the structure is the same as the above-mentioned embodiments.

Figure 58:
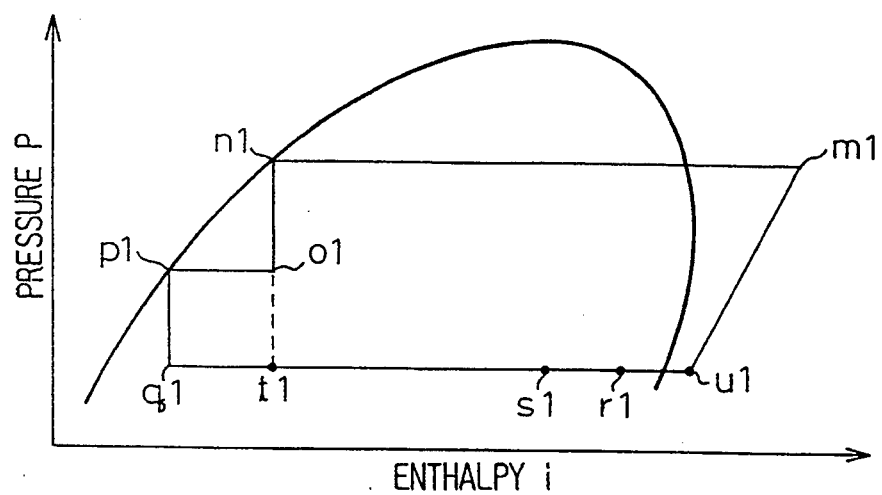
FIG. 58 is a Mollier diagram representing the state of the refrigerant of the 12th embodiment of the present invention.

The state of the refrigerant in the evaporator of the 12th embodiment constituted in this way will be explained using FIG. 57 and FIG. 58. FIG. 58 is a Mollier diagram representing the state of the refrigerant in the refrigeration cycle, in which points on the graph are indicated by the same references in FIG. 57.

A high pressure refrigerant compressed by the compressor 500 (part of line u1-m1 in the diagram) discharges the heat at the condenser 510 (part of line m1-n1 in the diagram) and changes in phase from the gaseous state refrigerant to the liquid state refrigerant. The liquid state refrigerant separated at the receiver 520 is reduced in pressure to the point o1 by the expansion valve 400, and this pressure-reduced refrigerant and the outlet refrigerant flowing out of the refrigerant evaporator 350 are heat-exchanged at the heat exchanging unit 320, whereby the refrigerant is changed to the point p1 and liquidized. The liquidized refrigerant is reduced in pressure from the point p1 to the point q1 by the throttle portion 360 acting as the inlet of the evaporation passageway 380 (the temperature becomes low at this time), to become the gas-liquid two-phase state and is heat-exchanged with air via the fins 351 and starts evaporation (part of line q1-r1 in the diagram).

On the other hand, the refrigerant flowing into the upper outlet refrigerant tank portion 341 from the point between the expansion valve 400 and the heat exchanging unit 320 via the bypass passageway 530 passes through the second pressure reducing means 338, whereby the pressure is reduced from the state of point o1, to become the state of the point t1.

The refrigerant reduced in pressure by the second pressure reducing means (point t1) and the refrigerant flowing out of the refrigerant evaporating unit 350 (point r1) are combined in the upper outlet refrigerant tank portion 341 of the heat exchanging unit, to exhibit the state of the point s1. Thereafter, this refrigerant (outlet refrigerant) passes through the outlet refrigerant passageway 345 formed between the plates 321 of the heat exchanging unit 320, whereby the heat exchange with the inlet refrigerant is carried out and the refrigerant becomes superheated vapor (part of point u1 in the diagram), passes the temperature sensing tube 401, and is sent to the compressor 500.

Namely, as shown in FIG. 57, the refrigerant of the gas-liquid two-phase state (inlet refrigerant) sent from the expansion valve 400 is heat-exchanged with the low temperature refrigerant (outlet refrigerant) flowing through the outlet refrigerant passageway 345 when flowing through the inlet refrigerant passageway 344, is cooled and liquidized, and is sent to the inlet tank portion 370 of the refrigerant evaporation unit 350. Then, it uniformly flows into the evaporation passageways 380 and, at the same time, is reduced in pressure by the throttle portion 360, to exhibit the low temperature gas-liquid two-phase state, is heat-exchanged with the air and vaporized, and undergoes isothermic expansion. When the refrigerant is completely vaporized, or immediately before the refrigerant is vaporized, the refrigerant is sent to the outlet tank portion 371 of the refrigerant evaporating unit 350 and combined, and further combined with the refrigerant bypassed from the bypass passageway 530. The resultant refrigerant flows through the outlet refrigerant passageway 345 of the heat exchanging unit 320. At this time, the refrigerant (outlet refrigerant) is heat-exchanged with the inlet refrigerant flowing through the inlet refrigerant passageway 344 and heated, to become the superheated vapor. That is, the heat exchange is carried out between the refrigerant at the line o1–p1 in FIG. 58 and the refrigerant at the line s1–u1. Accordingly, a constant temperature can be maintained without heat exchange until the refrigerant in the evaporation passageways 380 becomes the superheated vapor, that is, by obtaining the superheat at the heat exchanging unit 320.

Also, since a part of the liquid state refrigerant on the upstream side of the heat exchanging unit 320 is made to bypass the refrigerant evaporating unit 350 and flows into the upper outlet refrigerant tank portion 341, in the same way as in the above-mentioned embodiments, even if the outlet refrigerant of the refrigerant evaporating unit 350 transitionally exhibits the superheated gas state, it is possible to maintain the cooling ability at the heat exchanging unit 320.

While an explanation was made above of embodiments of the present invention, the present invention is not restricted to these embodiments and of course can be modified in various ways so far as it is not out of the scope of the claims. In the above-described embodiments, the refrigerant evaporating unit 350 and the heat exchanging unit 320 were integrally formed, but it is also possible to constitute them as separately disposed type connected by piping, etc. For example, in the case of the air-conditioning for an automobile, it is also possible to dispose the refrigerant evaporating unit 350 inside the cabin, to dispose the heat exchanging unit 320 outside the cabin, and to connect them by piping.

We claim:

1. An evaporator for a refrigerant adapted for use in a refrigeration cycle comprising:

an evaporator inlet for introducing the refrigerant to be evaporated;

an evaporator outlet for discharging the evaporated refrigerant;

evaporating means, having at least an inlet for introducing the refrigerant to be evaporated, an outlet for discharging the evaporated refrigerant, and a plurality of refrigerant passageways connected in parallel to each other for obtaining a heat exchange between the refrigerant on the inside of said refrigerant passageways and a fluid outside the evaporating means, for evaporating the refrigerant therein;

an inlet passageway connecting between said evaporator inlet and said inlet of said evaporating means for allowing a flow of said refrigerant from said evaporator inlet to said inlet of said evaporating means;

first heat exchanging means disposed in said inlet passageway for transferring heat of the refrigerant therein to obtain a liquid-state refrigerant by cooling;

first pressure reducing means disposed in said inlet passageway between said first heat exchanging means and said evaporating means for throttling the flow of the refrigerant to said inlet of said evaporating means to reduce a pressure of the refrigerant;

second heat exchanging means disposed in such a manner as to be able to perform a heat exchange with said first heat exchanging means for absorbing heat of the refrigerant transferred from said first heat exchanging means to obtain a liquid-state refrigerant;

dividing passageway means connecting between said inlet passageway and said second heat exchanging means for dividing a part of the refrigerant which flows in said inlet passageway to pass the part of the refrigerant into said second heat exchanging means;

a preliminary pressure reducing means disposed in said inlet passageway upstream of said first heat exchanging means for throttling the flow of the refrigerant to said first heat exchanging means, to reduce a pressure of the refrigerant, so that the divided refrigerant flowing into said second heat exchanging means is a gas-liquid state; and an outlet passageway connecting between said evaporator outlet and said outlet of said evaporating means for allowing a flow of the evaporated refrigerant from said outlet of said evaporating means to said evaporator outlet.

2. An evaporator according to claim 1, wherein said evaporating means comprises a plurality of stacked plates, each of said plates having a first tubular projection, a second tubular projection, and a recess, each of an adjacent pair of said plates being arranged in such a manner that said first and said second tubular projections and said recess, respectively, face inward, whereby an inlet tank is formed inside said first projection and an outlet tank is formed inside said second projection, and such that a plurality of evaporation passageways are formed by said recess, said evaporation passageways connecting the inlet tank with the outlet tank, and further each of said adjacent pairs of plates are arranged so that the outside air is passed between said adjacent pairs of plates.

3. An evaporator according to claim 2, wherein each of said first and second heat exchanging means comprises a plurality of stacked plates, each of said plates having an inflow hole and an outflow hole and further having a groove portion connecting the inflow hole and outflow hole, they being combined so as to face inward, whereby a plurality of heat exchange passageways are formed inside the same.

4. An evaporator according to claim 1, wherein said dividing passageway means is divided from said inlet passageway upstream of said first heat exchanging means and connected to said second heat exchanging means.

5. An evaporator according to claim 4, wherein said evaporator further comprises the following element:

a second pressure reducing means disposed in said dividing passageway means for throttling the flow of the refrigerant divided to said second heat exchanging means, to reduce a pressure of the divided refrigerant so that the divided refrigerant flowing into said second heat exchanging means is a gas-liquid state.

6. An evaporator according to claim 1, wherein said dividing passageway means is divided from said inlet passageway downstream of said first heat exchanging means and connected to said second heat exchanging means.

7. An evaporator according to claim 6, wherein said dividing passageway means is further divided from said inlet passageway upstream of said first pressure reducing means downstream of said first heat exchanging means and connected to said second heat exchanging means.

8. An evaporator according to claim 7, wherein said evaporator further comprises the following element:
a second pressure reducing means disposed in said dividing passageway means for throttling the flow of the refrigerant divided to said heat exchanging means, to reduce a pressure of the divided refrigerant, so that the divided refrigerant flowing into said second heat exchanging means is a gas-liquid state.

9. An evaporator according to claim 2, wherein said evaporator further comprises a plurality of fins arranged between said adjacent pairs of plates, such that the outside air flow is in contact with said fins.

10. An evaporator according to claim 1, wherein said evaporating means comprises a pipe having a serpentine shape composed of a plurality of parallel sections and curved sections connecting adjacent parallel sections.

11. An evaporator according to claim 2, wherein the first pressure reducing means is constituted by any of an expansion valve, orifice, capillary tube, and a variable flow rate expansion valve.

12. An evaporator according to claim 6, wherein the said dividing passageway means is divided from the aforesaid inlet passageway downstream of said first heat exchanging means and in addition downstream of said first pressure reducing means.

13. An evaporator according to claim 12, wherein said first pressure reducing means is an expansion valve.

* * * * *